United States Patent
Ionescu

(10) Patent No.: US 12,248,560 B2
(45) Date of Patent: Mar. 11, 2025

(54) HYPERVISOR-BASED REDIRECTION OF SYSTEM CALLS AND INTERRUPT-BASED TASK OFFLOADING

(71) Applicant: CrowdStrike, Inc., Sunnyvale, CA (US)

(72) Inventor: Ion-Alexandru Ionescu, Seattle, WA (US)

(73) Assignee: CrowdStrike, Inc., Sunnyvale, CA (US)

(*) Notice: Subject to any disclaimer, the term of this patent is extended or adjusted under 35 U.S.C. 154(b) by 512 days.

(21) Appl. No.: 17/062,237

(22) Filed: Oct. 2, 2020

(65) Prior Publication Data
US 2021/0026950 A1 Jan. 28, 2021

Related U.S. Application Data

(63) Continuation-in-part of application No. 17/060,355, filed on Oct. 1, 2020, which is a continuation-in-part
(Continued)

(51) Int. Cl.
*G06F 21/54* (2013.01)
*G06F 9/30* (2018.01)
(Continued)

(52) U.S. Cl.
CPC .......... *G06F 21/54* (2013.01); *G06F 9/30076* (2013.01); *G06F 9/30101* (2013.01);
(Continued)

(58) Field of Classification Search
None
See application file for complete search history.

(56) References Cited

U.S. PATENT DOCUMENTS 4,564,903 A 1/1986 Guyette et al.
4,787,031 A * 11/1988 Karger ................ G06F 9/45558
718/100
(Continued)

FOREIGN PATENT DOCUMENTS

EP 3017392 A1 * 5/2016 ............. G06F 21/53
WO WO2012135192 10/2012
WO WO2013055499 A1 4/2013

OTHER PUBLICATIONS

Pham et al "Reliability and Security Monitoring of Virtual Machines Using Hardware Architectural Invariants," 2014 44th Annual IEEE/IFIP International Conference on Dependable Systems and Networks, IEEE Computer Society pp. 13-24 (Year: 2014).*
(Continued)

*Primary Examiner* — Luu T Pham
*Assistant Examiner* — James J Wilcox
(74) *Attorney, Agent, or Firm* — Lee & Hayes, P.C.

(57) ABSTRACT

A security agent configured to initiate a security agent component as a hypervisor for a computing device is described herein. The security agent component may change a value of a processor configuration register, such as a Model Specific Register (MSR), in order to cause system calls to be redirected to the security agent, and may set an intercept for instructions for performing read operations on the processor configuration register so that a process, thread, or component different from the processor of the computing device may receive the original value of the processor configuration register instead of an updated value of the processor configuration register. The security agent component may also be configured to generate interrupts to offload task execution from the hypervisor to a security agent executing as a kernel-level component.

16 Claims, 19 Drawing Sheets

Related U.S. Application Data of application No. 15/063,086, filed on Mar. 7, 2016, now Pat. No. 11,188,651.

(51) Int. Cl.

| | |
|---|---|
| *G06F 9/455* | (2018.01) |
| *G06F 9/48* | (2006.01) |
| *G06F 9/54* | (2006.01) |
| *G06F 12/14* | (2006.01) |

(52) U.S. Cl.
CPC ........ *G06F 9/45558* (2013.01); *G06F 9/4812* (2013.01); *G06F 9/545* (2013.01); *G06F 12/1441* (2013.01); *G06F 12/1491* (2013.01); *G06F 2009/45587* (2013.01); *G06F 2212/1052* (2013.01); *G06F 2212/152* (2013.01)

(56) References Cited

U.S. PATENT DOCUMENTS

| | | | | |
|---|---|---|---|---|
| 5,038,281 A | * | 8/1991 | Peters | G06F 9/45537 |
| | | | | 710/264 |
| 5,179,690 A | * | 1/1993 | Ishikawa | G06F 3/14 |
| | | | | 358/1.13 |
| 5,291,608 A | * | 3/1994 | Flurry | G06F 9/542 |
| | | | | 710/263 |
| 5,469,571 A | * | 11/1995 | Bunnell | G06F 9/4812 |
| | | | | 718/107 |
| 5,515,538 A | * | 5/1996 | Kleiman | G06F 9/52 |
| | | | | 718/103 |
| 5,774,686 A | * | 6/1998 | Hammond | G06F 9/3822 |
| | | | | 712/E9.035 |
| 5,854,912 A | * | 12/1998 | Mahalingaiah | G06F 9/3836 |
| | | | | 712/E9.034 |
| 5,909,696 A | * | 6/1999 | Reinhardt | G06F 12/0802 |
| | | | | 711/149 |
| 5,940,876 A | * | 8/1999 | Pickett | G06F 9/30065 |
| | | | | 711/219 |
| 6,044,430 A | * | 3/2000 | MacDonald | G06F 12/126 |
| | | | | 711/E12.075 |
| 6,076,156 A | * | 6/2000 | Pickett | G06F 9/30185 |
| | | | | 712/E9.035 |
| 6,154,818 A | * | 11/2000 | Christie | G06F 12/1491 |
| | | | | 711/170 |
| 6,173,404 B1 | * | 1/2001 | Colburn | G06F 21/54 |
| | | | | 726/17 |
| 6,226,749 B1 | * | 5/2001 | Carloganu | G06F 21/606 |
| | | | | 726/2 |
| 6,275,879 B1 | * | 8/2001 | Goodfellow | G06F 13/22 |
| | | | | 710/72 |
| 6,349,355 B1 | * | 2/2002 | Draves | G06F 12/1491 |
| | | | | 711/6 |
| 6,408,386 B1 | * | 6/2002 | Hammond | G06F 9/4812 |
| | | | | 712/E9.035 |
| 6,516,395 B1 | * | 2/2003 | Christie | G06F 12/1491 |
| | | | | 711/170 |
| 6,711,673 B1 | * | 3/2004 | Mitchell | G06F 9/342 |
| | | | | 712/E9.035 |
| 6,807,622 B1 | * | 10/2004 | McGrath | G06F 9/30189 |
| | | | | 712/210 |
| 6,823,433 B1 | * | 11/2004 | Barnes | G06F 12/1491 |
| | | | | 711/147 |
| 6,854,039 B1 | * | 2/2005 | Strongin | G06F 12/1491 |
| | | | | 713/161 |
| 6,880,068 B1 | * | 4/2005 | McGrath | G06F 9/342 |
| | | | | 712/E9.035 |
| 6,889,312 B1 | * | 5/2005 | McGrath | G06F 9/30189 |
| | | | | 712/210 |
| 6,898,697 B1 | * | 5/2005 | Gao | G06F 9/30101 |
| | | | | 710/33 |
| 6,968,446 B1 | * | 11/2005 | McGrath | G06F 9/342 |
| | | | | 712/229 |
| 6,986,052 B1 | * | 1/2006 | Mittal | G06F 21/602 |
| | | | | 713/189 |
| 6,986,058 B1 | * | 1/2006 | Friedman | G06F 21/54 |
| | | | | 726/22 |
| 7,043,616 B1 | * | 5/2006 | McGrath | G06F 9/30101 |
| | | | | 712/E9.035 |
| 7,055,152 B1 | * | 5/2006 | Ganapathy | G06F 9/5022 |
| | | | | 709/234 |
| 7,073,173 B1 | * | 7/2006 | Willman | G06F 12/145 |
| | | | | 711/2 |
| 7,082,507 B1 | * | 7/2006 | Christie | G06F 12/145 |
| | | | | 711/163 |
| 7,096,491 B2 | * | 8/2006 | Cheng | G06F 21/54 |
| | | | | 705/52 |
| 7,130,951 B1 | * | 10/2006 | Christie | G06F 9/4812 |
| | | | | 710/262 |
| 7,356,679 B1 | * | 4/2008 | Le | G06F 16/116 |
| | | | | 713/1 |
| 7,398,532 B1 | * | 7/2008 | Barber | G06F 21/53 |
| | | | | 726/16 |
| 7,426,644 B1 | * | 9/2008 | Strongin | G06F 12/1441 |
| | | | | 713/193 |
| 7,461,144 B1 | * | 12/2008 | Beloussov | G06F 21/53 |
| | | | | 718/100 |
| 7,464,255 B1 | * | 12/2008 | Tan | G06F 9/30167 |
| | | | | 712/300 |
| 7,478,237 B2 | | 1/2009 | Costea et al. | |
| 7,484,239 B1 | * | 1/2009 | Tester | G06F 12/145 |
| | | | | 726/1 |
| 7,493,498 B1 | * | 2/2009 | Schmidt | G06F 21/52 |
| | | | | 713/193 |
| 7,496,727 B1 | * | 2/2009 | Ludloff | G06F 12/1491 |
| | | | | 711/163 |
| 7,552,477 B1 | * | 6/2009 | Satish | G06F 9/545 |
| | | | | 726/22 |
| 7,561,571 B1 | * | 7/2009 | Lovett | H04L 12/66 |
| | | | | 370/422 |
| 7,571,318 B2 | * | 8/2009 | Strongin | G06F 12/1491 |
| | | | | 712/228 |
| 7,581,220 B1 | * | 8/2009 | Roeck | G06F 11/1469 |
| | | | | 711/100 |
| 7,607,173 B1 | * | 10/2009 | Szor | G06F 12/1483 |
| | | | | 713/188 |
| 7,633,955 B1 | * | 12/2009 | Saraiya | H04L 49/357 |
| | | | | 370/395.31 |
| 7,664,110 B1 | * | 2/2010 | Lovett | H04L 67/1097 |
| | | | | 370/422 |
| 7,685,281 B1 | * | 3/2010 | Saraiya | G06F 13/387 |
| | | | | 709/239 |
| 7,702,843 B1 | * | 4/2010 | Chen | G06F 12/109 |
| | | | | 718/1 |
| 7,702,887 B1 | * | 4/2010 | Grohoski | G06F 11/3471 |
| | | | | 712/227 |
| 7,818,808 B1 | * | 10/2010 | Neiger | G06F 9/45558 |
| | | | | 718/1 |
| 7,843,906 B1 | * | 11/2010 | Chidambaram | H04L 49/901 |
| | | | | 370/386 |
| 7,843,907 B1 | * | 11/2010 | Abou-Emara | H04L 49/3045 |
| | | | | 370/386 |
| 7,860,097 B1 | * | 12/2010 | Lovett | H04L 49/357 |
| | | | | 370/422 |
| 7,860,961 B1 | * | 12/2010 | Finkelstein | H04L 49/602 |
| | | | | 709/224 |
| 7,865,893 B1 | | 1/2011 | Omelyanchuk et al. | |
| 7,873,693 B1 | * | 1/2011 | Mehrotra | H04L 12/4641 |
| | | | | 710/316 |
| 7,890,605 B1 | * | 2/2011 | Protassov | H04L 12/4641 |
| | | | | 709/219 |
| 7,945,953 B1 | * | 5/2011 | Salinas | G06F 12/1441 |
| | | | | 726/25 |
| 7,953,903 B1 | * | 5/2011 | Finkelstein | H04L 12/4641 |
| | | | | 712/229 |
| 7,990,994 B1 | * | 8/2011 | Yeh | H04L 12/4641 |
| | | | | 711/147 |
| 7,996,836 B1 | * | 8/2011 | McCorkendale | H04L 63/1408 |
| | | | | 718/1 |

(56) References Cited

U.S. PATENT DOCUMENTS

| | | | | |
|---|---|---|---|---|
| 8,104,083 B1* | 1/2012 | Sobel | ............... | G06F 21/56 |
| | | | | 726/17 |
| 8,132,003 B2* | 3/2012 | Durham | ............... | H04L 9/004 |
| | | | | 718/1 |
| 8,136,158 B1* | 3/2012 | Sehr | ............... | G06F 21/51 |
| | | | | 726/22 |
| 8,145,785 B1* | 3/2012 | Finkelstein | ............... | H04L 49/602 |
| | | | | 709/224 |
| 8,209,704 B1* | 6/2012 | McCann | ............... | G06F 9/545 |
| | | | | 711/147 |
| 8,250,653 B2* | 8/2012 | Wang | ............... | G06F 9/545 |
| | | | | 726/13 |
| 8,266,633 B1 | 9/2012 | Saulsbury et al. | | |
| 8,271,996 B1* | 9/2012 | Gould | ............... | G06F 9/542 |
| | | | | 719/330 |
| 8,285,999 B1* | 10/2012 | Ghose | ............... | H04L 9/3271 |
| | | | | 713/180 |
| 8,381,284 B2* | 2/2013 | Dang | ............... | G06F 9/468 |
| | | | | 718/1 |
| 8,386,788 B2* | 2/2013 | Kozuch | ............... | G06F 9/445 |
| | | | | 713/176 |
| 8,387,075 B1* | 2/2013 | McCann | ............... | G06F 9/52 |
| | | | | 719/328 |
| 8,448,165 B1 | 5/2013 | Conover | | |
| 8,473,724 B1* | 6/2013 | Kenville | ............... | G06F 9/30189 |
| | | | | 712/229 |
| 8,510,369 B1* | 8/2013 | Ekke | ............... | G06F 9/45558 |
| | | | | 709/201 |
| 8,510,756 B1 | 8/2013 | Koryakin | | |
| 8,607,009 B2 | 12/2013 | Nicholas et al. | | |
| 8,656,482 B1 | 2/2014 | Tosa et al. | | |
| 8,707,433 B1* | 4/2014 | Mann | ............... | G06F 11/3003 |
| | | | | 726/22 |
| 8,738,860 B1 | 5/2014 | Griffin | | |
| 8,799,904 B2* | 8/2014 | Kuiper | ............... | G06F 13/24 |
| | | | | 718/100 |
| 8,832,820 B2* | 9/2014 | Barjatiya | ............... | H04L 9/40 |
| | | | | 713/153 |
| 8,843,684 B2* | 9/2014 | Jones | ............... | G06F 9/4812 |
| | | | | 710/265 |
| 8,863,283 B2* | 10/2014 | Sallam | ............... | G06F 21/554 |
| | | | | 726/23 |
| 8,881,145 B2* | 11/2014 | Chiueh | ............... | H04L 41/069 |
| | | | | 718/1 |
| 8,893,258 B2* | 11/2014 | Rao | ............... | H04L 63/08 |
| | | | | 709/227 |
| 8,909,800 B1* | 12/2014 | Grebenschikov | ... | G06F 9/45558 |
| | | | | 709/228 |
| 8,924,964 B2 | 12/2014 | Kodi et al. | | |
| 8,938,723 B1 | 1/2015 | Tormasov | | |
| 8,955,115 B2* | 2/2015 | Sabetta | ............... | H04L 63/1441 |
| | | | | 726/22 |
| 8,996,807 B2 | 3/2015 | Joshi et al. | | |
| 9,003,402 B1 | 4/2015 | Carbone | | |
| 9,009,822 B1 | 4/2015 | Ismael et al. | | |
| 9,009,823 B1 | 4/2015 | Ismael et al. | | |
| 9,009,836 B1* | 4/2015 | Yarykin | ............... | G06F 9/45558 |
| | | | | 726/25 |
| 9,021,163 B1* | 4/2015 | Czarny | ............... | G06F 16/1724 |
| | | | | 710/68 |
| 9,021,498 B1 | 5/2015 | Thimmappa | | |
| 9,043,580 B2* | 5/2015 | Henry | ............... | G06F 9/3017 |
| | | | | 712/209 |
| 9,053,216 B1 | 6/2015 | Coleman | | |
| 9,075,720 B2* | 7/2015 | Blinick | ............... | G06F 12/0891 |
| 9,087,189 B1* | 7/2015 | Koeten | ............... | H04L 41/28 |
| 9,088,569 B2 | 7/2015 | Arroyo et al. | | |
| 9,092,625 B1 | 7/2015 | Kashyap et al. | | |
| 9,159,035 B1* | 10/2015 | Ismael | ............... | G06F 9/45558 |
| 9,172,724 B1 | 10/2015 | Reddy | | |
| 9,176,843 B1* | 11/2015 | Ismael | ............... | G06N 20/00 |
| 9,177,153 B1* | 11/2015 | Perrig | ............... | G06F 21/57 |
| 9,183,399 B2* | 11/2015 | Muff | ............... | G06F 9/45533 |
| 9,189,630 B1* | 11/2015 | Yudin | ............... | G06F 9/45558 |
| 9,201,677 B2 | 12/2015 | Joshi | | |
| 9,203,855 B1* | 12/2015 | Mooring | ............... | G06F 9/455 |
| 9,203,862 B1 | 12/2015 | Kashyap et al. | | |
| 9,213,567 B2 | 12/2015 | Barde | | |
| 9,274,823 B1* | 3/2016 | Koryakin | ............... | G06F 9/45558 |
| 9,274,839 B2 | 3/2016 | Schluessler | | |
| 9,274,974 B1 | 3/2016 | Chen et al. | | |
| 9,286,105 B1* | 3/2016 | Levchenko | ............... | G06F 9/45558 |
| 9,292,350 B1* | 3/2016 | Pendharkar | ............... | G06F 9/45558 |
| 9,317,452 B1 | 4/2016 | Forschmiedt | | |
| 9,372,984 B2* | 6/2016 | Smith | ............... | G06F 21/575 |
| 9,378,044 B1 | 6/2016 | Gaurav et al. | | |
| 9,398,028 B1* | 7/2016 | Karandikar | ............... | G06F 9/45558 |
| 9,424,058 B1 | 8/2016 | Wasson | | |
| 9,424,155 B1 | 8/2016 | Pizel | | |
| 9,430,646 B1 | 8/2016 | Mushtaq | | |
| 9,436,751 B1 | 9/2016 | Serebrin | | |
| 9,438,634 B1 | 9/2016 | Ross | | |
| 9,460,284 B1* | 10/2016 | Hajmasan | ............... | G06F 21/566 |
| 9,465,617 B1 | 10/2016 | Warkentin | | |
| 9,467,476 B1 | 10/2016 | Shieh | | |
| 9,471,514 B1* | 10/2016 | Badishi | ............... | G06F 9/44521 |
| 9,495,210 B1* | 11/2016 | McCann | ............... | G06F 9/52 |
| 9,503,482 B1* | 11/2016 | Hugenbruch | ............... | H04L 63/105 |
| 9,531,735 B1* | 12/2016 | Lukacs | ............... | G06F 9/542 |
| 9,536,084 B1* | 1/2017 | Lukacs | ............... | G06F 9/45558 |
| 9,542,554 B1 | 1/2017 | Salsamendi | | |
| 9,552,225 B2* | 1/2017 | Pope | ............... | G06F 9/4881 |
| 9,563,464 B1 | 2/2017 | Ramasubramanian | | |
| 9,563,569 B2 | 2/2017 | Tsirkin | | |
| 9,575,781 B1 | 2/2017 | Suit | | |
| 9,594,598 B1 | 3/2017 | Brouwer | | |
| 9,596,261 B1* | 3/2017 | Lukacs | ............... | H04L 63/145 |
| 9,612,966 B2 | 4/2017 | Joshi | | |
| 9,619,393 B1 | 4/2017 | Bt et al. | | |
| 9,628,507 B2 | 4/2017 | Haq | | |
| 9,632,848 B1* | 4/2017 | Oldcorn | ............... | G06F 13/102 |
| 9,639,379 B1 | 5/2017 | Suit | | |
| 9,648,045 B2* | 5/2017 | Mooring | ............... | G06F 9/50 |
| 9,652,615 B1 | 5/2017 | Watson | | |
| 9,659,182 B1 | 5/2017 | Roundy | | |
| 9,672,354 B2 | 6/2017 | Lutas et al. | | |
| 9,680,805 B1 | 6/2017 | Rodgers | | |
| 9,686,171 B1 | 6/2017 | Vemuri | | |
| 9,690,606 B1* | 6/2017 | Ha | ............... | G06F 9/45558 |
| 9,747,172 B2 | 8/2017 | Epstein | | |
| 9,753,758 B1 | 9/2017 | Oldenburg | | |
| 9,756,069 B1 | 9/2017 | Li | | |
| 9,792,431 B1* | 10/2017 | Dalal | ............... | G06F 12/1458 |
| 9,805,193 B1 | 10/2017 | Salsamendi | | |
| 9,811,658 B2 | 11/2017 | Martini | | |
| 9,824,209 B1* | 11/2017 | Ismael | ............... | G06F 21/54 |
| 9,846,588 B2 | 12/2017 | Ghosh | | |
| 9,881,157 B1* | 1/2018 | Lukacs | ............... | G06F 3/0619 |
| 9,912,681 B1 | 3/2018 | Ismael | | |
| 9,921,860 B1 | 3/2018 | Banga | | |
| 9,921,978 B1 | 3/2018 | Chan | | |
| 9,922,192 B1 | 3/2018 | Kashyap | | |
| 9,934,376 B1 | 4/2018 | Ismael | | |
| 9,935,829 B1 | 4/2018 | Miller | | |
| 9,942,268 B1 | 4/2018 | Danileiko | | |
| 9,959,188 B1* | 5/2018 | Krishnan | ............... | G06F 9/45533 |
| 9,959,214 B1 | 5/2018 | Habusha | | |
| 9,973,531 B1 | 5/2018 | Thioux | | |
| 9,996,279 B2* | 6/2018 | Gonzalez Diaz | ..... | H04L 9/3234 |
| 9,996,370 B1 | 6/2018 | Khafizov | | |
| 9,996,448 B2* | 6/2018 | Tsirkin | ............... | G06F 11/362 |
| 10,033,747 B1* | 7/2018 | Paithane | ............... | G06F 21/566 |
| 10,033,759 B1 | 7/2018 | Kabra | | |
| 10,049,211 B1* | 8/2018 | Lukacs | ............... | G06F 21/566 |
| 10,051,008 B2* | 8/2018 | Mooring | ............... | G06F 9/45545 |
| 10,061,915 B1* | 8/2018 | Roth | ............... | G06F 21/50 |
| 10,103,959 B2* | 10/2018 | Klein | ............... | H04L 67/60 |
| 10,104,185 B1* | 10/2018 | Sharifi Mehr | ............... | G06F 21/53 |
| 10,152,600 B2* | 12/2018 | Rozas | ............... | G06F 9/45558 |
| 10,162,665 B1 | 12/2018 | Eidelman | | |
| 10,181,034 B2* | 1/2019 | Harrison | ............... | G06F 8/62 |
| 10,303,879 B1 | 5/2019 | Potlapally et al. | | |

(56) References Cited

U.S. PATENT DOCUMENTS

| | | | |
|---|---|---|---|
| 10,348,867 B1* | 7/2019 | Gemignani, Jr. | G06F 16/90339 |
| 10,380,336 B2* | 8/2019 | Suginaka | G06F 21/56 |
| 10,423,435 B1 | 9/2019 | Khafizov et al. | |
| 10,440,000 B2* | 10/2019 | Kumar | G06F 12/1408 |
| 10,474,589 B1* | 11/2019 | Raskin | H04L 63/10 |
| 10,515,019 B1 | 12/2019 | Iyigun | |
| 10,540,524 B2 | 1/2020 | Dementiev et al. | |
| 10,565,382 B1* | 2/2020 | Diamant | H04L 9/0897 |
| 10,616,127 B1 | 4/2020 | Suit | |
| 10,642,501 B1 | 5/2020 | Patel et al. | |
| 10,846,145 B2 | 11/2020 | Xu | |
| 10,963,280 B2 | 3/2021 | Kaplan | |
| 11,150,927 B1* | 10/2021 | Sharifi Mehr | G06F 9/45558 |
| 11,227,056 B2 | 1/2022 | Tang et al. | |
| 11,640,689 B1 | 5/2023 | Nikitenko | |
| 11,928,216 B2* | 3/2024 | Subramanian | G06F 21/575 |
| 2001/0044891 A1* | 11/2001 | McGrath | G06F 9/30112 712/E9.035 |
| 2002/0019902 A1* | 2/2002 | Christie | G06F 9/30134 712/E9.035 |
| 2002/0069400 A1* | 6/2002 | Miloushev | G06F 8/70 717/108 |
| 2002/0120809 A1* | 8/2002 | Machida | G06F 9/4812 711/100 |
| 2002/0169979 A1* | 11/2002 | Zimmer | G06F 9/4401 707/999.009 |
| 2002/0194389 A1* | 12/2002 | Worley, Jr. | G06F 9/4812 719/310 |
| 2003/0033507 A1* | 2/2003 | McGrath | G06F 9/30192 712/225 |
| 2003/0093579 A1* | 5/2003 | Zimmer | G06F 9/4812 719/318 |
| 2003/0093686 A1* | 5/2003 | Barnes | G06F 12/1054 711/E12.068 |
| 2003/0126349 A1* | 7/2003 | Nalawadi | G06F 9/4812 711/2 |
| 2003/0135504 A1* | 7/2003 | Elvanoglu | G06F 16/986 707/E17.118 |
| 2003/0145194 A1* | 7/2003 | O'Shea | G06F 15/177 713/1 |
| 2004/0117539 A1* | 6/2004 | Bennett | G06F 9/45558 711/170 |
| 2004/0122834 A1* | 6/2004 | Durrant | G06F 9/468 712/E9.082 |
| 2004/0123288 A1* | 6/2004 | Bennett | G06F 9/45558 718/1 |
| 2004/0215899 A1* | 10/2004 | Arimilli | G06F 9/52 711/146 |
| 2005/0027914 A1* | 2/2005 | Hammalund | G06F 9/4812 710/260 |
| 2005/0060722 A1* | 3/2005 | Rochette | G06F 8/60 719/319 |
| 2005/0071127 A1* | 3/2005 | Mandal | G06F 11/3017 702/186 |
| 2005/0076186 A1* | 4/2005 | Traut | G06F 9/45558 718/1 |
| 2005/0120160 A1* | 6/2005 | Plouffe | G06F 9/505 711/1 |
| 2005/0120219 A1* | 6/2005 | Munetoh | G06F 21/57 713/176 |
| 2005/0165983 A1* | 7/2005 | Nam | H04L 65/80 710/52 |
| 2005/0223199 A1* | 10/2005 | Grochowski | G06F 9/384 712/E9.032 |
| 2005/0228631 A1* | 10/2005 | Maly | G06F 30/33 703/22 |
| 2005/0228980 A1* | 10/2005 | Brokish | G06F 12/12 713/2 |
| 2005/0246453 A1 | 11/2005 | Erlingsson | |
| 2006/0026385 A1 | 2/2006 | Dinechin et al. | |
| 2006/0026577 A1 | 2/2006 | Dinechin et al. | |
| 2006/0064567 A1 | 3/2006 | Jacobson | |
| 2006/0075381 A1* | 4/2006 | Laborczfalvi | G06F 9/468 717/100 |
| 2006/0075402 A1* | 4/2006 | Neiger | G06F 9/45558 718/1 |
| 2006/0117325 A1* | 6/2006 | Wieland | G06F 9/468 719/321 |
| 2006/0130016 A1* | 6/2006 | Wagner | G06F 9/54 717/136 |
| 2006/0136608 A1* | 6/2006 | Gilbert | G06F 9/30043 710/3 |
| 2006/0161719 A1* | 7/2006 | Bennett | G06F 9/45558 711/6 |
| 2006/0161918 A1* | 7/2006 | Giers | G06F 11/1658 714/E11.063 |
| 2006/0184948 A1* | 8/2006 | Cox | G06F 9/545 719/313 |
| 2006/0190945 A1* | 8/2006 | Kissell | G06F 9/4881 718/108 |
| 2006/0190946 A1* | 8/2006 | Kissell | G06F 9/4812 718/108 |
| 2006/0195683 A1* | 8/2006 | Kissell | G06F 9/4812 712/228 |
| 2006/0206892 A1* | 9/2006 | Vega | G06F 9/4843 718/1 |
| 2006/0242700 A1* | 10/2006 | Fischer | G06F 11/0706 712/E9.082 |
| 2006/0282624 A1 | 12/2006 | Yokota | |
| 2007/0022474 A1 | 1/2007 | Rowett | |
| 2007/0022479 A1 | 1/2007 | Sikdar | |
| 2007/0028244 A1 | 2/2007 | Landis | |
| 2007/0043531 A1* | 2/2007 | Kosche | G06F 11/3476 702/182 |
| 2007/0050763 A1 | 3/2007 | Kagan | |
| 2007/0050764 A1* | 3/2007 | Traut | G06F 9/45558 718/1 |
| 2007/0061441 A1 | 3/2007 | Landis | |
| 2007/0074208 A1 | 3/2007 | Ling | |
| 2007/0079090 A1* | 4/2007 | Rajagopal | G06F 12/1491 711/163 |
| 2007/0130569 A1* | 6/2007 | Heffley | G06F 9/4812 718/108 |
| 2007/0136577 A1* | 6/2007 | Bade | G06F 21/57 713/164 |
| 2007/0156978 A1* | 7/2007 | Dixon | G06F 12/1491 711/E12.099 |
| 2007/0180436 A1* | 8/2007 | Travostino | G06F 9/4856 717/138 |
| 2007/0234020 A1* | 10/2007 | Jensen | G06F 9/3004 712/244 |
| 2007/0261102 A1 | 11/2007 | Spataro | |
| 2007/0266389 A1* | 11/2007 | Ganguly | G06F 9/45558 718/104 |
| 2007/0300219 A1 | 12/2007 | Devaux | |
| 2008/0005297 A1 | 1/2008 | Nos | |
| 2008/0015808 A1* | 1/2008 | Wilson | G06F 21/51 702/123 |
| 2008/0016314 A1* | 1/2008 | Li | H04L 63/1441 711/E12.091 |
| 2008/0016339 A1* | 1/2008 | Shukla | G06F 21/54 713/164 |
| 2008/0028461 A1* | 1/2008 | Pouliot | G06F 21/54 726/21 |
| 2008/0034194 A1* | 2/2008 | Peak | G06F 9/4812 712/244 |
| 2008/0040715 A1* | 2/2008 | Cota-Robles | G06F 11/348 718/1 |
| 2008/0046679 A1* | 2/2008 | Bennett | G06F 12/1009 711/E12.059 |
| 2008/0046725 A1* | 2/2008 | Lo | G06F 9/4812 713/165 |
| 2008/0059677 A1* | 3/2008 | Archer | G06F 9/4812 710/262 |
| 2008/0065838 A1* | 3/2008 | Pope | G06F 9/545 711/152 |

(56) References Cited

U.S. PATENT DOCUMENTS

| | | |
|---|---|---|
| 2008/0065839 A1* | 3/2008 | Pope .................. G06F 9/545 711/152 |
| 2008/0072223 A1 | 3/2008 | Cowperthwaite et al. |
| 2008/0072236 A1* | 3/2008 | Pope .................. H04L 45/00 712/225 |
| 2008/0077767 A1* | 3/2008 | Khosravi ............ G06F 12/1475 711/216 |
| 2008/0082772 A1* | 4/2008 | Savagaonkar ...... G06F 12/1491 711/163 |
| 2008/0114985 A1* | 5/2008 | Savagaonkar .......... G06F 21/64 713/181 |
| 2008/0147353 A1* | 6/2008 | Ford ...................... G06F 21/552 702/179 |
| 2008/0148259 A1* | 6/2008 | Hankins ................ G06F 9/3851 718/100 |
| 2008/0155154 A1* | 6/2008 | Kenan ................... H04L 69/16 710/263 |
| 2008/0163254 A1 | 7/2008 | Cota-Robles et al. |
| 2008/0163366 A1* | 7/2008 | Chinya ............... G06F 12/1027 726/21 |
| 2008/0168258 A1* | 7/2008 | Armstrong ............. G06F 9/468 712/43 |
| 2008/0168479 A1* | 7/2008 | Purtell ................ G06F 9/45558 718/1 |
| 2008/0184373 A1* | 7/2008 | Traut .................. G06F 12/1491 711/163 |
| 2008/0222160 A1* | 9/2008 | MacDonald .............. G06F 8/61 |
| 2008/0244155 A1* | 10/2008 | Lee ................... G06F 12/1491 711/6 |
| 2008/0244206 A1* | 10/2008 | Heo ....................... G06F 12/145 711/E12.091 |
| 2008/0250222 A1 | 10/2008 | Gokhale |
| 2008/0256336 A1* | 10/2008 | Henry ................ G06F 9/30101 712/225 |
| 2008/0271014 A1* | 10/2008 | Serebrin ............ G06F 9/45558 718/1 |
| 2008/0313647 A1* | 12/2008 | Klein .................. G06F 9/45537 719/313 |
| 2008/0313656 A1* | 12/2008 | Klein ...................... G06F 9/544 719/320 |
| 2009/0007100 A1* | 1/2009 | Field ..................... G06F 21/566 718/1 |
| 2009/0013406 A1* | 1/2009 | Cabuk ..................... G06F 21/57 726/22 |
| 2009/0037682 A1* | 2/2009 | Armstrong .......... G06F 9/45558 718/1 |
| 2009/0037908 A1 | 2/2009 | Armstrong |
| 2009/0037936 A1* | 2/2009 | Serebrin ............. G06F 12/0292 719/318 |
| 2009/0037941 A1 | 2/2009 | Armstrong |
| 2009/0044274 A1* | 2/2009 | Budko ................ G06F 9/45558 718/1 |
| 2009/0063835 A1 | 3/2009 | Yao |
| 2009/0070760 A1* | 3/2009 | Khatri .................. G06F 9/5044 718/1 |
| 2009/0083522 A1* | 3/2009 | Boggs .................. G05B 19/056 712/E9.023 |
| 2009/0113425 A1* | 4/2009 | Ports ..................... G06F 9/4881 718/1 |
| 2009/0119087 A1 | 5/2009 | Ang |
| 2009/0119748 A1* | 5/2009 | Yao ........................ G06F 21/57 726/2 |
| 2009/0133016 A1 | 5/2009 | Brown |
| 2009/0138625 A1* | 5/2009 | Lee ........................ G06F 13/28 719/321 |
| 2009/0138729 A1* | 5/2009 | Hashimoto ............. G06F 21/54 713/193 |
| 2009/0164709 A1* | 6/2009 | Lee ....................... G06F 12/023 711/170 |
| 2009/0165132 A1* | 6/2009 | Jain ...................... G06F 21/554 726/22 |
| 2009/0172328 A1* | 7/2009 | Sahita ................. G06F 12/1433 711/163 |
| 2009/0198862 A1 | 8/2009 | Okitsu |
| 2009/0204965 A1 | 8/2009 | Tanaka |
| 2009/0204978 A1* | 8/2009 | Lee ....................... G06F 9/4812 719/321 |
| 2009/0210888 A1* | 8/2009 | Lee ..................... G06F 9/45558 719/321 |
| 2009/0216984 A1 | 8/2009 | Gainey, Jr. |
| 2009/0217098 A1 | 8/2009 | Farrell |
| 2009/0217264 A1 | 8/2009 | Heller |
| 2009/0228673 A1* | 9/2009 | Waters ................ G06F 12/1491 711/163 |
| 2009/0249053 A1 | 10/2009 | Zimmer et al. |
| 2009/0254990 A1* | 10/2009 | McGee .................. G06F 21/50 726/22 |
| 2009/0259875 A1 | 10/2009 | Check et al. |
| 2009/0288167 A1* | 11/2009 | Freericks ............. G06F 21/554 726/23 |
| 2009/0293057 A1* | 11/2009 | Larkin .................... G06F 21/53 718/1 |
| 2009/0313445 A1 | 12/2009 | Pandey |
| 2009/0320042 A1* | 12/2009 | Thelen .................. G06F 3/0665 710/262 |
| 2009/0320129 A1* | 12/2009 | Pan ........................ G06F 21/54 726/22 |
| 2009/0327576 A1 | 12/2009 | Oshins |
| 2009/0328035 A1 | 12/2009 | Ganguly |
| 2009/0328058 A1* | 12/2009 | Papaefstathiou ........ G06F 9/545 718/107 |
| 2009/0328074 A1 | 12/2009 | Oshins |
| 2010/0023666 A1 | 1/2010 | Mansell |
| 2010/0031325 A1 | 2/2010 | Maigne et al. |
| 2010/0031360 A1* | 2/2010 | Seshadri ................ G06F 21/74 726/28 |
| 2010/0064117 A1* | 3/2010 | Henry ..................... G06F 21/72 713/184 |
| 2010/0083261 A1* | 4/2010 | Jayamohan ............. G06F 9/461 718/102 |
| 2010/0083275 A1* | 4/2010 | Jayamohan ........... G06F 13/1626 718/108 |
| 2010/0088771 A1 | 4/2010 | Heller et al. |
| 2010/0094613 A1 | 4/2010 | Biles et al. |
| 2010/0122250 A1* | 5/2010 | Challener ................ G06F 8/61 718/1 |
| 2010/0131729 A1* | 5/2010 | Fulcheri ................. G06F 21/79 711/E12.001 |
| 2010/0131966 A1* | 5/2010 | Coleman ................. G06F 9/545 719/321 |
| 2010/0138843 A1* | 6/2010 | Freericks ................ G06F 9/545 719/318 |
| 2010/0161875 A1 | 6/2010 | Chang et al. |
| 2010/0161976 A1* | 6/2010 | Bacher ................ G06F 12/1009 711/130 |
| 2010/0161978 A1* | 6/2010 | Bacher ................... G06F 9/545 713/166 |
| 2010/0169948 A1* | 7/2010 | Budko .................... G06F 21/53 706/53 |
| 2010/0169968 A1* | 7/2010 | Shanbhogue ....... G06F 12/1408 711/E12.002 |
| 2010/0191889 A1* | 7/2010 | Serebrin ................ G06F 9/4812 718/1 |
| 2010/0223447 A1* | 9/2010 | Serebrin .................... G06F 9/34 712/225 |
| 2010/0223612 A1 | 9/2010 | Osisek et al. |
| 2010/0235645 A1* | 9/2010 | Henry ..................... G06F 21/72 713/183 |
| 2010/0241734 A1 | 9/2010 | Miyajima |
| 2010/0242039 A1 | 9/2010 | Noguchi |
| 2010/0250230 A1* | 9/2010 | Ganguly ............. G06F 9/45558 713/178 |
| 2010/0250824 A1 | 9/2010 | Belay |
| 2010/0250869 A1* | 9/2010 | Adams ................ G06F 12/0802 718/1 |
| 2010/0250895 A1 | 9/2010 | Adams et al. |
| 2010/0251235 A1* | 9/2010 | Ganguly ............. G06F 9/45558 718/1 |

(56) References Cited

U.S. PATENT DOCUMENTS

| | | |
|---|---|---|
| 2010/0262722 A1 | 10/2010 | Vauthier et al. |
| 2010/0262743 A1* | 10/2010 | Zimmer ............... G06F 9/4812 710/267 |
| 2010/0281273 A1 | 11/2010 | Lee et al. |
| 2010/0299665 A1* | 11/2010 | Adams ............... G06F 9/45545 718/1 |
| 2010/0313201 A1 | 12/2010 | Warton et al. |
| 2010/0318997 A1* | 12/2010 | Li ....................... G06F 9/45558 718/1 |
| 2011/0010533 A1* | 1/2011 | Buford .................. G06F 9/468 726/1 |
| 2011/0016508 A1* | 1/2011 | Wallace ............... G06F 21/604 717/136 |
| 2011/0055469 A1* | 3/2011 | Natu .................... G06F 9/3851 711/E12.078 |
| 2011/0082962 A1 | 4/2011 | Horovitz |
| 2011/0099627 A1* | 4/2011 | Proudler ............... G06F 21/57 711/E12.001 |
| 2011/0102443 A1 | 5/2011 | Dror |
| 2011/0107007 A1* | 5/2011 | van Riel ............. G06F 9/45558 718/1 |
| 2011/0107331 A1* | 5/2011 | Evans .................... H04W 4/60 718/1 |
| 2011/0107339 A1* | 5/2011 | Cabrera ................. G06F 9/545 711/E12.001 |
| 2011/0122884 A1* | 5/2011 | Tsirkin ................... G06F 9/544 370/412 |
| 2011/0126205 A1* | 5/2011 | Gaist .................... G06F 21/554 718/103 |
| 2011/0126217 A1* | 5/2011 | Gaist .................... G06F 9/5027 719/321 |
| 2011/0141124 A1* | 6/2011 | Halls ....................... G06F 21/85 345/522 |
| 2011/0145552 A1* | 6/2011 | Yamada ............... G06F 9/3836 712/228 |
| 2011/0153909 A1 | 6/2011 | Dong |
| 2011/0153926 A1* | 6/2011 | Fang .................... G06F 12/1491 711/E12.001 |
| 2011/0154010 A1* | 6/2011 | Springfield ............ G06F 21/57 713/150 |
| 2011/0154133 A1 | 6/2011 | Ganti |
| 2011/0167195 A1 | 7/2011 | Scales |
| 2011/0167422 A1* | 7/2011 | Eom ................... G06F 9/45558 718/1 |
| 2011/0167434 A1* | 7/2011 | Gaist .................... G06F 9/545 719/320 |
| 2011/0173643 A1* | 7/2011 | Nicolson ............... G06F 21/575 719/328 |
| 2011/0179417 A1* | 7/2011 | Inakoshi ............. G06F 9/45558 718/1 |
| 2011/0197004 A1* | 8/2011 | Serebrin ............. G06F 9/45558 710/267 |
| 2011/0197190 A1 | 8/2011 | Hattori |
| 2011/0202917 A1 | 8/2011 | Laor |
| 2011/0202919 A1* | 8/2011 | Hayakawa .......... G06F 9/45558 718/1 |
| 2011/0219208 A1* | 9/2011 | Asaad ..................... G06F 9/06 712/12 |
| 2011/0219447 A1* | 9/2011 | Horovitz ............... G06F 21/566 726/22 |
| 2011/0225458 A1 | 9/2011 | Zuo |
| 2011/0225624 A1* | 9/2011 | Sawhney ............. G06F 9/45558 718/1 |
| 2011/0231839 A1* | 9/2011 | Bennett ................ G06F 3/0683 718/1 |
| 2011/0239213 A1 | 9/2011 | Aswani |
| 2011/0239306 A1* | 9/2011 | Avni .................... G06F 21/62 726/26 |
| 2011/0246171 A1 | 10/2011 | Cleeton |
| 2011/0246986 A1 | 10/2011 | Nicholas |
| 2011/0270944 A1* | 11/2011 | Keilhau ................. G06F 9/545 709/212 |
| 2011/0295984 A1 | 12/2011 | Kunze |
| 2011/0302577 A1 | 12/2011 | Reuther |
| 2011/0307681 A1 | 12/2011 | Piry |
| 2011/0307888 A1 | 12/2011 | Raj |
| 2011/0320652 A1 | 12/2011 | Craddock |
| 2011/0320682 A1 | 12/2011 | Mcdougall |
| 2011/0320772 A1 | 12/2011 | Craddock |
| 2011/0320823 A1* | 12/2011 | Saroiu .................. H04L 9/3247 713/189 |
| 2011/0321158 A1 | 12/2011 | Craddock |
| 2012/0030518 A1* | 2/2012 | Rajwar ..................... G06F 9/38 714/45 |
| 2012/0033673 A1* | 2/2012 | Goel ..................... G06F 9/5077 370/400 |
| 2012/0042034 A1 | 2/2012 | Goggin |
| 2012/0042145 A1* | 2/2012 | Sehr ....................... G06F 21/53 711/E12.091 |
| 2012/0047313 A1 | 2/2012 | Sinha et al. |
| 2012/0047369 A1* | 2/2012 | Henry .................... G06F 21/79 713/182 |
| 2012/0054740 A1 | 3/2012 | Chakraborty |
| 2012/0054877 A1* | 3/2012 | Rosu .................. G06F 9/45545 726/30 |
| 2012/0066681 A1 | 3/2012 | Levy |
| 2012/0072638 A1 | 3/2012 | Grubb |
| 2012/0075314 A1 | 3/2012 | Malakapalli |
| 2012/0079164 A1 | 3/2012 | Hakewill |
| 2012/0079479 A1 | 3/2012 | Hakewill |
| 2012/0084487 A1* | 4/2012 | Barde ................. G06F 9/45541 718/1 |
| 2012/0084777 A1* | 4/2012 | Jayamohan .......... G06F 9/5044 718/1 |
| 2012/0102334 A1* | 4/2012 | O'Loughlin .......... H04L 9/3252 713/189 |
| 2012/0110237 A1* | 5/2012 | Li ........................ G06F 9/4856 711/6 |
| 2012/0131309 A1 | 5/2012 | Johnson et al. |
| 2012/0131575 A1 | 5/2012 | Yehuda |
| 2012/0144489 A1* | 6/2012 | Jarrett ................. G06F 9/45558 726/24 |
| 2012/0147021 A1* | 6/2012 | Cheng ..................... G06F 9/545 345/522 |
| 2012/0151117 A1 | 6/2012 | Tuch |
| 2012/0151206 A1* | 6/2012 | Paris ....................... H04L 63/08 726/5 |
| 2012/0166767 A1* | 6/2012 | Patel ..................... G06F 9/342 712/205 |
| 2012/0173842 A1 | 7/2012 | Frey |
| 2012/0179855 A1 | 7/2012 | Tsirkin |
| 2012/0185688 A1 | 7/2012 | Thornton et al. |
| 2012/0188258 A1* | 7/2012 | Mccrary ................. G06F 9/545 345/502 |
| 2012/0194524 A1* | 8/2012 | Hartog .................. G06F 9/4812 345/501 |
| 2012/0198278 A1* | 8/2012 | Williams ............. G06F 11/3656 714/E11.17 |
| 2012/0200579 A1* | 8/2012 | Hartog .................. G06F 9/4881 345/503 |
| 2012/0203890 A1* | 8/2012 | Reynolds ........... G06F 9/45558 709/224 |
| 2012/0204193 A1* | 8/2012 | Nethercutt .......... G06F 11/3495 719/330 |
| 2012/0216281 A1 | 8/2012 | Uner |
| 2012/0227045 A1* | 9/2012 | Knauth ................ G06F 11/3048 718/100 |
| 2012/0233434 A1 | 9/2012 | Starks |
| 2012/0233608 A1* | 9/2012 | Toeroe ................ G06F 9/45558 718/1 |
| 2012/0240112 A1* | 9/2012 | Nishiguchi .......... G06F 9/45558 718/1 |
| 2012/0240181 A1* | 9/2012 | McCorkendale ....... G06F 21/53 726/1 |
| 2012/0246641 A1 | 9/2012 | Gehrmann |
| 2012/0254982 A1* | 10/2012 | Sallam ................. G06F 21/566 726/16 |
| 2012/0254993 A1* | 10/2012 | Sallam ................ G06F 9/45558 718/1 |

(56) References Cited

U.S. PATENT DOCUMENTS

| | | | |
|---|---|---|---|
| 2012/0254994 A1* | 10/2012 | Sallam | G06F 21/554 726/22 |
| 2012/0254995 A1* | 10/2012 | Sallam | G06F 21/52 726/22 |
| 2012/0254999 A1* | 10/2012 | Sallam | G06F 21/566 726/23 |
| 2012/0255000 A1* | 10/2012 | Sallam | G06F 21/566 726/23 |
| 2012/0255001 A1* | 10/2012 | Sallam | G06F 21/566 726/23 |
| 2012/0255002 A1* | 10/2012 | Sallam | G06F 21/566 726/23 |
| 2012/0255003 A1* | 10/2012 | Sallam | G06F 21/554 726/23 |
| 2012/0255004 A1* | 10/2012 | Sallam | G06F 21/554 726/23 |
| 2012/0255010 A1* | 10/2012 | Sallam | H04L 63/0227 726/24 |
| 2012/0255011 A1* | 10/2012 | Sallam | G06F 21/53 726/24 |
| 2012/0255012 A1* | 10/2012 | Sallam | G06F 21/554 726/23 |
| 2012/0255013 A1* | 10/2012 | Sallam | G06F 21/564 726/24 |
| 2012/0255014 A1* | 10/2012 | Sallam | G06F 21/554 726/24 |
| 2012/0255016 A1* | 10/2012 | Sallam | G06F 21/566 726/24 |
| 2012/0255017 A1* | 10/2012 | Sallam | G06F 9/45558 726/24 |
| 2012/0255018 A1* | 10/2012 | Sallam | G06F 21/566 726/24 |
| 2012/0255021 A1* | 10/2012 | Sallam | G06F 21/564 726/25 |
| 2012/0255031 A1* | 10/2012 | Sallam | G06F 21/53 726/27 |
| 2012/0260065 A1* | 10/2012 | Henry | G06F 9/3017 712/41 |
| 2012/0260123 A1* | 10/2012 | Madampath | G06F 11/1446 714/E11.073 |
| 2012/0266252 A1* | 10/2012 | Spiers | H04L 9/3247 726/26 |
| 2012/0278525 A1 | 11/2012 | Serebrin | |
| 2012/0278800 A1 | 11/2012 | Nicholas | |
| 2012/0297057 A1 | 11/2012 | Ghosh | |
| 2012/0311307 A1* | 12/2012 | Chynoweth | G06F 11/348 712/234 |
| 2012/0311315 A1* | 12/2012 | Ekberg | G06F 21/57 713/2 |
| 2012/0311580 A1* | 12/2012 | Emelianov | G06F 9/45558 718/100 |
| 2012/0317570 A1* | 12/2012 | Dalcher | G06F 21/53 718/1 |
| 2012/0317585 A1 | 12/2012 | Elko | |
| 2012/0324442 A1 | 12/2012 | Barde | |
| 2012/0331464 A1 | 12/2012 | Saito | |
| 2012/0331480 A1* | 12/2012 | Ertugay | G06F 9/545 719/312 |
| 2013/0007469 A1* | 1/2013 | Aratsu | G06F 21/606 713/190 |
| 2013/0007470 A1* | 1/2013 | Violleau | G06F 21/54 713/193 |
| 2013/0031291 A1 | 1/2013 | Edwards | |
| 2013/0031292 A1 | 1/2013 | Van Riel | |
| 2013/0031293 A1 | 1/2013 | Van Riel | |
| 2013/0042115 A1* | 2/2013 | Sweet | G06F 21/577 713/176 |
| 2013/0055340 A1* | 2/2013 | Kanai | G06F 21/53 726/1 |
| 2013/0061056 A1* | 3/2013 | Proudler | G06F 21/57 713/176 |
| 2013/0061096 A1 | 3/2013 | McCoy | |
| 2013/0061250 A1* | 3/2013 | Kothandapani | G06F 9/45537 719/320 |
| 2013/0067199 A1* | 3/2013 | Henry | G06F 9/30189 712/E9.035 |
| 2013/0067245 A1* | 3/2013 | Horovitz | G06F 21/57 713/193 |
| 2013/0086299 A1* | 4/2013 | Epstein | G06F 9/44563 711/6 |
| 2013/0086550 A1 | 4/2013 | Epstein | |
| 2013/0086581 A1 | 4/2013 | Frazier | |
| 2013/0086696 A1* | 4/2013 | Austin | G06F 21/54 726/28 |
| 2013/0091318 A1 | 4/2013 | Bhattacharjee | |
| 2013/0091500 A1 | 4/2013 | Earl | |
| 2013/0091543 A1* | 4/2013 | Wade | G06F 21/53 726/1 |
| 2013/0091568 A1 | 4/2013 | Sharif | |
| 2013/0103380 A1* | 4/2013 | Brandstatter | G06F 9/45558 703/26 |
| 2013/0107872 A1* | 5/2013 | Lovett | H04L 49/00 370/352 |
| 2013/0111593 A1* | 5/2013 | Shankar | G06F 21/54 726/25 |
| 2013/0117766 A1* | 5/2013 | Bax | G06F 9/4401 719/323 |
| 2013/0132702 A1* | 5/2013 | Patel | G06F 12/109 711/202 |
| 2013/0138863 A1 | 5/2013 | Tsirkin | |
| 2013/0139216 A1* | 5/2013 | Austin | G06F 21/12 726/1 |
| 2013/0139264 A1* | 5/2013 | Brinkley | G06F 21/54 726/23 |
| 2013/0148669 A1 | 6/2013 | Noguchi | |
| 2013/0152207 A1 | 6/2013 | Cui et al. | |
| 2013/0152209 A1* | 6/2013 | Baumann | G06F 21/74 726/26 |
| 2013/0155079 A1* | 6/2013 | Hartog | G06F 9/4812 345/522 |
| 2013/0160114 A1 | 6/2013 | Greenwood | |
| 2013/0167149 A1 | 6/2013 | Mitsugi | |
| 2013/0174144 A1 | 7/2013 | Cheng | |
| 2013/0174148 A1 | 7/2013 | Amit | |
| 2013/0179892 A1 | 7/2013 | Frazier | |
| 2013/0185720 A1 | 7/2013 | Tuch | |
| 2013/0185721 A1 | 7/2013 | Ikegami | |
| 2013/0185737 A1 | 7/2013 | Farrell | |
| 2013/0185739 A1 | 7/2013 | Farrell | |
| 2013/0191824 A1 | 7/2013 | Muff | |
| 2013/0205295 A1* | 8/2013 | Ebcioglu | G06F 15/7871 718/1 |
| 2013/0219389 A1* | 8/2013 | Serebrin | G06F 9/45533 718/1 |
| 2013/0227559 A1 | 8/2013 | Tsirkin | |
| 2013/0227568 A1* | 8/2013 | Anderson | G06F 9/455 718/1 |
| 2013/0229421 A1 | 9/2013 | Cheng | |
| 2013/0232238 A1 | 9/2013 | Cohn | |
| 2013/0237204 A1 | 9/2013 | Buck | |
| 2013/0246995 A1* | 9/2013 | Ferrao | G06F 8/35 717/104 |
| 2013/0257594 A1 | 10/2013 | Collins | |
| 2013/0275997 A1* | 10/2013 | Soares | G06F 9/544 719/312 |
| 2013/0276056 A1 | 10/2013 | Epstein | |
| 2013/0276057 A1* | 10/2013 | Smith | G06F 9/45558 726/1 |
| 2013/0283295 A1* | 10/2013 | Glover | G06F 9/545 719/318 |
| 2013/0283370 A1 | 10/2013 | Vipat et al. | |
| 2013/0312098 A1* | 11/2013 | Kapoor | G06F 21/554 726/24 |
| 2013/0312099 A1* | 11/2013 | Edwards | G06F 21/554 726/24 |
| 2013/0316754 A1 | 11/2013 | Skog | |
| 2013/0326504 A1 | 12/2013 | Tsirkin | |
| 2013/0333040 A1 | 12/2013 | Diehl et al. | |
| 2013/0339960 A1 | 12/2013 | Greiner et al. | |

(56) References Cited

U.S. PATENT DOCUMENTS

| | | | |
|---|---|---|---|
| 2014/0006661 A1* | 1/2014 | Chappell | G06F 13/42 710/105 |
| 2014/0006734 A1 | 1/2014 | Li et al. | |
| 2014/0006804 A1 | 1/2014 | Tkacik | |
| 2014/0007091 A1 | 1/2014 | Arges | |
| 2014/0025939 A1* | 1/2014 | Smith | G06F 9/4401 713/2 |
| 2014/0033266 A1* | 1/2014 | Kim | G06F 21/00 726/1 |
| 2014/0053272 A1* | 2/2014 | Lukacs | G06F 21/53 718/1 |
| 2014/0059302 A1 | 2/2014 | Hayakawa | |
| 2014/0059642 A1* | 2/2014 | Deasy | H04W 12/00 726/1 |
| 2014/0068612 A1 | 3/2014 | Torrey | |
| 2014/0068636 A1* | 3/2014 | Dupont | G06F 9/46 719/318 |
| 2014/0101311 A1* | 4/2014 | Smeets | G06F 21/57 709/224 |
| 2014/0101402 A1 | 4/2014 | Gschwind | |
| 2014/0101406 A1 | 4/2014 | Gschwind | |
| 2014/0101657 A1 | 4/2014 | Bacher | |
| 2014/0104287 A1* | 4/2014 | Nalluri | G06F 21/74 345/522 |
| 2014/0115652 A1* | 4/2014 | Kapoor | H04L 63/20 726/1 |
| 2014/0115701 A1* | 4/2014 | Moshchuk | G06F 21/51 726/23 |
| 2014/0137114 A1 | 5/2014 | Bolte | |
| 2014/0149634 A1 | 5/2014 | Tosatti | |
| 2014/0149779 A1 | 5/2014 | Allen-Ware | |
| 2014/0149795 A1 | 5/2014 | Musha | |
| 2014/0156872 A1* | 6/2014 | Buer | G06F 21/53 710/8 |
| 2014/0157258 A1 | 6/2014 | Dow | |
| 2014/0165056 A1 | 6/2014 | Ghai | |
| 2014/0173169 A1* | 6/2014 | Liu | G06F 9/45558 711/6 |
| 2014/0173293 A1* | 6/2014 | Kaplan | G06F 21/54 713/190 |
| 2014/0181533 A1* | 6/2014 | Boivie | G06F 3/067 713/190 |
| 2014/0189194 A1* | 7/2014 | Sahita | G06F 12/109 711/6 |
| 2014/0189687 A1 | 7/2014 | Jung | |
| 2014/0196059 A1* | 7/2014 | Weinsberg | G06F 9/4403 719/327 |
| 2014/0215467 A1 | 7/2014 | Niesser | |
| 2014/0223556 A1* | 8/2014 | Bignon | G06F 9/45558 726/22 |
| 2014/0229938 A1 | 8/2014 | Tsirkin | |
| 2014/0229943 A1* | 8/2014 | Tian | G06F 9/45533 718/1 |
| 2014/0230077 A1 | 8/2014 | Muff | |
| 2014/0237586 A1* | 8/2014 | Itani | G06F 21/57 726/16 |
| 2014/0244949 A1 | 8/2014 | Abali | |
| 2014/0245444 A1* | 8/2014 | Lutas | H04L 63/1441 726/24 |
| 2014/0245446 A1* | 8/2014 | Shanmugavelayutham | G06F 21/54 726/24 |
| 2014/0250286 A1 | 9/2014 | Kondo | |
| 2014/0258663 A1* | 9/2014 | Zeng | G06F 12/1491 711/163 |
| 2014/0258716 A1 | 9/2014 | Macmillan | |
| 2014/0281694 A1 | 9/2014 | Gotsubo | |
| 2014/0282507 A1 | 9/2014 | Plondke | |
| 2014/0282539 A1 | 9/2014 | Sonnek | |
| 2014/0282542 A1* | 9/2014 | Smith | H04L 49/70 718/1 |
| 2014/0283036 A1* | 9/2014 | Salamat | G06F 9/5016 726/22 |
| 2014/0283040 A1* | 9/2014 | Wilkerson | G06F 12/145 726/22 |
| 2014/0283056 A1* | 9/2014 | Bachwani | G06F 9/45558 726/23 |
| 2014/0304814 A1 | 10/2014 | Ott | |
| 2014/0317731 A1* | 10/2014 | Ionescu | G06F 9/44521 726/22 |
| 2014/0351930 A1* | 11/2014 | Sun | G06F 21/74 726/22 |
| 2014/0358972 A1 | 12/2014 | Guarrieri | |
| 2014/0359229 A1 | 12/2014 | Cota-Robles | |
| 2014/0372719 A1* | 12/2014 | Lange | H04L 63/10 711/163 |
| 2014/0372751 A1* | 12/2014 | Silverstone | G06F 21/60 726/4 |
| 2014/0373005 A1 | 12/2014 | Agrawal | |
| 2014/0379955 A1 | 12/2014 | Dong | |
| 2014/0379956 A1 | 12/2014 | Chang | |
| 2015/0013008 A1* | 1/2015 | Lukacs | G06F 21/53 726/24 |
| 2015/0026807 A1* | 1/2015 | Lutas | G06F 21/54 711/6 |
| 2015/0032946 A1* | 1/2015 | Goss | G06F 21/79 711/103 |
| 2015/0033227 A1 | 1/2015 | Lin et al. | |
| 2015/0033305 A1 | 1/2015 | Shear | |
| 2015/0039891 A1 | 2/2015 | Ignatchenko | |
| 2015/0052607 A1* | 2/2015 | Al Hamami | G06F 21/552 726/23 |
| 2015/0058619 A1* | 2/2015 | Sweet | G06F 21/56 713/155 |
| 2015/0067672 A1 | 3/2015 | Mitra | |
| 2015/0074665 A1 | 3/2015 | Kamino | |
| 2015/0082305 A1 | 3/2015 | Hepkin et al. | |
| 2015/0089502 A1* | 3/2015 | Horovitz | G06F 9/45558 718/1 |
| 2015/0089645 A1* | 3/2015 | Vandergeest | G06F 21/54 726/23 |
| 2015/0095548 A1 | 4/2015 | Tsirkin | |
| 2015/0100791 A1* | 4/2015 | Chen | G06F 21/6218 713/189 |
| 2015/0101049 A1* | 4/2015 | Lukacs | H04L 63/14 726/23 |
| 2015/0106572 A1* | 4/2015 | Stone | G06F 11/3644 711/147 |
| 2015/0121135 A1* | 4/2015 | Pape | G06F 11/0712 718/1 |
| 2015/0143055 A1 | 5/2015 | Guthrie | |
| 2015/0143362 A1 | 5/2015 | Lukacs | |
| 2015/0146715 A1 | 5/2015 | Olivier | |
| 2015/0146716 A1 | 5/2015 | Olivier | |
| 2015/0149997 A1 | 5/2015 | Tsirkin | |
| 2015/0160998 A1* | 6/2015 | Anvin | G06F 12/0817 714/807 |
| 2015/0161384 A1* | 6/2015 | Gu | H04L 63/1433 726/22 |
| 2015/0163109 A1* | 6/2015 | Ionescu | H04L 67/561 709/224 |
| 2015/0178071 A1* | 6/2015 | Pavlik | G06F 9/3009 717/168 |
| 2015/0178078 A1* | 6/2015 | Anvin | G06F 9/30101 712/208 |
| 2015/0199198 A1 | 7/2015 | van de Ven et al. | |
| 2015/0199514 A1* | 7/2015 | Tosa | G06F 21/53 726/17 |
| 2015/0199516 A1* | 7/2015 | Dalcher | G06F 21/54 726/23 |
| 2015/0212867 A1* | 7/2015 | Klee | G06F 3/0673 710/5 |
| 2015/0220354 A1* | 8/2015 | Nair | G06F 3/061 710/308 |
| 2015/0220455 A1* | 8/2015 | Chen | G06F 12/1408 711/163 |
| 2015/0242233 A1 | 8/2015 | Brewerton | |
| 2015/0254017 A1 | 9/2015 | Soja | |
| 2015/0261559 A1 | 9/2015 | Sliwa | |
| 2015/0261560 A1 | 9/2015 | Sliwa | |

(56) References Cited

U.S. PATENT DOCUMENTS

| | | | |
|---|---|---|---|
| 2015/0261690 A1 | 9/2015 | Epstein | |
| 2015/0261713 A1 | 9/2015 | Kuch | |
| 2015/0261952 A1 | 9/2015 | Sliwa | |
| 2015/0263993 A1 | 9/2015 | Kuch | |
| 2015/0268979 A1* | 9/2015 | Komarov | G06F 9/45533 711/145 |
| 2015/0269085 A1 | 9/2015 | Gainey, Jr. | |
| 2015/0277872 A1 | 10/2015 | Gschwind | |
| 2015/0277946 A1 | 10/2015 | Busaba | |
| 2015/0277947 A1 | 10/2015 | Busaba | |
| 2015/0277948 A1 | 10/2015 | Bradbury | |
| 2015/0278085 A1 | 10/2015 | Bybell | |
| 2015/0278106 A1 | 10/2015 | Gschwind | |
| 2015/0278126 A1* | 10/2015 | Maniatis | G06F 13/1663 712/201 |
| 2015/0286583 A1* | 10/2015 | Kanai | G06F 3/0637 711/163 |
| 2015/0293774 A1 | 10/2015 | Persson | |
| 2015/0294117 A1 | 10/2015 | Cucinotta et al. | |
| 2015/0301761 A1* | 10/2015 | Sijstermans | G06F 3/0644 711/163 |
| 2015/0310578 A1* | 10/2015 | You | G06T 1/60 345/547 |
| 2015/0319160 A1* | 11/2015 | Ferguson | H04L 63/12 726/10 |
| 2015/0326531 A1* | 11/2015 | Cui | H04L 63/205 726/3 |
| 2015/0331812 A1* | 11/2015 | Horman | G06F 11/073 711/163 |
| 2015/0334126 A1* | 11/2015 | Mooring | G06F 9/45545 726/1 |
| 2015/0339480 A1* | 11/2015 | Lutas | G06F 21/56 726/22 |
| 2015/0347052 A1 | 12/2015 | Grisenthwaite | |
| 2015/0347166 A1* | 12/2015 | Noel | G06F 9/4856 718/1 |
| 2015/0356023 A1* | 12/2015 | Peter | G06F 12/1036 711/208 |
| 2015/0356297 A1* | 12/2015 | Guri | G06F 21/57 726/23 |
| 2015/0358309 A1* | 12/2015 | Edwards, Jr. | G06F 11/1402 726/6 |
| 2015/0363763 A1* | 12/2015 | Chang | H04W 12/069 705/64 |
| 2015/0370590 A1 | 12/2015 | Tuch | |
| 2015/0370591 A1 | 12/2015 | Tuch | |
| 2015/0370592 A1 | 12/2015 | Tuch | |
| 2015/0370724 A1* | 12/2015 | Lutas | G06F 12/1483 711/163 |
| 2015/0373023 A1* | 12/2015 | Walker | G06F 21/6218 726/3 |
| 2015/0379265 A1* | 12/2015 | Lutas | G06F 21/55 726/23 |
| 2015/0381442 A1* | 12/2015 | Delgado | G06F 9/45558 713/168 |
| 2016/0004863 A1* | 1/2016 | Lazri | G06F 21/554 726/23 |
| 2016/0011893 A1 | 1/2016 | Strong | |
| 2016/0011895 A1 | 1/2016 | Tsirkin | |
| 2016/0034295 A1* | 2/2016 | Cochran | G06F 9/45558 718/1 |
| 2016/0041881 A1 | 2/2016 | Simoncelli | |
| 2016/0048458 A1* | 2/2016 | Lutas | G06F 21/53 711/163 |
| 2016/0048460 A1* | 2/2016 | Kadi | H04W 4/80 713/193 |
| 2016/0048464 A1 | 2/2016 | Nakajima | |
| 2016/0048680 A1* | 2/2016 | Lutas | G06F 21/56 726/23 |
| 2016/0050071 A1* | 2/2016 | Collart | H04L 9/3234 713/193 |
| 2016/0055108 A1 | 2/2016 | Williamson et al. | |
| 2016/0062784 A1* | 3/2016 | Chai | H04W 12/086 718/1 |
| 2016/0062940 A1* | 3/2016 | Cota-Robles | G06F 13/28 710/313 |
| 2016/0063660 A1* | 3/2016 | Spector | G06T 1/20 382/100 |
| 2016/0077847 A1 | 3/2016 | Hunter | |
| 2016/0077858 A1 | 3/2016 | Hunter | |
| 2016/0077884 A1 | 3/2016 | Hunter | |
| 2016/0077981 A1* | 3/2016 | Kegel | G06F 9/45558 710/48 |
| 2016/0078342 A1 | 3/2016 | Tang | |
| 2016/0085568 A1 | 3/2016 | Dupre et al. | |
| 2016/0092382 A1* | 3/2016 | Anvin | G06F 9/30054 710/269 |
| 2016/0092678 A1* | 3/2016 | Probert | G06F 21/6218 713/193 |
| 2016/0098273 A1 | 4/2016 | Bartik | |
| 2016/0098367 A1 | 4/2016 | Etsion | |
| 2016/0099811 A1* | 4/2016 | Hawblitzel | H04L 9/3268 713/176 |
| 2016/0110291 A1 | 4/2016 | Gordon | |
| 2016/0117183 A1 | 4/2016 | Baumeister | |
| 2016/0124751 A1 | 5/2016 | Li | |
| 2016/0132349 A1 | 5/2016 | Bacher | |
| 2016/0135048 A1* | 5/2016 | Huxham | H04L 63/0442 455/411 |
| 2016/0139962 A1 | 5/2016 | Tsirkin | |
| 2016/0147551 A1 | 5/2016 | Tsirkin | |
| 2016/0148001 A1 | 5/2016 | Bacher et al. | |
| 2016/0154663 A1 | 6/2016 | Guthrie | |
| 2016/0156665 A1* | 6/2016 | Mooring | G06F 9/45545 726/1 |
| 2016/0164880 A1 | 6/2016 | Colesa et al. | |
| 2016/0170769 A1* | 6/2016 | LeMay | G06F 21/566 713/190 |
| 2016/0170816 A1* | 6/2016 | Warkentin | G06F 9/544 719/320 |
| 2016/0170881 A1 | 6/2016 | Guthrie | |
| 2016/0170912 A1* | 6/2016 | Warkentin | G06F 13/24 726/17 |
| 2016/0179558 A1 | 6/2016 | Busaba | |
| 2016/0179564 A1* | 6/2016 | Chen | G06F 9/45558 718/1 |
| 2016/0179696 A1 | 6/2016 | Zmudzinski | |
| 2016/0180079 A1* | 6/2016 | Sahita | G06F 21/554 726/22 |
| 2016/0180115 A1* | 6/2016 | Yamada | G06F 21/552 711/163 |
| 2016/0188353 A1 | 6/2016 | Shu et al. | |
| 2016/0188354 A1 | 6/2016 | Goldsmith et al. | |
| 2016/0202980 A1* | 7/2016 | Henry | G06F 12/0875 712/213 |
| 2016/0210069 A1* | 7/2016 | Lutas | G06F 3/0637 |
| 2016/0210179 A1* | 7/2016 | Hans | G06F 9/546 |
| 2016/0210465 A1 | 7/2016 | Craske | |
| 2016/0212620 A1* | 7/2016 | Paczkowski | H04L 9/32 |
| 2016/0216982 A1 | 7/2016 | Variath | |
| 2016/0224399 A1* | 8/2016 | Zheng | G06F 13/24 |
| 2016/0224474 A1 | 8/2016 | Harriman | |
| 2016/0224794 A1* | 8/2016 | Roberts | G06F 21/562 |
| 2016/0232347 A1* | 8/2016 | Badishi | G06F 21/54 |
| 2016/0232872 A1 | 8/2016 | Yoo | |
| 2016/0239323 A1 | 8/2016 | Tsirkin | |
| 2016/0239328 A1 | 8/2016 | Kaplan | |
| 2016/0239333 A1 | 8/2016 | Cowperthwaite | |
| 2016/0246630 A1 | 8/2016 | Tsirkin | |
| 2016/0246636 A1 | 8/2016 | Tsirkin | |
| 2016/0246644 A1 | 8/2016 | Canton | |
| 2016/0253110 A1 | 9/2016 | Tsirkin | |
| 2016/0253196 A1 | 9/2016 | Van Riel | |
| 2016/0259750 A1 | 9/2016 | Keidar | |
| 2016/0259939 A1 | 9/2016 | Bobritsky | |
| 2016/0283246 A1 | 9/2016 | Fleming | |
| 2016/0283258 A1 | 9/2016 | Bacher | |
| 2016/0283260 A1 | 9/2016 | Bacher | |
| 2016/0283404 A1* | 9/2016 | Xing | G06F 3/0632 |
| 2016/0283736 A1 | 9/2016 | Allen | |

(56) References Cited

U.S. PATENT DOCUMENTS

| | | |
|---|---|---|
| 2016/0285638 A1* | 9/2016 | Pearson .............. G06F 12/1408 |
| 2016/0285913 A1* | 9/2016 | Itskin ...................... H04L 45/74 |
| 2016/0285970 A1 | 9/2016 | Cai |
| 2016/0292816 A1 | 10/2016 | Dong |
| 2016/0299712 A1 | 10/2016 | Kishan et al. |
| 2016/0306749 A1 | 10/2016 | Tsirkin et al. |
| 2016/0314009 A1 | 10/2016 | Tsirkin |
| 2016/0314309 A1* | 10/2016 | Rozak-Draicchio ........................ G06F 9/45558 |
| 2016/0328254 A1 | 11/2016 | Ahmed |
| 2016/0328348 A1 | 11/2016 | Iba |
| 2016/0335436 A1 | 11/2016 | Harshawardhan |
| 2016/0337329 A1* | 11/2016 | Sood ...................... H04L 63/06 |
| 2016/0342789 A1* | 11/2016 | Perez ..................... G06F 21/54 |
| 2016/0352518 A1* | 12/2016 | Ford .................. G06F 21/6218 |
| 2016/0357647 A1* | 12/2016 | Shirai .................... G06F 11/20 |
| 2016/0359896 A1* | 12/2016 | Hay .................... H04L 63/1425 |
| 2016/0364304 A1 | 12/2016 | Hanumantharaya |
| 2016/0364338 A1* | 12/2016 | Zmudzinski ........ G06F 12/1036 |
| 2016/0364341 A1 | 12/2016 | Banginwar |
| 2016/0364349 A1 | 12/2016 | Okada |
| 2016/0371105 A1* | 12/2016 | Sieffert ................... G06F 8/656 |
| 2016/0378498 A1* | 12/2016 | Caprioli .............. G06F 9/30101 712/233 |
| 2016/0378522 A1 | 12/2016 | Kaplan |
| 2016/0378684 A1* | 12/2016 | Zmudzinski ........ G06F 12/1036 711/105 |
| 2017/0006057 A1* | 1/2017 | Perez Lafuente ....... H04L 67/34 |
| 2017/0010981 A1* | 1/2017 | Cambou .............. G11C 15/046 |
| 2017/0024560 A1 | 1/2017 | Linde |
| 2017/0026181 A1* | 1/2017 | Chhabra ............... H04L 9/3234 |
| 2017/0031699 A1 | 2/2017 | Banerjee |
| 2017/0032119 A1 | 2/2017 | Dore |
| 2017/0039080 A1 | 2/2017 | Chadha |
| 2017/0039366 A1* | 2/2017 | Ionescu .................. G06F 9/545 |
| 2017/0046187 A1 | 2/2017 | Tsirkin |
| 2017/0046212 A1 | 2/2017 | Fernandez |
| 2017/0060781 A1* | 3/2017 | Soja .................. G06F 12/1466 |
| 2017/0068575 A1* | 3/2017 | Hardage, Jr. ........ G06F 12/0813 |
| 2017/0091487 A1* | 3/2017 | Lemay .................... G06F 21/72 |
| 2017/0093578 A1* | 3/2017 | Zimmer .............. G06F 9/30145 |
| 2017/0097851 A1 | 4/2017 | Chen |
| 2017/0102957 A1 | 4/2017 | Marquardt |
| 2017/0109251 A1 | 4/2017 | Das |
| 2017/0109525 A1* | 4/2017 | Sistany ................. G06F 21/629 |
| 2017/0109530 A1 | 4/2017 | Diehl et al. |
| 2017/0123992 A1 | 5/2017 | Bradbury et al. |
| 2017/0124326 A1* | 5/2017 | Wailly ................. G06F 9/45558 |
| 2017/0126677 A1* | 5/2017 | Kumar ................ H04L 63/0227 |
| 2017/0126706 A1 | 5/2017 | Minea |
| 2017/0126726 A1* | 5/2017 | Han ...................... H04L 63/145 |
| 2017/0132156 A1 | 5/2017 | Axnix et al. |
| 2017/0134176 A1* | 5/2017 | Kim ...................... H04L 9/0866 |
| 2017/0139777 A1 | 5/2017 | Gehrmann |
| 2017/0139840 A1* | 5/2017 | Klein ..................... G06F 3/0644 |
| 2017/0147370 A1 | 5/2017 | Williamson |
| 2017/0153987 A1 | 6/2017 | Gaonkar |
| 2017/0161089 A1 | 6/2017 | Frazier |
| 2017/0168737 A1 | 6/2017 | Kumar |
| 2017/0171159 A1* | 6/2017 | Kumar ................ G06F 9/45558 |
| 2017/0177365 A1* | 6/2017 | Doshi ................. G06F 9/30087 |
| 2017/0177377 A1* | 6/2017 | Thiyagarajah ........ G06F 9/4403 |
| 2017/0177392 A1 | 6/2017 | Bacher et al. |
| 2017/0177398 A1 | 6/2017 | Bacher et al. |
| 2017/0177415 A1* | 6/2017 | Dhanraj ................ G06F 9/5044 |
| 2017/0177429 A1* | 6/2017 | Stark .................... G06F 11/0751 |
| 2017/0177441 A1 | 6/2017 | Chow |
| 2017/0177854 A1 | 6/2017 | Gligor |
| 2017/0177860 A1 | 6/2017 | Suarez |
| 2017/0177877 A1 | 6/2017 | Suarez |
| 2017/0177909 A1 | 6/2017 | Sarangdhar |
| 2017/0185436 A1 | 6/2017 | Deng et al. |
| 2017/0185536 A1* | 6/2017 | Li .......................... G06F 21/53 |
| 2017/0185784 A1* | 6/2017 | Madou ................. H04L 63/1433 |
| 2017/0192801 A1 | 7/2017 | Barlev |
| 2017/0192810 A1* | 7/2017 | Lukacs .................. G06F 21/56 |
| 2017/0199768 A1 | 7/2017 | Arroyo |
| 2017/0206104 A1* | 7/2017 | Sliwa ................. G06F 9/45558 |
| 2017/0206175 A1 | 7/2017 | Sliwa |
| 2017/0206177 A1 | 7/2017 | Tsai et al. |
| 2017/0213028 A1* | 7/2017 | Chen ...................... G06F 21/53 |
| 2017/0213031 A1 | 7/2017 | Diehl et al. |
| 2017/0220369 A1* | 8/2017 | Kaplan ............... G06F 12/1045 |
| 2017/0220447 A1* | 8/2017 | Brandt ................ G06F 11/3466 |
| 2017/0220795 A1* | 8/2017 | Suginaka ................ G06F 21/54 |
| 2017/0222815 A1 | 8/2017 | Meriac |
| 2017/0228271 A1 | 8/2017 | Tsirkin |
| 2017/0228535 A1* | 8/2017 | Shanbhogue ........... G06F 9/461 |
| 2017/0244729 A1* | 8/2017 | Fahrny ................. G06F 21/552 |
| 2017/0249173 A1* | 8/2017 | Tsirkin ................ G06F 9/45558 |
| 2017/0249176 A1 | 8/2017 | Elias |
| 2017/0255778 A1 | 9/2017 | Ionescu |
| 2017/0257399 A1* | 9/2017 | Mooring ................. H04L 69/00 |
| 2017/0262306 A1* | 9/2017 | Wang .................... G06F 9/5027 |
| 2017/0293581 A1 | 10/2017 | Maugan |
| 2017/0295195 A1* | 10/2017 | Wettstein ............ H04L 63/1425 |
| 2017/0323113 A1 | 11/2017 | El-Moussa |
| 2017/0329623 A1 | 11/2017 | Dong |
| 2017/0331884 A1* | 11/2017 | Colle .................. H04L 67/1001 |
| 2017/0353485 A1* | 12/2017 | Brown ................. G06F 21/564 |
| 2017/0364685 A1 | 12/2017 | Shah |
| 2018/0004539 A1* | 1/2018 | Liguori ............... G06F 9/45558 |
| 2018/0004561 A1* | 1/2018 | Liguori ................ G06F 9/5077 |
| 2018/0004868 A1 | 1/2018 | Adam |
| 2018/0004954 A1* | 1/2018 | Liguori .................... H04L 9/14 |
| 2018/0011729 A1 | 1/2018 | Yu |
| 2018/0033116 A1 | 2/2018 | Tian |
| 2018/0034781 A1* | 2/2018 | Jaeger ................. H04L 63/0263 |
| 2018/0048660 A1 | 2/2018 | Paithane |
| 2018/0089436 A1* | 3/2018 | Smith ................... H04L 9/3236 |
| 2018/0165791 A1 | 6/2018 | Dong |
| 2018/0203805 A1* | 7/2018 | Hatta .................. G06F 12/1425 |
| 2018/0285143 A1 | 10/2018 | Bacher et al. |
| 2018/0336348 A1* | 11/2018 | Ng ........................... G06F 21/52 |
| 2018/0349162 A1 | 12/2018 | Tian |
| 2018/0373556 A1 | 12/2018 | Tian |
| 2018/0373570 A1 | 12/2018 | Xu |
| 2019/0005224 A1* | 1/2019 | Oliver ...................... G06F 21/44 |
| 2019/0005267 A1* | 1/2019 | Soman ..................... H04L 63/20 |
| 2019/0034633 A1 | 1/2019 | Seetharamaiah |
| 2019/0146668 A1* | 5/2019 | Gschwind ............ G06F 3/0629 711/170 |
| 2019/0146697 A1* | 5/2019 | Gschwind ............ G06F 3/0631 711/173 |
| 2019/0146700 A1* | 5/2019 | Gschwind ............ G06F 9/30043 711/170 |
| 2019/0146710 A1* | 5/2019 | Gschwind ............ G06F 9/30043 711/154 |
| 2019/0146789 A1* | 5/2019 | Gschwind ............ G06F 9/3004 711/170 |
| 2019/0146795 A1* | 5/2019 | Gschwind ............ G06F 9/30043 712/245 |
| 2019/0146820 A1* | 5/2019 | Gschwind .............. G06F 3/0604 718/1 |
| 2019/0146832 A1* | 5/2019 | Gschwind ................ G06F 9/462 718/108 |
| 2019/0146874 A1* | 5/2019 | Gschwind ............ G06F 3/0629 714/764 |
| 2019/0146918 A1* | 5/2019 | Gschwind ............ G06F 12/1009 711/118 |
| 2019/0146929 A1* | 5/2019 | Gschwind ................. G06F 9/38 711/206 |
| 2019/0163513 A1 | 5/2019 | Noorshams |
| 2019/0227810 A1* | 7/2019 | Jacquin .................. G06F 21/44 |
| 2019/0325133 A1* | 10/2019 | Goodridge ............ G06F 21/554 |
| 2020/0036602 A1* | 1/2020 | Leibovici ............. G06F 3/0605 |
| 2020/0092103 A1* | 3/2020 | Zavertnik .............. G06F 21/44 |
| 2020/0097661 A1* | 3/2020 | Block .................... H04L 9/3271 |
| 2020/0099536 A1* | 3/2020 | Block .................... H04L 9/3236 |
| 2020/0159558 A1 | 5/2020 | Bak et al. |
| 2020/0241902 A1 | 7/2020 | Freche |
| 2020/0394065 A1 | 12/2020 | Bak et al. |
| 2021/0021418 A1* | 1/2021 | Makhalov .............. H04L 9/0822 |

(56) References Cited

U.S. PATENT DOCUMENTS

| | | | |
|---|---|---|---|
| 2021/0026950 A1* | 1/2021 | Ionescu | G06F 9/30101 |
| 2021/0049028 A1* | 2/2021 | Price | G06F 9/45558 |
| 2021/0049292 A1 | 2/2021 | Ionescu | |
| 2021/0073003 A1* | 3/2021 | Jacquin | G06F 21/44 |
| 2021/0334377 A1* | 10/2021 | Drori | G06F 21/44 |
| 2022/0012042 A1* | 1/2022 | Doshi | H04L 41/082 |
| 2022/0070225 A1* | 3/2022 | Drori | H04L 69/28 |
| 2022/0129591 A1* | 4/2022 | K | G06F 21/74 |
| 2022/0198021 A1* | 6/2022 | Subramanian | G06F 21/572 |
| 2022/0358049 A1 | 11/2022 | Tsirkin | |
| 2022/0358220 A1* | 11/2022 | Smith | G06F 21/57 |
| 2023/0129610 A1* | 4/2023 | Jacquin | G06F 21/85 726/26 |
| 2023/0229758 A1* | 7/2023 | Terpstra | G06F 21/572 726/26 |
| 2023/0229779 A1* | 7/2023 | Terpstra | G06F 21/575 713/2 |
| 2023/0261867 A1* | 8/2023 | Makhalov | H04L 9/0822 713/189 |
| 2023/0267214 A1* | 8/2023 | Zhang | G06F 21/57 713/189 |
| 2023/0342446 A1* | 10/2023 | Reddy | G06F 21/572 |
| 2024/0004681 A1* | 1/2024 | Graf | G06F 21/57 |

OTHER PUBLICATIONS

Binun et al."Self-Stabilizing Virtual Machine Hypervisor Architecture for Resilent Cloud," 2014 IEEE 10th World Congress on Services, IEEE Computer Society, pp. 200-207 (Year: 2014).*

Huin et al."An Agent-Based Architecture to Add Security in a Cooperative Information System," Third International IEEE Conference on Signal-Image Technologies and Internet-Based System, pp. 262-271 (Year: 2008).*

Zhang et al."Formal Verficiation of Interrupt Injection in a Hypervisor," 2014 Theoretical Aspects of Software Engineering Conference, IEEE Computer Society, pp. 74-81 (Year: 2014).*

Moratelli et al Harware-Assisted Interrupt Delivery Optimization For Virtualized Embedded Platforms, IEEE, pp. 304-307 (Year: 2015).*

Terrell et al "Setting up of a Cloud Cyber Infrastructure using Xen Hypervisor," 2013 10th International Conference on Information Technology: New Generations, pp. 648-652 (Year: 2013).*

Ding et al."Return-Oriented Programming Attack on the Xen Hypervisor," 2012 Seventh International Conference on Availability, Reliability and Security, IEEE, pp. 479-484 (Year: 2012).*

Nwebonyi et al "BYOD: Network: Enhancing Security Through Trust-Aided Access Control Mechanisms," International Journal of Cyber-Security and Digital Forensics (IJCSDF), The Society of Digital Information and Wireless Communication, pp. 272-289 (Year: 2014).*

Grimm et al Separating Access Control Policy, Enforcement, and Functionality in Extensible Systems, ACM Transactions on Computer Systems, vol. 19, No. 1, Feb. 2001, pp. 36-70.*

Datta et al "A Logic of Secure Systems and its Application to Trusted Computing," IEEE Computer Society, pp. 221-236 (Year: 2009).*

Kornaros et al "Hardware Support for Cost-Effective System-Level Protection in Multi-Core SoCs," IEEE, pp. 41-48 (Year: 2015).*

Azab et al "HIMA: A Hypervisor-Based Integrity Measurement Agent," IEEE Computer Society, pp. 461—(Year: 2009).*

Chiueh et al "Surreptitious Deployment and Execution of Kernel Agents in Windows Guiests," IEEE Computer Society, pp. 507-514, (Year: 2012).*

The Extended European Search Report mailed Apr. 16, 2021 for European Patent Application No. 20206917.5, 10 pages.

Wang, et. al., "Countering Kernel Rootkits with Lightweight Hook Protection", Computer and Communications Security, Nov. 9, 2009, pp. 545-554.

The European Office Action mailed on Jul. 25, 2019 for European Patent Application No. 17156043.6, a counterpart of U.S. Appl. No. 15/063,086, 8 pages.

The Extended European Search Report mailed Jul. 13, 2017 for European patent application No. 17156043.6, 10 pages.

Office action for U.S. Appl. No. 15/063,086, mailed on Oct. 6, 2017, Ionescu, "Hypervisor-Based Interception of Memory Accesses", 36 pages.

Office action for U.S. Appl. No. 15/063,086, mailed on May 9, 2018, Ionescu, "Hypervisor-Based Interception of Memory Accesses", 27 pages.

Wen, et al., "FVisor: Towards Thwarting Unauthorized File Accesses with A Light-weght Hypervisor", 2014 IEEE 17th International Conference on Computational Science and Engineering, 2014, pp. 620-626.

Nguyen et al "MAVMM: Lightweight and Purpose Built VMM for Malware Analysis," 2009 Annual Computer Security Applications Conference, IEEE Computer Society, 2009, pp. 441-450.

Office Action for U.S. Appl. No. 17/060,355, mailed on Nov. 24, 2023, Ion-Alexandru Ionescu, "Hypervisor-Based Interception of Memory and Register Accesses", 17 pages.

Qingbo et al "System Monitoring and Controlling Mechanism based on Hypervisor," 2009 IEEE International Symposium on Parallel and Distributed Processing with Applications, IEEE Computer Society, 2009, pp. 549-554.

Branco et al "Architecture for Automation of Malware Analysis," IEEE, 2010, pp. 106-112.

Jin et al "H-SVM: Hardware-Assisted Secure Virtual Machines under a Vulnerable Hypervisor," IEEE Transactions on Computers, vol. 64, No. 10, Oct. 2015, pp. 2833-2846 (Year: 2015).

Kienzle et al "Endpoint Configuration Compliance Monitoring via Virtual Machine Introspection," Proceedings of the 43rd Hawaii International Conference on System Sciences, IEEE Computer Society, pp. 1-10 (Year: 2010).

Office Action for U.S. Appl. No. 17/060,355, mailed on May 11, 2023, Inventor #1 Ion-Alexandru Ionescu, "Hypervisor-Based Interception of Memory and Register Accesses," 12 pages.

Office Action for U.S. Appl. No. 17/060,355, dated Oct. 1, 2024, 25 pages.

Wang et al., "A Resource Allocation Model for Hybrid Storage Systems", 2015 15th IEE/ACM International Symposium on Cluster, Cloud and Grid Computing, IEE Computer Society, pp. 91-100.

Wong et al., "Zygaria: Storage Performance as a Managed Resource", IEEE Computer Society, pp. 1-10.

* cited by examiner

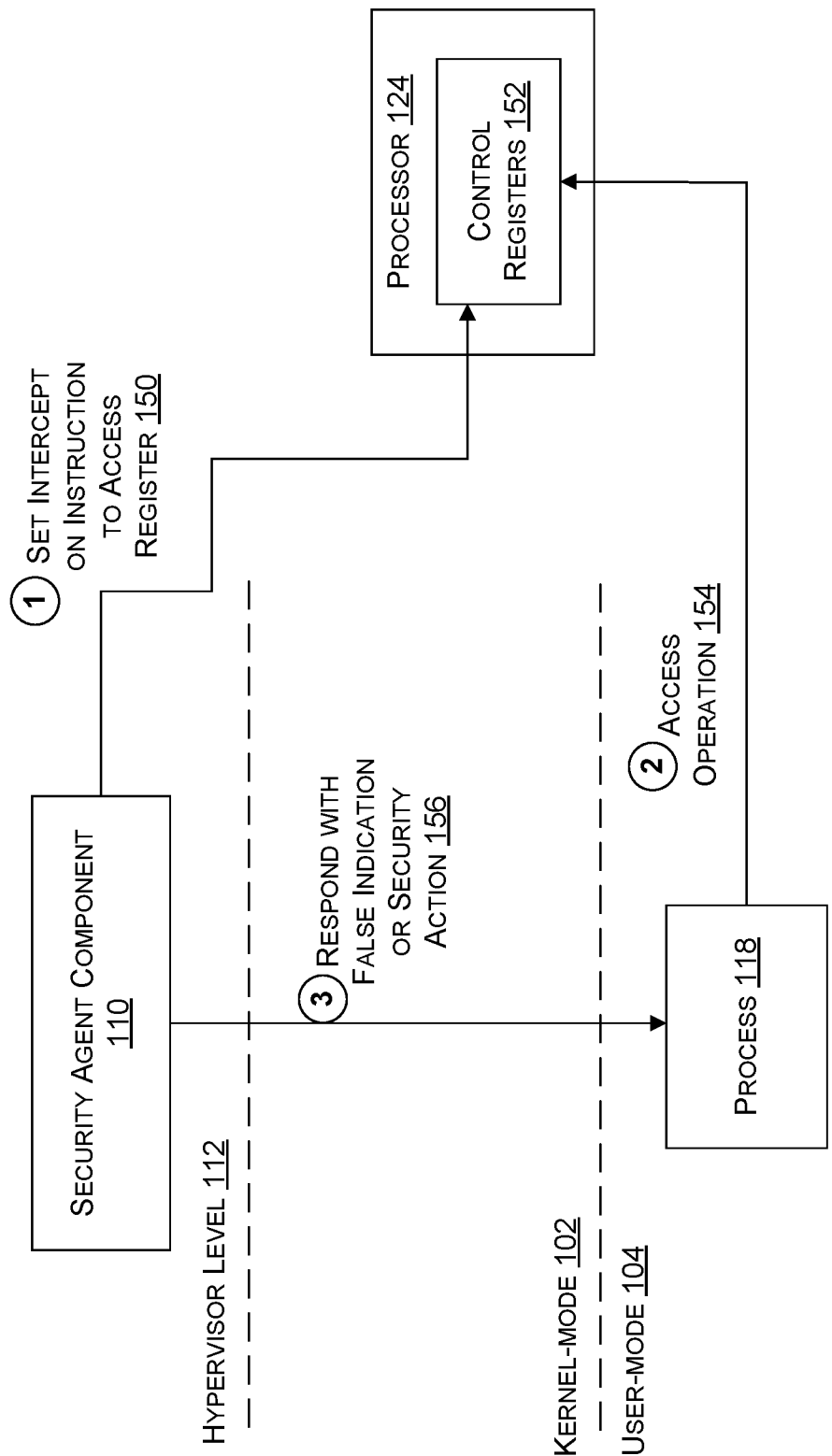

HYPERVISOR-BASED REDIRECTION OF SYSTEM CALLS AND INTERRUPT-BASED TASK OFFLOADING

RELATED APPLICATIONS

This patent application is a continuation-in-part of U.S. Non-provisional patent application Ser. No. 17/060,355, filed on Oct. 1, 2020, which is a continuation-in-part of U.S. Non-provisional patent application Ser. No. 15/063,086, filed on Mar. 7, 2016, the entirety of which are hereby incorporated by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security exploits come in many forms, such as computer viruses, worms, trojan horses, spyware, keystroke loggers, adware, and rootkits. These exploits are delivered in or through a number of mechanisms, such as spearfish emails, clickable links, documents, executables, or archives. Some of the threats posed by security exploits are of such significance that they are described as cyber terrorism or industrial espionage.

While many activities of security exploits can be introspected using hooks or other interception techniques, certain operations cannot be hooked or intercepted in kernel-mode or user-mode. Such operations include memory accesses and individual instruction execution by the processor. Current techniques involve running guest operating systems (OSes) and applications of those guest OSes in virtual machines or running each application in a separate virtual machine. Each of these techniques involves significant overhead, and neither technique is capable of intercepting memory accesses or instructions executing on the host OS itself.

Furthermore, some known rootkits employ an attack strategy that involves hooking the OS kernel itself. In order to counter such attacks, many of today's OSes include logic that causes the system to crash and reboot if it is determined that the OS kernel has been hooked (because, out of an abundance of caution, it is assumed that a rootkit has hooked the OS kernel). This makes it impractical for security software to do the same (i.e., hook the OS kernel) for benevolent purposes, such as for purposes of monitoring systems calls to detect malware on the host computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1a-1f illustrate overviews of a security agent configured to initiate execution of a security agent component as a hypervisor of computing device, the security agent component setting intercepts on memory locations and processor registers of the computing device, and, in some implementations, generating interrupts in order to offload task execution to the security agent.

DETAILED DESCRIPTION

Figure 1A:
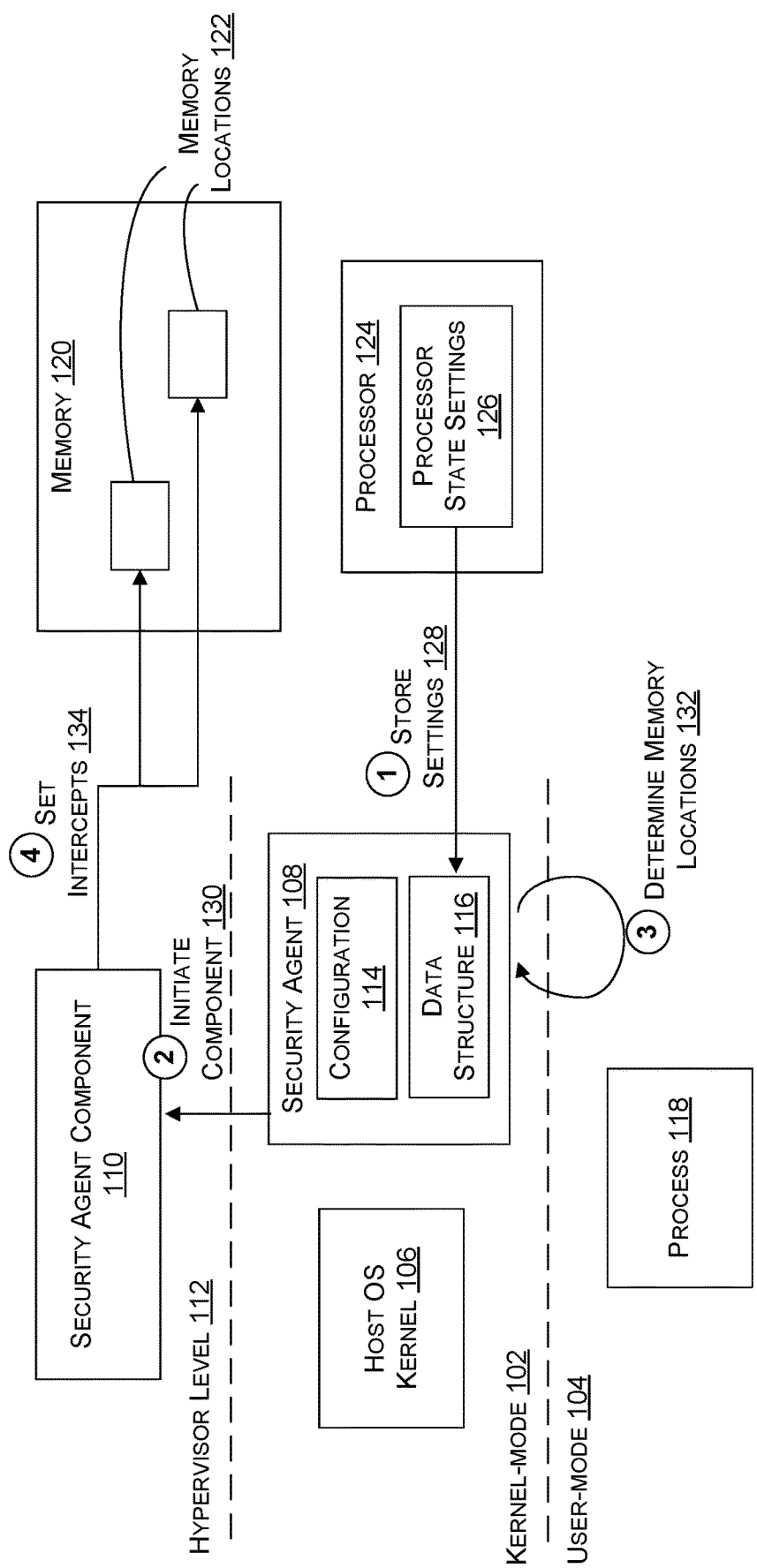

This disclosure describes, in part, security agent configured to initiate a security agent component as a hypervisor for a computing device. Such initiation may involve, in some implementations, storing processor state information into a data structure and instructing the processor to initiate the security agent component as the hypervisor based on the data structure. The security agent may then determine a subset of memory locations in memory of the computing device to be intercepted or one or more processor registers to be intercepted. Such a determination may be based, for example, on a security agent configuration received from a security service. The security agent component may then set intercepts for the determined memory locations or registers. Setting such intercepts may include setting privilege attributes for pages which include the determined memory locations so as to prevent specific operations in association with those memory locations or setting intercepts for instructions affecting the registers.

In some implementations, after setting privilege attributes for pages, operations affecting memory locations in those pages may be noted. In response to one of the specific operations affecting the determined memory location associated with a page, the security agent component may return a false indication of success or allow the operation to enable monitoring of the actor associated with the operation. When an operation affects another memory location associated with that page, the security agent component may temporarily reset the privilege attribute for that page to allow the operation.

In one example, a memory location may store privileged information, and the specific operation protected against may involve writing to that memory location to modify the privileged information. Such an action is known as privilege escalation. To protect against privilege escalation, the privilege attribute of the page including the memory location storing the privileged information may be set to a read only value.

In another example, a memory location may store user credentials, and the specific operation protected against may involve reading the user credentials from the memory location. To protect against such credential reads, the privilege attribute of the page including the memory location storing the user credentials may be set to an inaccessible value. In some implementations, the physical memory location of the page may be modified by the security agent, resulting in the credential read to return data located in a different memory location. The returned user credentials would therefore be invalid as to purposefully mislead an attacker.

In a further example, a memory location may store executable code, and the specific operation protected against may involve executing the code stored at the memory location. To protect against this, the privilege attribute of the page including the memory location storing the executable code may be set to non-executable. The security agent component may then take a further action, such as returning a false indication of successful execution of the code, or redirecting to other code at another location to mislead the attacker.

In various implementations, after setting privilege attributes for pages, operations affecting pages that include protected memory locations may trigger the execution of tasks relating to the noted operations. Although these tasks may be executed in the hypervisor by the security agent component, some or all of the tasks may also be offloaded from the security agent component to the security agent executing as a kernel-level component. This allows for, among other things, performance gains for the computing device because execution of at least some tasks by a kernel-level component of the computing device does not impact computational performance as much as if a hypervisor component were to exclusively execute the same tasks. Moreover, offloading tasks to the security agent executing as a kernel-level component may improve latency, and/or it may avoid a situation where all OS functions (including hardware operations) are halted, which would be the case if the hypervisor component exclusively executed while the tasks were simultaneously in progress. In fact, during hypervisor task execution, packets may be lost, movement of an input device (e.g., a mouse) may go undetected, and so on. The offloading described herein mitigates these and potentially other issues. The determination of whether or not to offload task execution to the security agent in the kernel mode of the computing device may be based on the computational cost/expense of executing a task(s) by a hypervisor component, such as the security agent component. In an example process, the security agent may be configured to initiate the security agent component as a hypervisor for the computing device, and the security agent component, upon noting an operation affecting a page of memory that includes a protected memory location(s), may generate an interrupt for purposes of offloading task execution to the security agent. In response to the interrupt, the security agent may execute at least one task relating to the noted operation in lieu of the security agent component executing the same task(s) in the hypervisor level of the computing device.

In various implementations, the security agent component consults a whitelist or component, such as a virtual address space manager, to determine whether any memory locations identified by the security agent are whitelisted. The security agent component may then exclude memory pages that include the whitelisted memory locations from a set of memory pages and set intercepts of memory locations included in the remaining memory pages of the set of memory pages. Use of whitelisting memory locations may prevent the security agent and security agent component from blocking operations of permitted components known to be associated with those whitelisted memory locations.

In further implementations, the security agent may store memory addresses in debug registers of the processor of the computing device, and the security agent component may set intercepts for the debug registers. Setting the intercepts may include, for example, setting intercepts for instructions seeking to access the debug registers (e.g., reading the debug registers). In some implementations, one of the debug registers may store a memory address not permitted by the operating system of the computing device to be stored in the debug registers. For instance, the operating system may prevent memory addresses associated with kernel-level components from being stored in the debug registers. In order to enable storing such a non-permitted memory address in a debug register, the security agent component may respond to a read operation from the operating system seeking to read that debug register with a false, operating-system-permitted value. In addition to setting intercepts for debug registers storing memory addresses, the security agent component may also set intercepts for the memory addresses themselves, e.g., by setting privilege attributes for memory pages that include the memory addresses.

In some implementations, the security agent component may set intercepts for control registers of the processor of the computing device. Setting the intercepts may include setting intercepts for instructions seeking to access the control registers (e.g., seeking to write to the control registers). In various implementations, one of the control registers may store an on setting for a security feature of the computing device. The security agent component may set intercepts on instructions seeking to write to that register to, for instance, turn off the security feature. In response to intercepting such an instruction, the security agent component may respond with a false indication of success.

In some implementations, the security agent component may be configured to redirect system calls to a security agent executing as a kernel-level component of the computing device. For example, the security agent component may be initiated as a hypervisor of the computing device, and, thereafter, may change a value of a processor configuration register, such as a Model Specific Register (MSR), of a processor of the computing device. The value of the processor configuration register may be changed from an original value to an updated value that points to the security agent. Thereafter, when the processor reads the updated value of the processor configuration register, system calls are redirected to, and received by, the security agent. Receiving system calls allows the security agent to take one or more security actions on the computing device. For example, receipt of a system call may act as a trigger to initiate a security action with respect to data that is associated with user-level processes executing on the computing device. In some embodiments, the security agent component may also set an intercept for instructions for performing read operations on the processor configuration register. In this manner, upon noting a read operation to read the value of the processor configuration register, and upon noting that the read operation is from a process, thread, or component that is different from the processor, the security agent component may return the original value to the requesting process, thread, or component, thereby obfuscating the presence of the security agent component.

Overview

FIG. 1a illustrates an overview of a security agent configured to initiate execution of a security agent component as a hypervisor of computing device, the security agent component setting intercepts on a subset of memory locations of the computing device. As illustrated, a computing device includes components implemented at the kernel-level 102 and at the user-level 104. Kernel-level 102 components include a host OS kernel 106 and a security agent 108. The security agent 108 further includes or is associated with a security agent component 110 implemented at a hypervisor-level 112 of the computing device. The security agent 108 may further include a configuration 114 and a data structure 116 for storing copies of processor state settings. Further, user-level 104 components may include a process 118. Additionally, the computing device may have a memory 120 having multiple memory locations 122 and a processor 124 having processor state settings 126. FIG. 1a further shows, at 128, the security agent 108 storing processor state settings 126 in the data structure 116 and, at 130, initiating the security agent component 110 as a hypervisor based on the data structure 116. The security agent 108 then, at 132, determines memory locations 122 to be intercepted and the security agent component 110 sets, at 134, intercepts for the determined memory locations 122.

Figure 3:
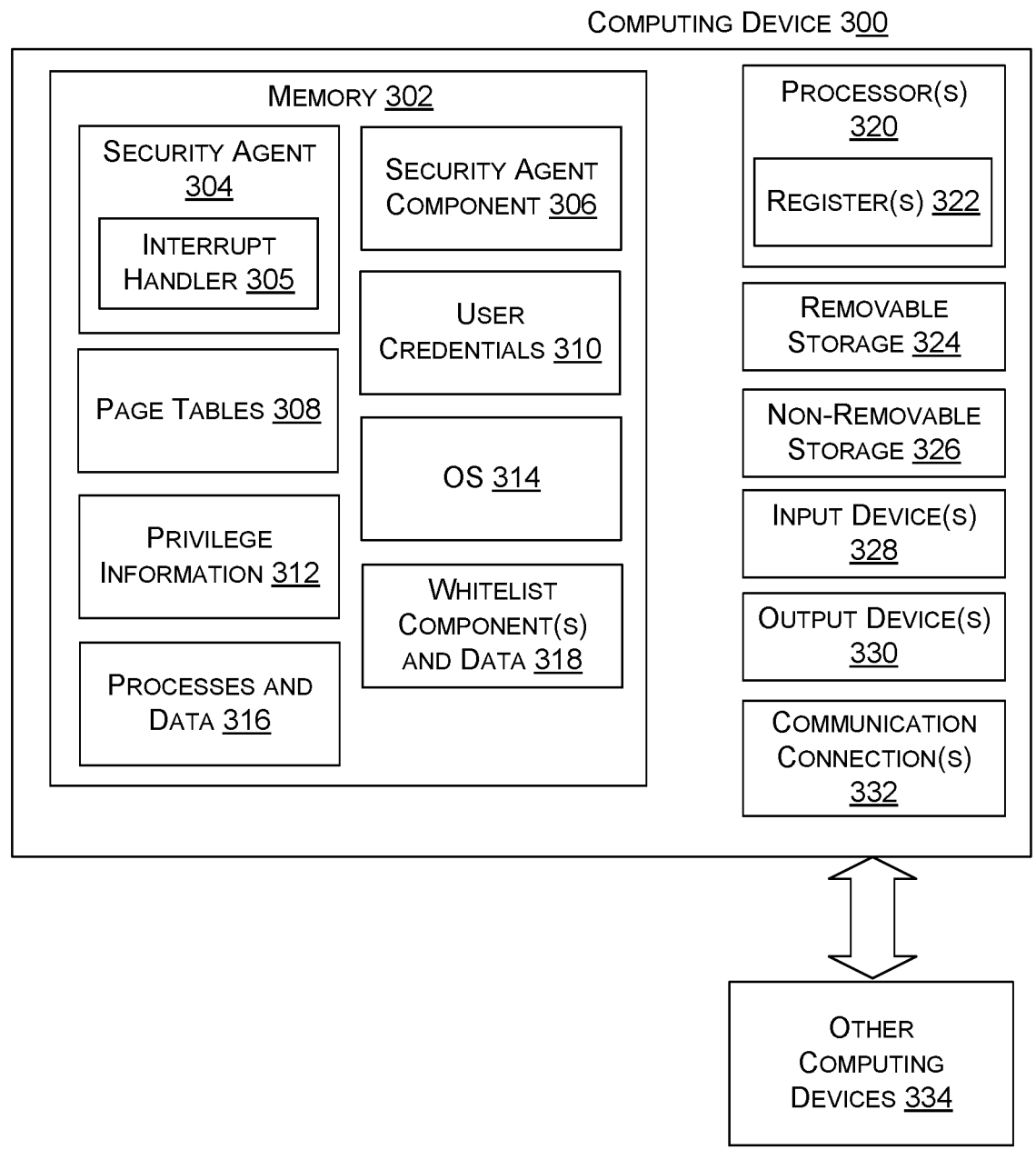
FIG. 3 illustrates a component level view of a computing device configured with a security agent and security agent component configured to execute as a hypervisor.

In various embodiments, a computing device may include the host OS kernel 106, security agent 108, security agent component 110, process 118, memory 120, and processor 124. Such a computing device may be a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. When implemented on multiple computing devices, the host OS kernel 106, security agent 108, security agent component 110, process 118, memory 120, and processor 124 may be distributed among the multiple computing devices. An example of a computing device including the host OS kernel 106, security agent 108, security agent component 110, process 118, memory 120, and processor 124 is illustrated in FIG. 3 and described below with reference to that figure.

The computing device may implement multiple protection rings or privilege levels which provide different levels of access to system resources. For example, user-level 104 may be at an "outer" ring or level, with the least access (e.g., "ring 3"), kernel-level 102 may be at an "inner" ring or level, with greater access (e.g., "ring 0" or "ring 1"), and hypervisor-level 112 may be an "inner-most" ring or level (e.g., "ring −1" or "ring 0"), with greater access than kernel-level 102. Any component at the hypervisor-level 112 may be a hypervisor which sits "below" (and has greater access than) a host OS kernel 106.

The host OS kernel 106 may be a kernel of any sort of OS, such as a Windows® OS, a Unix OS, or any other sort of OS. Other OSes, referred to as "guest" OSes, may be implemented in virtual machines supported by the host OS. The host OS kernel 106 may provide access to hardware resources of the computing device, such as memory 120 and processor 124 for other processes of the computing device, such as process 118.

The security agent 108 may be a kernel-level security agent, which may monitor and record activity on the computing device, may analyze the activity, and may generate alerts and events and provide those alerts and events to a remote security service. The security agent 108 may be installed by and configurable by the remote security service, receiving, and applying while live, configurations of the security agent 108 and its component(s), such as security agent component 110. The configuration 114 may be an example of such a configuration. An example security agent 108 is described in greater detail in U.S. patent application Ser. No. 13/492,672, entitled "Kernel-Level Security Agent" and filed on Jun. 8, 2012, which issued as U.S. Pat. No. 9,043,903 on May 26, 2015.

The security agent component 110 may be a component of the security agent 108 that is executed at a hypervisor for the computing device at hypervisor-level 112. The security agent component 110 may perform hypervisor functions, such as adjusting privilege attributes (e.g., "read-write," "read only," "inaccessible," etc.) of memory pages and managing system resources, such as memory 120. The security agent component 110 may perform at least some of its functions based on the configuration 114 of the security agent 108, which may include configuration settings for the security agent component 110. The security agent component 110 may also perform hypervisor functions to adjust the physical location of memory pages associated with memory 120.

The configuration 114 may comprise any of settings or system images for the security agent 108 and security agent component 110. As noted above, the configuration 114 may be received from a remote security service and may be applied by the security agent 108 and security agent component 110 without rebooting the computing device.

The data structure 116 may be a structure for storing processor state information. Such a data structure may be, for instance, a virtual machine control structure (VA/ICS). In some implementations, a subset of the settings in the data structure 116 may be set by the security agent 108 based on the OS. In such implementations, the security agent 108 may have different routines for different OSes, configuring the data structure 116 with different settings based on the OS. Such settings may typically be processor state settings which are invariant for a given OS. Other settings are then obtained from processor state settings 126. In other implementations, the security agent 108 may not have different routines for different OSes and may obtain all settings for the data structure 116 from the processor state settings 126.

In various implementations, the process 118 may be any sort of user-level 104 process of a computing device, such as an application or user-level 104 OS component. The process 118 may perform various operations, including issuing instructions for execution and making read, write, and execute requests of different memory locations. Such read, write, and execute requests may be addressed to virtual addresses, which may be mapped to physical addresses of memory pages by page tables of the OS kernel 106 or to further virtual addresses of extended or nested page tables, which are then mapped to physical addresses. Such processes 118 may include security exploits or be controlled by such exploits though vulnerabilities and may attempt malicious activity, such as privilege escalation or credential theft, through direct accesses of memory locations or indirect accesses utilizing, for example, vulnerabilities of the host OS kernel 106.

Memory 120 may be memory of any sort of memory device. As shown in FIG. 1a, memory 120 may include multiple memory locations 122, the number of memory locations 122 varying based on the size of memory 120. The memory locations 122 may be addressed through addresses of memory pages and offsets, with each memory page including one or more memory locations. Privileges associated with memory locations 122, such as reading, writing, and executing may be set on a per-page granularity, with each memory page having a privilege attribute. Thus, memory locations 122 of a same page may have the same privileges associated with them. Examples of memory 120 are illustrated in FIG. 3 and described below in detail with reference to that figure.

The processor 124 may be any sort of processor, such as a central processing unit (CPU), a graphics processing unit (GPU), or both CPU and GPU, or other processing unit or component known in the art. The processor 124 may be associated with a data structure 116 describing its state, the contents of which are referred to herein as the processor state settings 126. As described above, in some implementations, a subset of the processor state settings 126 may be invariant for a type of OS. Additionally, the processor 124 supports hardware-based virtualization (such as Intel™ VT-x) with second level address translation (SLAT).

In various implementations, the security agent 108 is configured to initiate execution of the security agent component 110 as a hypervisor. Such initiating may be performed without any rebooting of the computing device. As shown in FIG. 1a, this initiating may involve, at 128, storing the processor state settings 126 in the data structure 116. If any of the processor state settings 126 are invariant, they may have already been included in the data structure 116 by the security agent 108 and thus do not need to be stored again. The initiating may then include, at 130, initiating the security agent component 110 based on the data structure 116. This may involve providing a reference to the security agent component 110 and the data structure 116 along with a "run" instruction.

Next, the security agent 108 determines, at 132, any memory locations 122 or instructions to be intercepted. The security agent 108 may utilize the configuration 114 provided by the security service to determine the memory locations 122 and instructions. Such memory locations 122 may include locations storing executable code or privilege information (e.g., indications of admin privileges) for a process or user credentials (e.g., passwords). As mentioned above, updates to the configuration 114 may be received and applied without rebooting. Upon receiving an update to the configuration 114, the security agent may repeat the determining at 132.

To free memory space, computing devices often clear memory mappings for memory pages which have not been recently accessed and write out their contents to disk, referred to as a page-out operation. When memory is accessed again, the contents are brought back from disk, referred to as a page-in operation. To ensure, then, that knowledge of memory locations 122 stays up-to-date, the security agent 108 may request that the OS kernel 106 lock page tables of mappings in page tables to memory pages which include the memory locations 122 that are to be intercepted. Alternatively, the security agent component 110 may intercept page out requests and prevent paging out of memory pages which include the memory locations 122 that are to be intercepted, or it may intercept page in requests in order to update its knowledge of memory locations 122 and repeat determining at 132.

In various implementations, the security agent component 110 then, at 134, sets intercepts for the instructions and memory locations 122 determined by the security agent 108. In some implementations, setting intercepts may involve determining the memory pages which include the determined memory locations 122 and setting privilege attributes for those pages. The privilege attribute chosen—e.g., "non-executable" or "read only" or "inaccessible"—may be a function of the memory accesses that the security agent 108 and security agent component 110 are configured to intercept. When a process 118 seeks to perform such a memory access—e.g., to execute code stored at a memory page marked "non-executable"—the security agent component 110 will receive notification.

In other implementations, setting intercepts may involve changing the physical memory location of the determined memory locations 122 to reference misleading, incorrect, or otherwise unusable data or code. When a process 118 seeks to perform such memory access—e.g., to read a memory page containing data at memory location 122, the data will instead by read from an alternate memory location.

In some implementations, upon termination of a process 118, the security agent component 110 may remove intercepts for memory locations 122 associated with the process 118. This may involve resetting privilege attributes for the memory pages including the memory locations 122 to their previous settings, or it may include resetting the physical memory location for the memory pages.

Figure 1B:
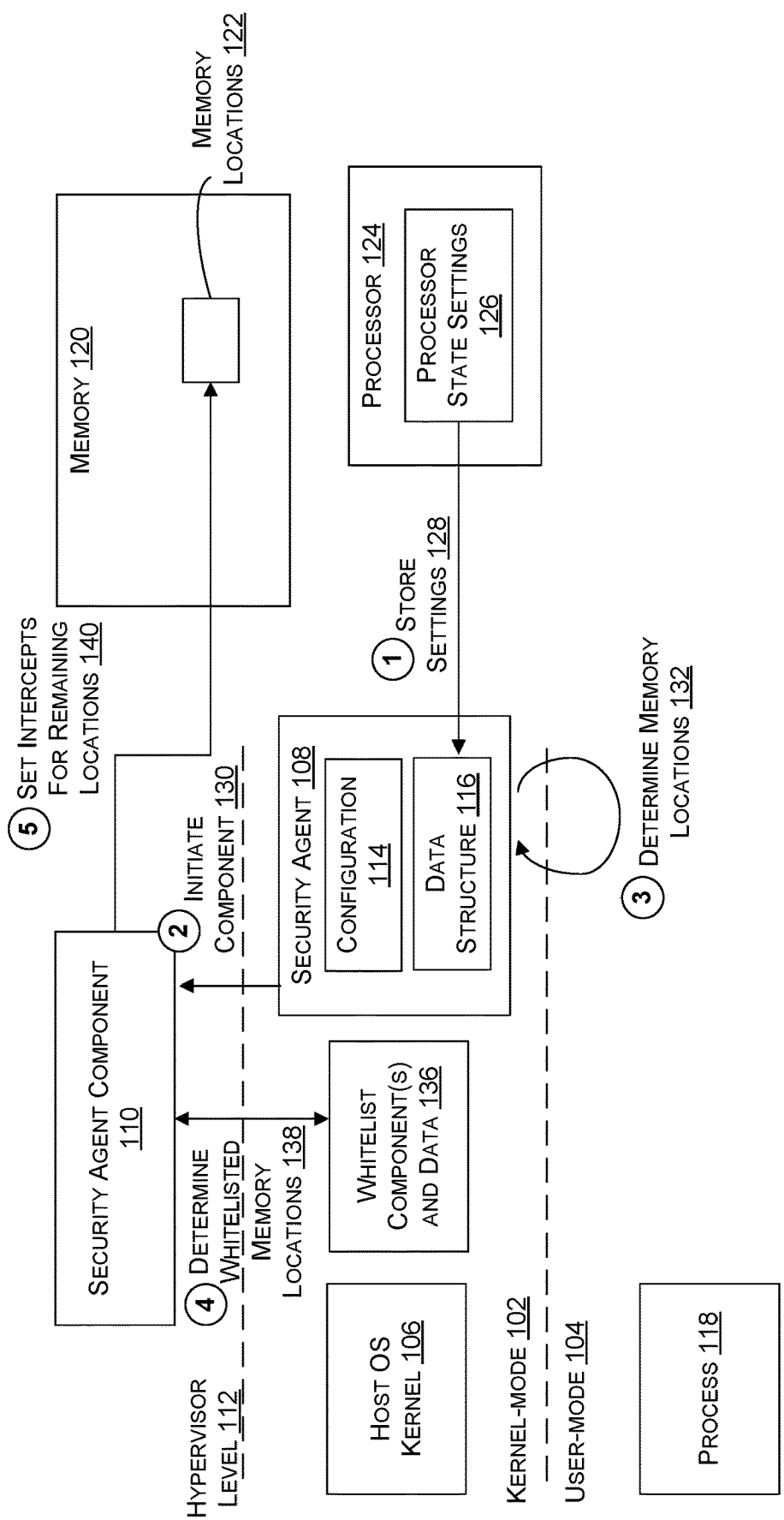

FIG. 1b illustrates an overview of a security agent and security agent component configured to determine whitelisted memory locations and to exclude memory pages that include those whitelisted memory locations from a set of memory pages including other, intercepted memory locations. As illustrated, the security agent component 110 may utilize whitelist component(s) and data 136, at 138, to determine whitelisted memory locations. The security agent component 110 then excludes memory pages having the whitelisted memory locations and, at 140, sets intercepts for the remaining memory locations that are not associated with the excluded memory pages.

In various implementations, the whitelist component(s) and data 136 may include a data structure, such as a list, received from a remote security service (e.g., as part of the security agent 108 configuration), an executable component, or both. For example, the whitelist component(s) and data 136 may comprise an executable component, such as a virtual address space manager, which categorizes address spaces of memory 120 into different regions, such as page tables, hyperspace, session-space, loader mappings, system-cache, PFN database, non-paged pool, paged pool, system PTEs, HAL heap, etc. These regions may be received in a specification from a remote security service or may be identified by the virtual address space manager based on their size and alignment specifications. Look-up tables, shadow page tables, or both, may be used to lookup the regions and identify which region a memory location 122 corresponds to, if any. Also, one of these regions, or a portion of a region, may be associated with a parameter whitelisting that region or portion of a region. In one implementation, the security agent component 110 may build or extend the whitelist component(s) and data 136 or memory regions based on memory access pattern(s) of known safe component(s).

In some implementations, one or more components of the computing device may be identified as known safe components. Such known safe components may, for instance, behave in a manner similar to a malicious process or thread, making it difficult to distinguish between the known safe component and malicious process strictly by behavior. If the known safe component is identified in advance, e.g., by the configuration 114 of the security agent 108, along with memory locations or memory regions associated with that known safe component, those memory locations or memory regions may be whitelisted, either by a component such as a virtual address space manager or in a list received from a remote security service.

As described above with respect to FIG. 1a, the security agent 108 may initiate the security agent component 110 as hypervisor and, at 132, identify memory locations 122 to be intercepted. In various implementations, once the memory locations 122 have been identified, the security agent component 110 may determine a set of memory pages that include the identified memory locations 122 and determine, at 138, any whitelisted memory locations. The determining of a set of memory pages is described above. To determine, at 138, the whitelisted memory locations, the security agent component 110 consults the whitelist component(s) and data 136. The security agent component 110 may, in some implementations, determine the set of memory pages for the identified memory locations 122 first and then determine whether any of those memory pages are associated with a whitelisted memory location or whitelisted memory region. Those whitelisted memory pages are then excluded by the security agent component 110 from the set of memory pages. Alternatively, the security agent component 110 may compare the identified memory locations 122 to the whitelisted memory locations or whitelisted memory regions and then determine memory pages for any of the identified memory locations 122 that are not whitelisted. This set of memory pages with whitelisted memory locations not included is referred to herein as the set of remaining memory pages.

At 140, the security agent component 110 sets intercepts for the set of remaining memory pages. As described above, this may include setting privilege attributes for the memory pages included in the set of remaining memory pages.

Figure 1C:
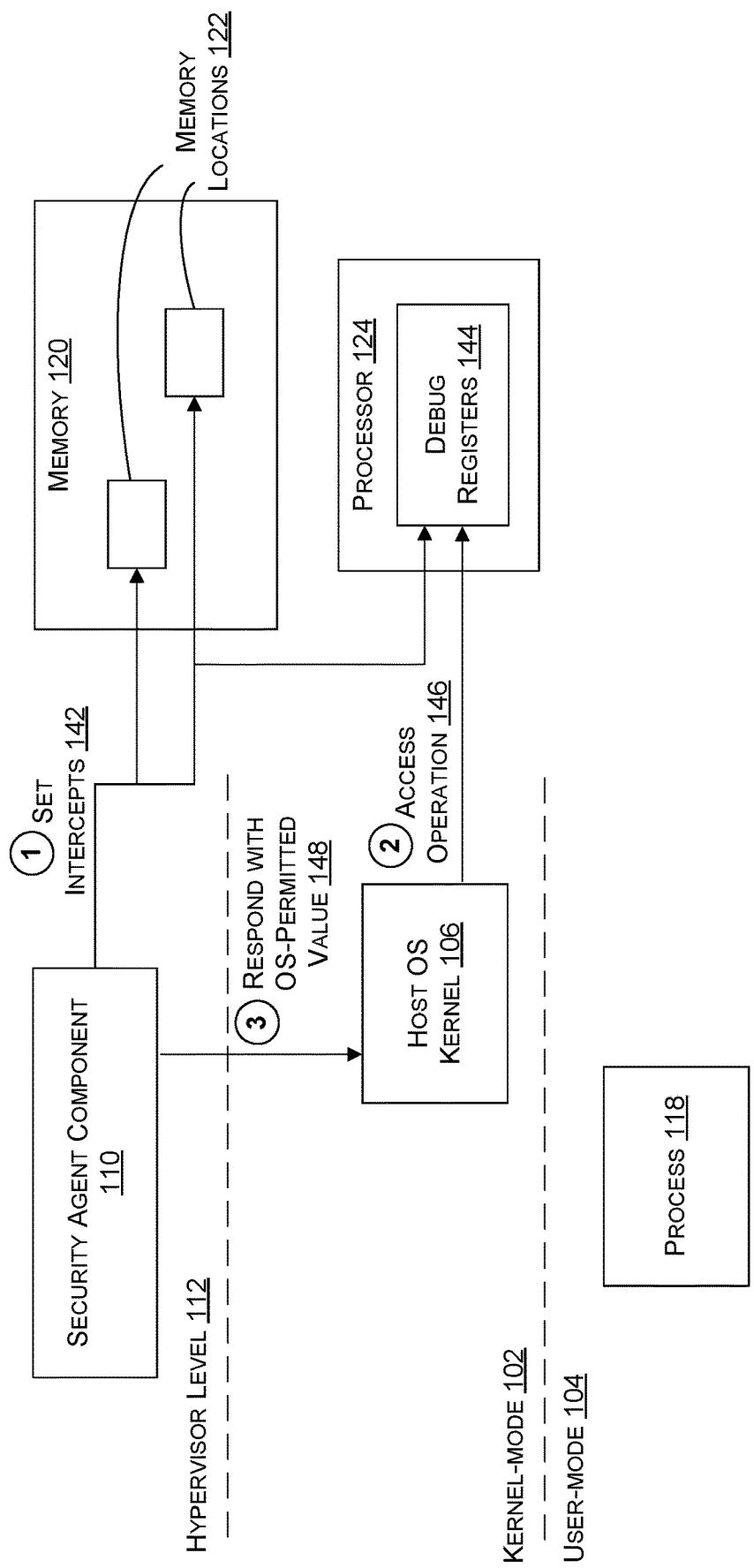

FIG. 1c illustrates an overview of a security agent and security agent component configured to intercept debug registers and provide an operating-system-permitted result responsive to access by the operating system of the debug registers. As illustrated, at 142, the security agent component 110 may set intercepts for debug registers 144 and, at 146, note an access operation, such as a read operation, from the operating system (e.g., from the host OS kernel 106). At 148, the security agent component 110 then responds to the operating system's access operation with an operating-system-permitted value.

Debug register(s) 144 may be registers used by processor 124 for program debugging, among other possible uses. Processor 124 may be an x86 series processor and include, for example, six debug registers, two of which may be used for control and status. Each debug register 144 may store a memory address and may be associated with a condition that triggers a notification—e.g., writing to the memory address, reading from the memory address, executing code stored at the memory address.

In some implementations, the operating system of the computing device may prohibit the storing of memory addresses associated with kernel-mode code or data from being stored in a debug register 144. The operating system may query the debug register(s) 144 on some basis (e.g., periodic) to determine whether the debug register(s) 144 store non-permitted memory addresses.

In various implementations, the security agent 108 may store memory addresses in some or all of the available debug register(s) 144. The memory addresses stored in the debug register(s) 144 may be specified by the configuration 114 of the security agent 108.

In further implementations, at 142, the security agent component 110 (initiated by the security agent 108, as described above) then sets intercepts for the debug register(s) 144. Setting intercepts for the debug register(s) 144 may include setting intercepts for instructions for accessing the debug register(s) 144.

At 146, the security agent component 110 then notes an access operation, such as a read operation, from the operating system seeking to determine whether a debug register 144 stores an operating-system-permitted value. At 148, the security agent component 110 then responds to the operating system with an operating-system-permitted value. If the debug register 144 being read is storing a memory address not permitted by the operating system, the security agent component 110 may respond with a false, operating-system-permitted value.

In some implementations, when a process 118 attempts some access with respect to a memory address stored in a debug register 144 (e.g., reading, writing, executing, etc.), the security agent 108 is informed of the access and may respond in a manner specified by its configuration 114 (e.g., take some security action such as monitoring or killing the process 118, respond with a false indication of success, etc.).

In various implementations, the security agent 108 may also identify one or more of the memory addresses stored by the debug register(s) 144 as memory locations to be intercepted. The security agent component 110 then sets intercepts for those memory addresses by, e.g., determining the memory pages that include the memory addresses and setting privilege attributes for those memory pages. In this way, two methods may be used by the security agent 108 and security agent component 110 to detect operations associated with a memory address.

In further implementations, in addition to use of debug registers and page privilege attributes for certain memory addresses, the security agent 108 may identify other memory locations, and the security agent component 110 may set intercepts (e.g., page privilege attributes) for those other memory locations, as described above with respect to FIG. 1a.

FIG. 1d illustrates an overview of a security agent and security agent component configured to intercept control register(s) and respond to a write operation directed at one of the control registers with a false indication of success. As illustrated, at 150, the security agent component 110 sets intercepts on instructions for accessing control register(s) 152. The security agent component 110 then notes an access operation, at 154, and responds, at 156, with a false indication of success and/or with a security action.

Control registers 152 may be registers of the processor 124 which change or control the behavior of the processor 124 or another device. x86 series processors may include control registers such as CR0, CR1, CR2, CR3, and CR4, and x86-64 series processors may also include EFER and CR8 control registers. Such control registers may each have a specific or general purpose, and control registers 152 may include any, all, or none of these x86 series processor control registers.

In some implementations, at least one of the control registers 152 may include an on setting for a security feature of the computing device. For example, control registers 152 may include a CR4 register that stores an on setting for a security feature called Supervisor Mode Execution Prevention (SMEP). SMEP may prevent the processor 124 from executing code in a user mode memory range while the privilege of the processor 124 is still in kernel mode, essentially preventing kernel mode privilege escalation. If process 118 is a malicious process or thread operating in kernel mode, however, it is able to turn off SMEP, as any kernel mode process or thread can set the on setting in CR4 to an off value.

In further implementations, the security agent 108 may determine which of the control register(s) 152 to protect. For example, the configuration 114 of the security agent 108 may specify that the CR4 register of control register(s) 152 should be protected. At 150, then, the security agent component 110 (initiated by the security agent 108, as described above) may set intercepts for the control register(s) 152 that are to be protected. Setting intercepts for those control register(s) 152 may include, at 150, setting intercepts for instructions seeking to access those control register(s) 152.

In some implementations, at 154, the security agent component 110 then notes an instruction seeking to access one of the control register(s) 152, such as a write operation seeking to write an off value to a CR4 register to turn off a security feature. The security agent component 110 then responds, at 156, with a false indication of success or by initiating a security action (e.g., killing the process 118 that requested the write operation or monitoring that process 118).

Figure 1E:
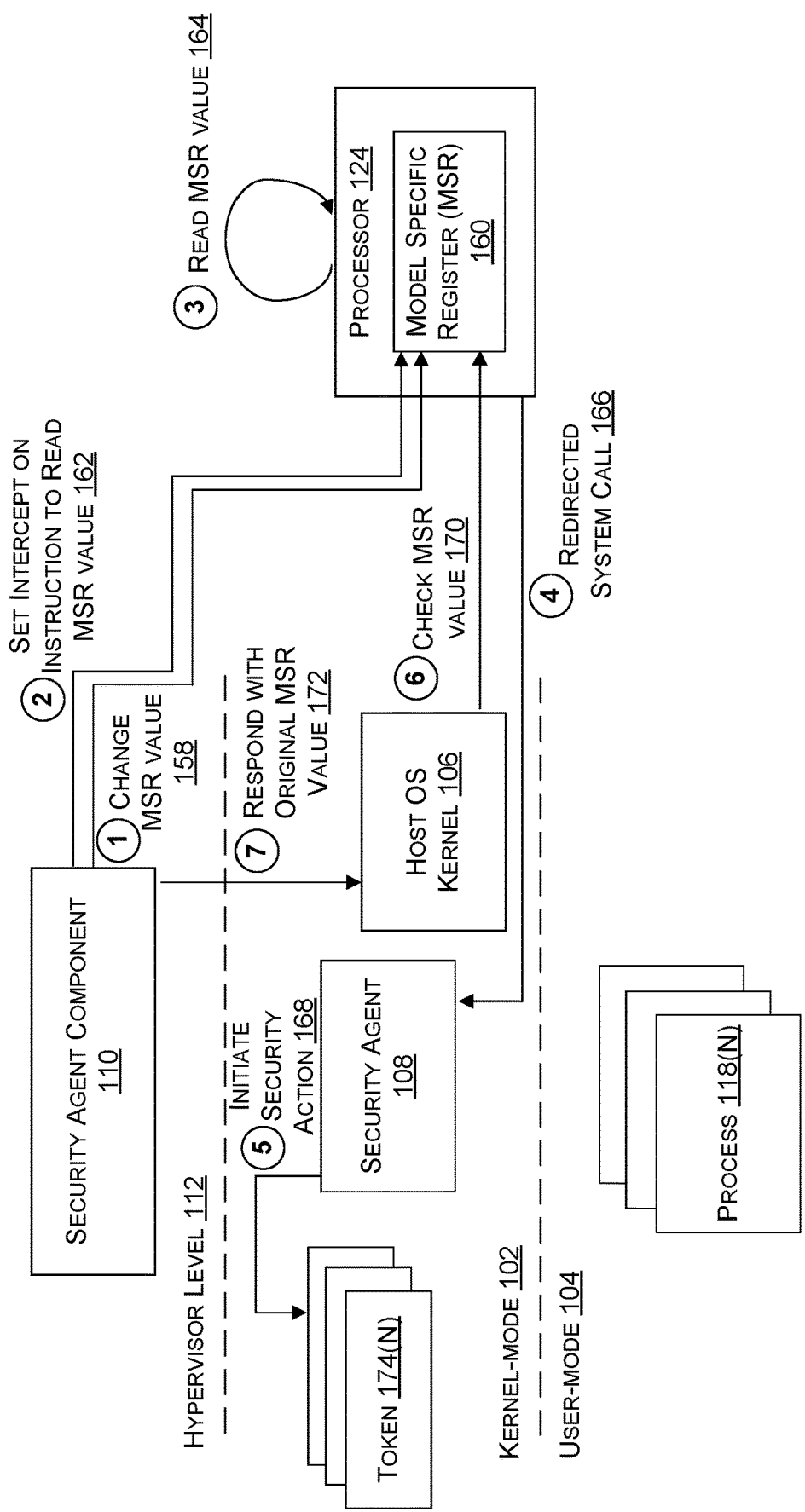

FIG. 1e illustrates an overview of a security agent component initiated as a hypervisor of a computing device, the security agent component being configured to redirect system calls to the security agent, intercept read operations from a process, thread, or component different from a processor that are directed to a processor configuration register, such as a Model Specific Register (MSR) of the processor, and respond to the read operations with a permitted result. As illustrated, at 158, the security agent component 110 (executing as a hypervisor of a computing device) may change a value of a MSR 160 of a processor 124 of the computing device from an original MSR value to an updated MSR value. This may be done when the host computing device first loads (e.g., boots up). At 162, the security agent component 110 may set an intercept for instructions for performing read operations on the MSR 160. Setting an intercept at 162 may include setting an intercept for non-processor entities (e.g., processes, threads, or components different from the processor 124) who are attempting to read the value of the MSR 160. In other words, after setting the intercept at 162, instructions for performing MSR 160 read operations from entities different from the processor 124 are intercepted, while instructions for performing MSR 160 read operations from the processor 124 are not intercepted. Thus, the processor 124 will read the updated MSR value at 164, causing system calls to be redirected to the security agent 108 at 166, thereby allowing the security agent 108 to initiate a security action at 168 in response to receiving a system call.

A Model Specific Register (MSR) 160 may be a type of control register (or processor configuration register) used by processor 124 for directing system calls to a function that is designated to handle the system call. For example, processor 124 may be an x86 series processor and include, for example, a MSR 160 that stores executable code signed by an OS vendor. This signed code may include, among other things, an original MSR value that corresponds to a memory address of a function of the host OS kernel 106 that is to handle a system call. The original MSR value is a "permitted" value in the sense that certain system components periodically check the value of the MSR 160 to verify that it is set to the permitted, original MSR value. Such system components may include a Kernel Patch Protection (KPP) component of the host OS kernel 106, such as the PatchGuard™ introduced by Microsoft Corporation® of Redmond, Washington for Windows-based OSes. PatchGuard is a technology designed to detect rootkits that have changed the value of the MSR 160 in order to attack a host computing device with malware. PatchGuard is configured to detect the changed MSR value and effectively cause the system to crash and reboot as a mechanism to prevent an attack. Thus, the host OS kernel 106 may not permit the value of the MSR 160 to be changed, else the system will crash and reboot.

Thus, the operating system (or host OS kernel 106) may query the MSR 160 on some basis (e.g., periodic) to determine whether the value of the MSR 160 has changed from its permitted, original MSR value to something else. At 170, the security agent component 110 may note an access operation, such as a read operation, from the operating system (e.g., from the host OS kernel 106), which is a component that is different from the processor 124. It is to be appreciated that the security agent component 110 may note access operations (e.g., read operations) from any process, thread, or component that is different from the processor 124. For example, an antivirus driver (a component that is different from the processor 124) may attempt to read the value of the MSR 160, and the security agent component 110 may similarly note the access operation at 170 from the antivirus driver.

At 172, the security agent component 110 may then respond to the noted access operation with the original MSR value, even though the actual value of the MSR 160 has been changed to the updated MSR value. Because the original MSR value returned at 172 is a permitted value (e.g., an operating-system-permitted value), the requesting process, thread, or component (e.g., the host OS kernel 106) suspects nothing is amiss, and the host computing device does not crash or reboot, which allows the security agent 108 to continue to receive redirected system calls at 166 without the system crashing. In this manner, the security agent 108 is configured to hook functions that handle system calls without the host OS kernel 106 knowing about the security agent's hooking of system call functions because the security agent component 110 can intercept read operations directed to the MSR 160 and obfuscate this value change.

A "system call" is a mechanism that signals to the host OS kernel 106 when an application desires access to a resource, such as the file system, registry, display, network, and/or similar resources. For instance, a process 118 may represent a process 118 invoked by an application that is executing on the host computing device, the process 118 being responsible for requesting to open a file on behalf of the application. This may cause the generation of a system call for opening the file, and, at 164, may cause the processor 124 to execute an instruction for performing a read operation on the MSR 160. Because the value of the MSR 160 was changed at 158, the processor 124 reads the updated MSR value at 164, which redirects the system call to the security agent 108. After redirecting the system call to the security agent 108, the system call can be routed to the appropriate function (e.g., an open file function to access the file system of the host computing device).

In some implementations, after the intercept is set at 162 in order to hook a system call function, and after the security agent 108 receives a redirected system call, the security agent 108 is thereby informed of the system call and may respond in a manner specified by its configuration 114 (e.g., take some security action at 168). The security action taken by the security agent 108 at 168 can vary, depending on the configuration 114 of the security agent 108. For example, the configuration 114 may instruct the security agent 108 to identify a process 118, thread, or component associated with the system call, and monitor the process 118, thread, or component, such as by monitoring events on the host computing device that result from execution of the process, thread, or component.

In another example, the receipt of a system call by the security agent 108 may trigger another type of security action at 168. For instance, the security agent 108, prior to receipt of the system call, may be configured to monitor the creation (and destruction) of processes 118(1)-(N) (collectively 118) on the host computing device by observing process creation events associated with user-level processes 118. In a similar manner, the creation (and destruction) of threads can be monitored on the host computing device by observing thread creation events associated with threads. Accordingly, FIG. 1e shows that processes 118(1)-(N) or threads may be associated with corresponding tokens 174(1)-(N) (collectively 174) in the kernel mode 102. The individual tokens 174 may include privilege information that indicates a privilege with which a corresponding process 118 or a corresponding thread is allowed to execute. For example, a first token 174(1) associated with a corresponding first user-level process 118(1) or a thread may indicate that the first user-level process 118(1) or the thread is allowed to execute with an Administrator ("Admin") privilege, which may be a greater privilege than say a "Guest" privilege. Thus, a second token 174(2) associated with a corresponding second user-level process 118(2) or a thread may indicate that the second user-level process 118(2) or the thread is allowed to execute with a comparatively lower "Guest" privilege, but not an Admin privilege. Thus, the privilege information (e.g., indications of Admin, Guest, and other types of privileges) in the tokens 174 may indicate what level of access a corresponding user-level process 118 or thread has to resources and components on the system. In the running example, the first user-level process 118(1) or thread executes with greater privilege than the second user-level process 118(2) or thread, and therefore, the first user-level process 118(1) or thread has access to resources and/or components on the system that the second user-level process 118(2) or thread may not be allowed to access.

In some cases, malware may leverage an exploit in the host OS kernel 106 that allows the malware to change an original token value of a token 174 to a different, updated token value. This may be done, for example to change the privilege level of a given process 118 or a given thread to a higher/greater privilege level (e.g., changing a token 174 for a "Guest" process 118 or thread to an "Admin" level token 174 with greater privilege). This can effectively transform a non-Admin process 118 or thread into an Admin process 118 or thread so that malware can gain greater access to system resources and/or components for implementing an attack on the host computing device.

Even though the security agent 108 may not detect the initial change of a token's 174 value from an original token value into something else, the security agent 108 doesn't have to detect the token value change to detect malware that changed the token value. This is because the security agent 108 can operate on the assumption that any malware that changed a token value is eventually going to make a system call to do something useful with the newfound privilege afforded to the given process 118 or the given thread. Thus, by receiving redirected system calls at 166, the security agent 108 may initiate a security action at 168 by using the received system call as a trigger to implement the security action on data associated with user-level processes 118 or thread executing in the user mode 104 of the computing device. For instance, the security agent 108—having observed process creation events associated with the processes 118—can identify data associated with those processes, such as data in the form of the kernel-level tokens 174, which are associated with their corresponding user-level processes 118. A similar approach may be used to identify data associated with threads. The security action initiated at 168 can therefore include a determination as to whether values of any of the kernel-level tokens 174 have changed from an original token value to an updated token value (e.g., from a "Guest" privilege value to an "Admin" privilege value). If the security agent 108 determines that a token value has changed, the security agent 108 may restore the updated token value of the changed kernel-level token 174 to its original token value, terminate/block/kill the user-level process 118 or thread corresponding to the changed token 174, suspend the user-level process 118 or thread corresponding to the changed token 174, and/or monitor events on the computing device that result from the corresponding user-level process 118 or thread executing on the computing device. In some embodiments, such as in response to determining that it is not possible to restore the updated token value to its original token value, the security agent 108 may restore the updated token value of the changed kernel-level token 174 to a "safe" or "inert" value, or some value, other than the original value, that reflects the original state. In some implementations, the security agent 108 may determine whether it is "safe" to restore the token value back to its original value (or another value that is safe, inert, and/or reflects the original state), and if not, the security agent 108 may take some other type of remedial action, like blocking, suspending, or terminating the corresponding process 118 or thread, or allowing the process 118 or thread to execute as normal, but monitoring the process 118 or thread as it executes, and similar remedial actions. Thus, the system calls received by the security agent 108 can be used as a trigger event to have the security agent 108 determine whether something abnormal, suspicious, or the like, has happened or not, as a means of detecting malware on the host computing device.

Other events may trigger the security agent 108 to initiate a security action at 168 that determines whether values of any of the kernel-level tokens 174 have changed from an original token value to an updated token value. For instance, a context switch between one thread and another thread may be detected through changes in another processor MSR 160 (or through changes in another register, such as a GS register), and this context switch may act as a trigger event to have the security agent 108 check for a change of a token 174 value.

It is also to be appreciated that a MSR 160 is merely one kind of processor configuration register whose value can be changed at 158 of FIG. 1e. Thus, a similar technique to that described with reference to FIG. 1e can be utilized with any type of processor configuration register, such as a different type of processor configuration register in place of the MSR 160.

Figure 1F:
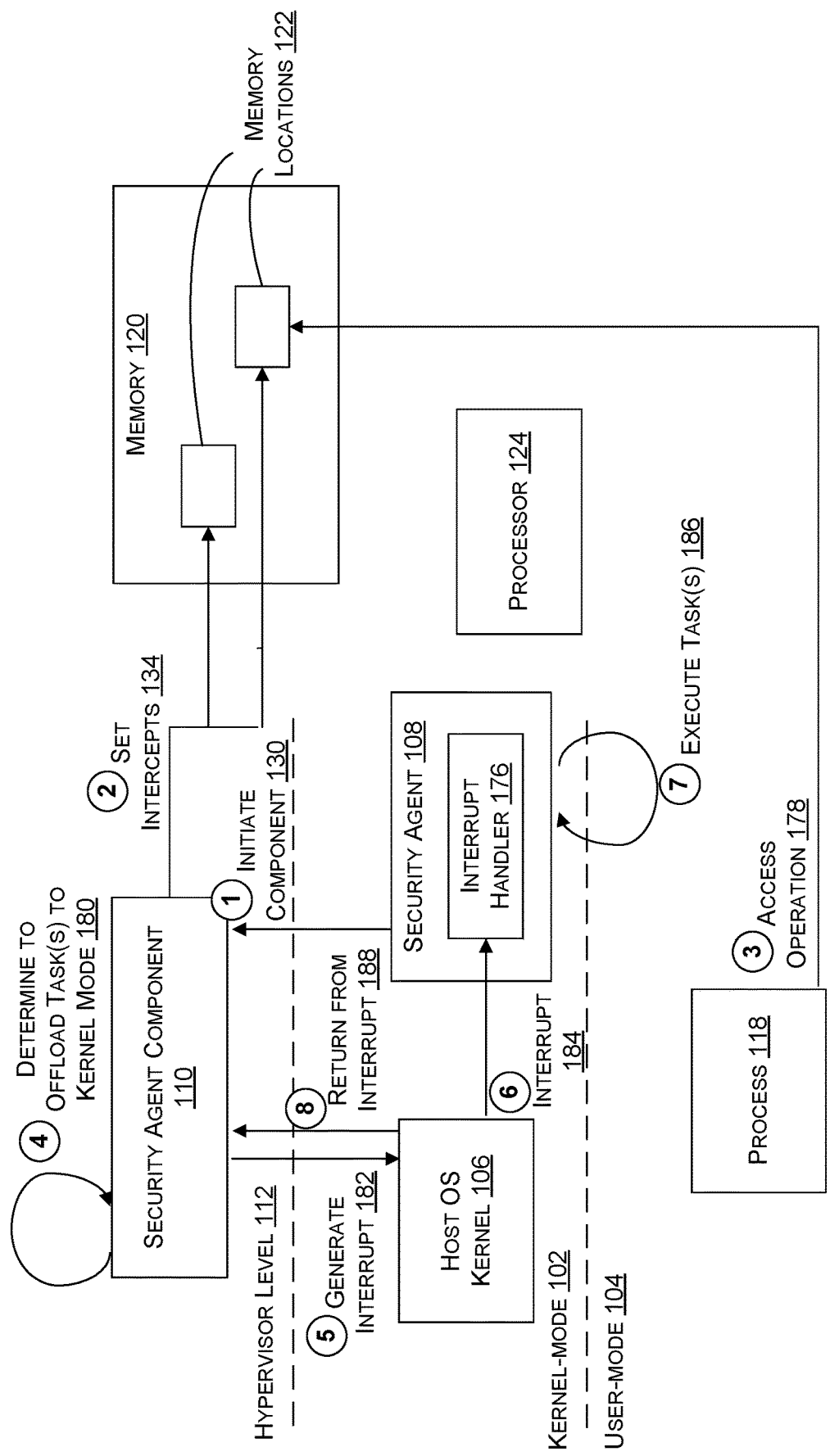

FIG. 1f illustrates an overview of a security agent configured to initiate execution of a security agent component as a hypervisor of computing device, the security agent component setting intercepts on a subset of memory locations of the computing device and generating interrupts in order to offload task execution to the security agent. As illustrated in FIG. 1f, the security agent 108 may include, among other sub-components described herein, an interrupt handler 176 for handling interrupts generated by the security agent component 110, when the security agent component 110 acts as a hardware device of the system. For example, the security agent 108, executing as a kernel-level component, may be configured to register with the operating system (e.g., the host OS kernel 106) as a hardware device driver that includes the interrupt handler 176 for handling interrupts generated by the security agent component 110. Interrupts may be generated by the security agent component 110 in order to offload execution of at least some tasks to the security agent 108, which executes as a kernel-level component. This may provide a performance gain for the computing device as compared to executing tasks exclusively by the security agent component 110 as a hypervisor. Because an interrupt blocks processing on the computing device, the offloading of tasks from hypervisor to kernel mode can be done without creating a window of opportunity for a threat, such as malware, to attack while the security agent component 110 offloads tasks to the security agent 108. Thus, malware's window of opportunity to attack the computing device is minimized, or eliminated, while improving the performance of the system by virtue of the offloading of task execution to the kernel level instead of executing tasks exclusively in the hypervisor.

FIG. 1f shows, at 130, initiating the security agent component 110 as a hypervisor, and, at 134, the security agent component 110 setting intercepts for instructions and/or the memory locations 122 in the memory 120. As described herein, these memory locations 122 may be determined by the configuration 114 of the security agent 108. Setting the intercepts at 134 may include the security agent component 110 determining the memory pages which include the memory locations 122 that are to be protected, and adjusting or setting privilege attributes (e.g., "read-write," "read only," "inaccessible," etc.) of the determined memory pages.

When a process 118, at 178, seeks to perform a memory access—e.g., to execute code stored at a memory page marked "non-executable"—the security agent component 110 may receive notification of the access operation, and, at 180, the security agent component 110 may determine whether to offload, to the kernel-level security agent 108, one or more tasks relating to the noted access operation for execution in the kernel mode 102 as opposed to executing the tasks in the hypervisor level 112. This may be due to the performance impact, from a computational cost standpoint, of executing relatively "expensive" tasks exclusively in the hypervisor level 112. For instance, tasks relating to the noted access operation that are to be executed by the security agent 108, or a component (e.g., 110) thereof, may include, without limitation, determining whether the page affected by the access operation at 178 corresponds to any of the pages that had their privilege attributes adjusted or set by the security agent component 110 at 134, determining current addresses and/or offsets of the pages that had their privilege attributes adjusted/set, and/or determining whether to temporarily reset the privilege attribute of the affected page or not, among other possible tasks described herein and known to a person having ordinary skill in the art.

Depending on the particular scenario (e.g., the type of data stored in the memory locations 122, whether pages have been paged in or paged out, had their addresses changed, and/or had their offsets changed, etc.), execution of these tasks may come with a computational cost that is quite significant. Thus, in at least one example, the determining at 180 may include determining a computational cost of executing one or more of the tasks relating to the access operation at 178, and determining whether the computational cost meets or exceeds a threshold computational cost. If the computational cost meets or exceeds the threshold computational cost, the security agent component 110 may determine to offload task execution of one or more tasks to the security agent 108. Computational cost may be measured in various ways, such as expected processor cycles, amount of data (e.g., number of bytes of data to be processed, etc.), expected amount of time to execute the task(s), and the like. Moreover, offloading tasks to the security agent 108 executing as a kernel-level component may improve latency, and/or it may avoid a situation where all OS functions (including hardware operations) are halted, which would be the case if the hypervisor component exclusively executed while the tasks were simultaneously in progress. In fact, during hypervisor task execution, packets may be lost, movement of an input device (e.g., a mouse) may go undetected, and so on. Thus, computational cost can account for these type of impacts as well, and/or the determination at 180 can be based on the notion that OS functions and the like will not be halted and/or data will not be lost as a result of the offloading. The determination at 180 may also take into account a current workload of the host computing device (e.g., offload during busy/high workload times). Other techniques may be utilized to determine whether to offload tasks at 180. For example, the configuration 114 of the security agent 108 may include information regarding predesignated tasks to offload and/or task criteria that are to be met in order to offload task execution, which may be based on the type of access operation at 178, the type of data stored in the affected memory location(s) 112, and the like.

At 182, in response to noting the access operation at 178, and in response to determining to offload one or more tasks to the security agent 108 at 180, the security agent component 110 may generate an interrupt that is received by the host OS kernel 106. The interrupt generated by the security agent component 110 may be similar to the way that other hardware device interrupts are generated on the host computing device for actual hardware devices, such as the keyboard, the mouse, and the like. However, because the security agent component 110 is not an actual hardware device, but acts as a hardware device (e.g., a virtual hardware device), the security agent component 110 may be configured to execute an instruction that, upon execution, places the interrupt in a queue as a pending interrupt. This instruction may be in the form of an "interrupt_exiting" flag instruction, or a similar instruction, which allows a hypervisor component to generate an interrupt and have it kept in a pending state until the host OS kernel 106 is able to receive interrupts. Without such an instruction, the interrupt generated at 182 may get lost (i.e., not received by the host OS kernel 106 or the interrupt handler 176 of the security agent 108) if and when the host OS kernel 106 clears or disables interrupts, such as by executing a "clear interrupt" (CLI) flag instruction, for example. That is, when the host OS kernel 106 doesn't want to have its processing blocked, the host OS kernel 106 may execute clear or disable interrupts (e.g., via a CLI instruction) to make sure no interrupts come in, and, at a subsequent time, the host OS kernel 106 may execute a "set interrupt" (STI) flag instruction to receive all interrupts that are pending. This does not present an issue with interrupts generated by actual hardware devices because those interrupts stay pending after they are generated, ensuring that the host OS kernel 106 will receive them when interrupts are allowed. The security agent component 110 may mimic this behavior by executing a particular instruction to have its own interrupts treated as pending interrupts until the host OS kernel 106 executes an STI instruction, for example, allowing receipt of any pending interrupts thereafter.

Upon receipt of the interrupt, the host OS kernel 106 may cause execution of the interrupt handler 176 at 184, or may otherwise provide the security agent 108 (acting as a hardware device driver) with notification of the interrupt at 184. At 186, the security agent 108 may execute the one or more offloaded tasks relating to the noted access operation in response to the interrupt. Again, the task(s) executed at 186 may vary, and may include, without limitation, determining whether the page affected by the access operation at 178 corresponds to any of the pages that had their privilege attributes adjusted/set by the security agent component 110 at 134, determining current addresses and/or offsets of the pages that had their privilege attributes adjusted/set, and/or determining whether to temporarily reset the privilege attribute of the affected page or not, among other possible tasks. In some implementations, the offloaded task(s) may be communicated to the security agent 108 by the security agent component 110 after generating the interrupt at 182. If the computational cost associated with executing these tasks is significant, the performance gains of offloading task execution can also be significant, thereby improving the operation of the computing device while monitoring access operations to protected memory locations 122. For instance, a protected memory location 122 of a page affected by the noted access operation may store user credentials, and the access operation at 178 may include a read operation attempting to read the user credentials at the protected memory location 122, whereby the privilege attribute of the page was set to an inaccessible value. In this case, tasks relating to determining whether the affected page corresponds to the page that includes the memory location 122 with the user credentials, determining whether to reset the privilege attribute of that page, and/or determining a current address and/or offset of the page may be associated with a significant computational cost when executed in the hypervisor level 112 as compared to a lower computational cost of offloading this task execution to the kernel mode 102.

FIG. if also shows that the security agent 108 may be configured to return from the interrupt at 188 so that task execution can return to the security agent component 110. This may be triggered by the security agent 108 finishing the execution of the task(s) at 186. In some implementations, upon returning from the interrupt at 188, the security agent component 110 may execute one or more remaining tasks relating to the noted access operation at 178, such as temporarily resetting a privilege attribute of the affected page that includes a protected memory location(s) 122. The security agent component 110 may also continue noting other operations affecting pages of memory 120.

Figure 2A:
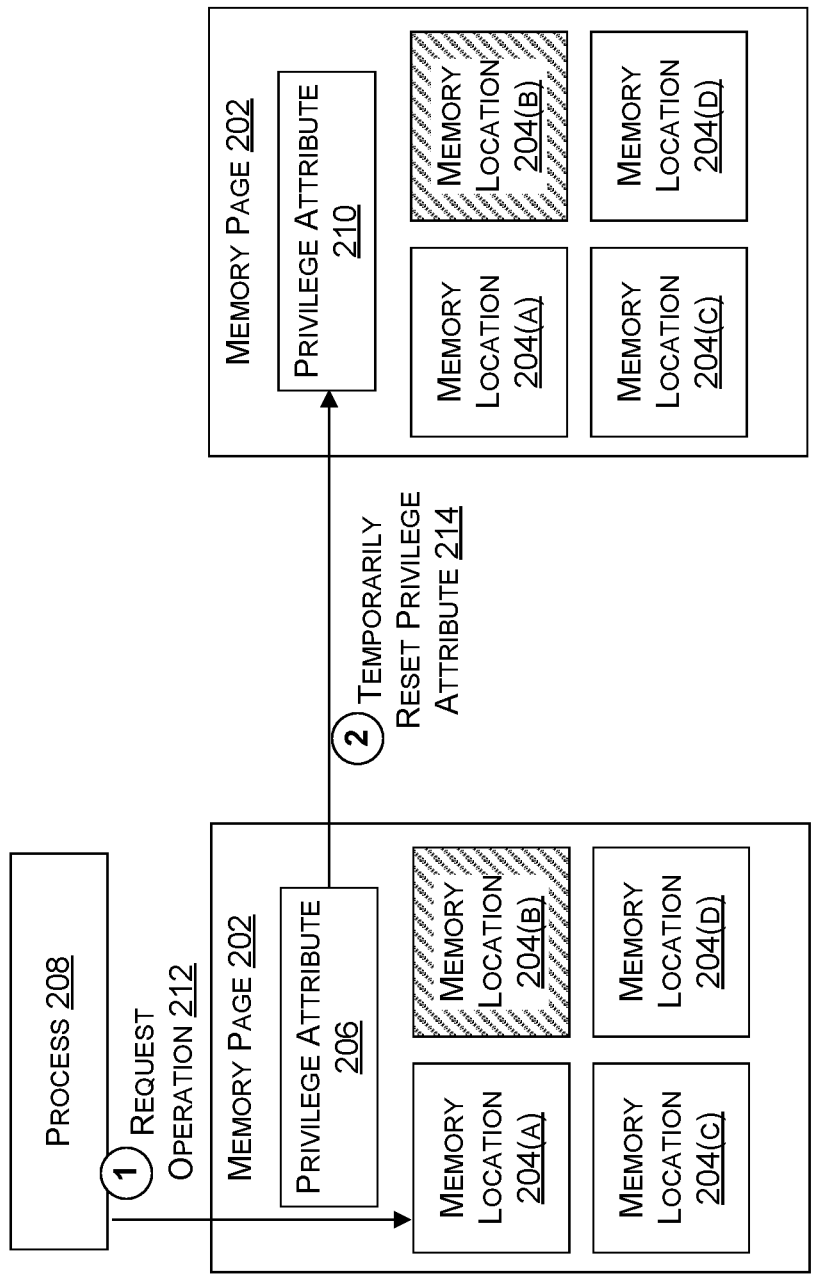
FIGS. 2a-2b illustrate overviews of techniques for protecting memory locations through privilege attributes of pages while enabling operations on other memory locations associated with those pages.
Figure 2B:
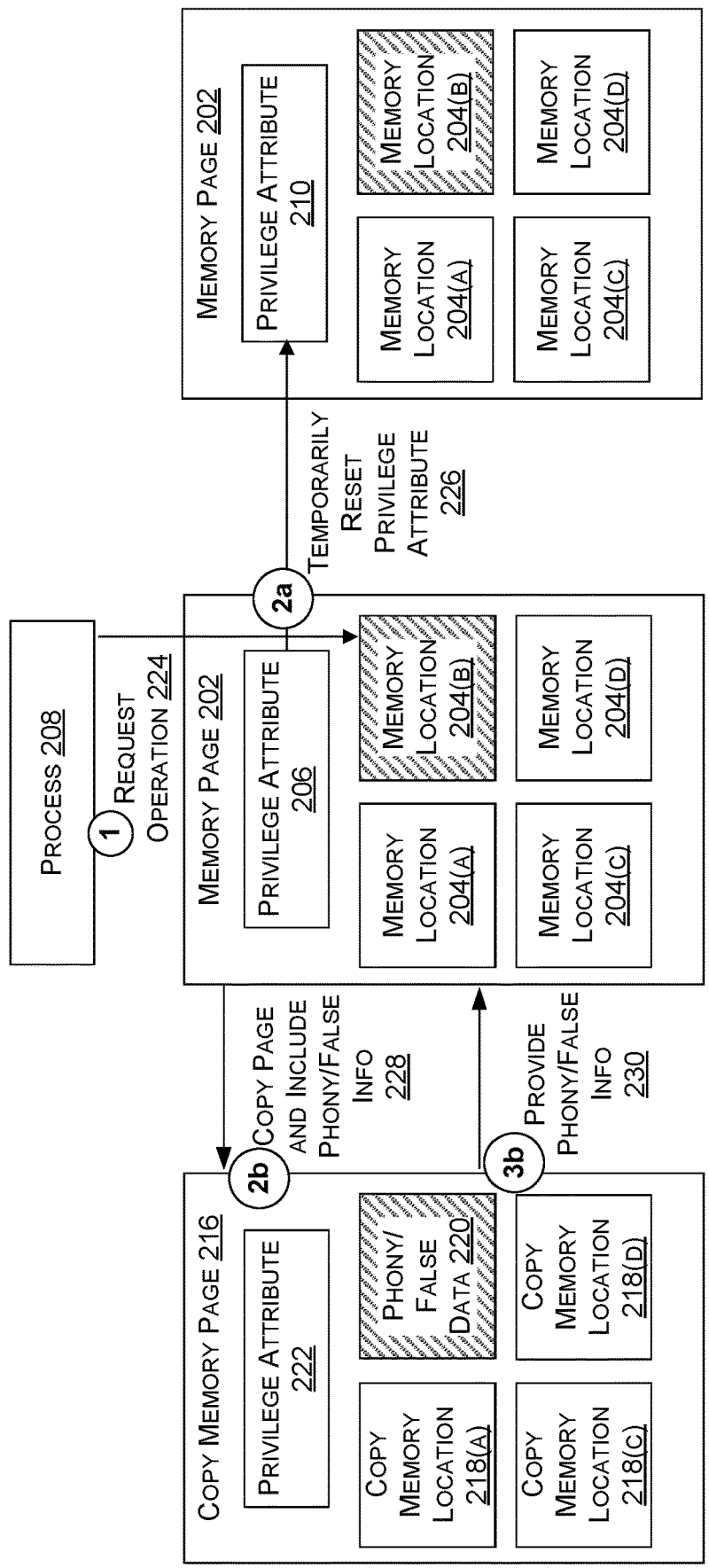

FIGS. 2a-2b illustrate overviews of techniques for protecting memory locations through privilege attributes of pages while enabling operations on other memory locations associated with those pages. FIG. 2a includes a memory page 202 having at least memory location 204(*a*), memory location 204(*b*), memory location 204(*c*), and memory location 204(*d*), as well as privilege attribute 206. Further, a process 208, as shown, may make requests associated with the memory locations 204. Also, as shown in FIG. 2a, that privilege attribute 206 may be temporarily reset to privilege attribute 210. A process 208 may, at 212, request an operation not permitted by privilege attribute 206. Because the operation may be directed to memory location 204(*a*), which is not one of the memory locations determined by the security agent 108, the security agent component 110 may, at 214, temporarily reset the privilege attribute 206 to privilege attribute 210 to allow the operation to proceed.

In various implementations, memory page 202 may be an example of the memory pages discussed above with reference to memory 120, memory locations 204 may be examples of memory locations 122, and privilege attributes 206 and 210 may be examples of the privilege attributes discussed above with reference to memory 120. Further, process 208 may be an example of process 118.

Process 208 may request, at 212, an operation such as a read from or write to a memory location 204, or an execute operation to execute code stored at memory location 204. Upon noting the request, various tasks relating to the noted operation may be performed. As noted above, the security agent component 110 may perform one or more of these tasks, such as when a computational cost associated with the task(s) is less than a threshold computational cost, or when the task(s) is otherwise designated (e.g., by the configuration 114) as one to be executed by the security agent component 110. However, in some cases, the security agent component 110 may generate an interrupt in order to offload one or more of the tasks relating to the noted operation to the security agent 108 executing as a kernel-level component. Thus, the security agent component 110 and/or the security agent 108 may determine the memory page 202 associated with the request as well as the specific memory location 204 on that memory page 202. The security agent component 110 and/or the security agent 108 may then determine if the memory location is one of the memory locations identified by the security agent 108. In FIG. 2a, the memory location 204 identified by the security agent 108 is memory location 204(*b*), and the operation is a request associated with memory location 204(*a*). In such an example, if the operation does not conflict with the privilege attribute 206, the operation is allowed to proceed. If, on the other hand, the operation is not permitted by the privilege attribute 206, then the security agent component 110 may, at 214, temporarily reset the privilege attribute 206 to privilege attribute 210 to allow the operation to proceed. For example, if privilege attribute 206 is "inaccessible" (e.g., to prevent reads of user credentials stored at memory location 204(*b*)), the security agent component 110 may temporarily reset the privilege attribute 206 to be privilege attribute 210, which may be "read only." Or in another example, if the privilege attribute 206 is "non-executable" (e.g., to prevent execution of code stored at memory location 204(*b*)), the security agent component 110 may temporarily reset the privilege attribute 206 to be privilege attribute 210, which may be "executable." After the operation has been processed, the security agent component 110 may return the privilege attribute 210 to be privilege attribute 206.

FIG. 2b includes a memory page 202 having at least memory location 204(a), memory location 204(b), memory location 204(c), and memory location 204(d), as well as privilege attribute 206. A process 208, as shown, may make requests associated with the memory locations 204, and privilege attribute 206 may be temporarily reset to privilege attribute 210. As is further illustrated, copies of information stored in memory page 202 may be stored in a copy memory page 216. The copy memory page 216 may include copy memory location 218(a), which includes a copy of the information stored at memory location 204(a); copy memory location 218(c), which includes a copy of the information stored at memory location 204(c); and copy memory location 218(d), which includes a copy of the information stored at memory location 204(d). Rather than storing a copy of the information from memory location 204(b), the copy memory page 216 may include phony/false or deceptive data or code 220. The copy memory page 216 may also include a privilege attribute 222, which may represent elevated privileges when compared to privilege attribute 206.

As illustrated, the process 208 may, at 224, request an operation affecting memory location 204(b). Because 204(b) is one of the memory locations identified by the security agent 108, the security agent component 110 may respond in one of a number of ways. At 226, the security agent component 110 may temporarily reset the privilege attribute 206 to be privilege attribute 210 in order to allow the operation to proceed. The security agent component 110 and/or the security agent 108 may then also identify the process, thread, or component that made the request for the operation at 224 and may monitor further activity of that process, thread, or component or terminate that process, thread, or component. Alternatively, the security agent component 110 may, at 228, generate copy memory page 216, including the phony/false or deceptive data or code 220, and may, at 230, allow the process 208 to access the phony/false or deceptive data or code 220.

Process 208 may request, at 224, an operation such as a read from or write to a memory location 204 or an execute operation to execute code stored at a memory location 204. Upon noting the request, the security agent component 110 and/or the security agent 108 may determine the memory page 202 associated with the request as well as the specific memory location 204 on that memory page 202. The security agent component 110 and/or the security agent 108 may then determine whether the memory location is one of the memory locations identified by the security agent 108. In FIG. 2b, the memory location 204 identified by the security agent 108 is memory location 204(b), and the operation is a request associated with memory location 204(b). Accordingly, the security agent component 110 and/or the security agent 108 determines that the memory location 204(b) is one of the memory locations identified by the security agent 108. In response, the security agent component 110 may take no action, which may result in the computing device crashing and rebooting. Alternatively, the security agent component 110 may take action to allow the operation and monitor further operation, allow the operation to occur on phony/false or deceptive data or code 220, or to provide a false indication of success to the process 208.

In a first example, the operation request at 224 may be a write operation to modify privilege information stored at memory location 204(b). In response to the request for the write operation, the security agent component 110 may allow the operation to proceed by temporarily resetting, at 226, the privilege attribute 206 to be privilege attribute 210. The security agent component 110 and/or the security agent 108 may also identify the process, thread, or component that made the request for the write operation (i.e., process 208) and may monitor further activity of that process, thread, or component. Alternatively, the security agent component 110 may copy, at 228, the contents of memory page 202 to copy memory page 216, set the privilege attribute 222 to read-write, and temporarily redirect from memory page 202 to copy memory page 216. The security agent component 110 may then allow the write operation to proceed, and the process 208 may modify the copy memory page 216 and receive an indication of success. The security agent component 110 may then return mapping to point to memory page 202. Thus, the memory location 204(b) is protected, the process 208 is tricked into thinking it succeeded, and both objectives are achieved without the computing device crashing.

In a second example, the operation request at 224 may be a read operation to obtain user credentials stored at memory location 204(b). In response to the request for the read operation, the security agent component 110 may allow the operation to proceed by temporarily resetting, at 226, the privilege attribute 206 to be privilege attribute 210. The security agent component 110 and/or the security agent 108 may also identify the process, thread, or component that made the request for the read operation (i.e., process 208) and may monitor further activity of that process, thread, or component. Alternatively, the security agent component 110 may copy, at 228, the contents of memory page 202 to copy memory page 216, set the privilege attribute 222 to read only, and temporarily redirect from memory page 202 to copy memory page 216. In addition to copying the contents of memory page 202, the security agent component 110 may store phony/false or deceptive data 220 at the same offset in copy memory page 216 as the memory location 204(b) is in memory page 202. The security agent component 110 then allows the read operation to proceed, and the process 208 reads the phony/false or deceptive data 220. After the read operation, the security agent component 110 may then return mapping to point to memory page 202. If the process 208 obtained deceptive data 220, such as a username and password for a monitored account, then future use of that username and password may trigger monitoring by the security agent 108 and/or the security agent component 110.

In a third example, the operation request at 224 may be an execute operation to execute code stored at memory location 204(b). In response to the request for the execute operation, the security agent component 110 may allow the operation to proceed by temporarily resetting, at 226, the privilege attribute 206 to be privilege attribute 210. The security agent component 110 and/or the security agent 108 may also identify the process, thread, or component that made the request for the execute operation (i.e., process 208) and may monitor further activity of that process, thread, or component. Alternatively, the security agent component 110 may copy, at 228, the contents of memory page 202 to copy memory page 216, set the privilege attribute 222 to execute, and temporarily redirect from memory page 202 to copy memory page 216. The security agent component 110 may then allow the execute operation to proceed, and the process 208 may execute false code 220 stored at copy memory page 216 and receive an indication of success. The security agent component 110 may then return mapping to point to memory page 202. Thus, the memory location 204(b) is protected, the process 208 is tricked into thinking it succeeded, and both objectives are achieved without the computing device crashing.

Example System

FIG. 3 illustrates a component level view of a computing device configured with a security agent and security agent component configured to execute as a hypervisor. As illustrated, computing device 300 comprises a memory 302 storing a security agent 304, a security agent component 306, page tables 308, user credentials 310, privilege information 312, an OS 314, processes and data 316, and whitelist component(s) and data 318. Also, computing device 300 includes processor(s) 320 with register(s) 322, a removable storage 324 and non-removable storage 326, input device(s) 328, output device(s) 330 and communication connections 332 for communicating with other computing devices 334.

In various embodiments, memory 302 is volatile (such as RAM), nonvolatile (such as ROM, flash memory, etc.) or some combination of the two. Memory 302 may be an example of memory 120, which is described above in detail with respect to FIG. 1. The security agent 304 may be an example of security agent 108, which is described above in detail with respect to FIG. 1. As described herein, the security agent 304 may register with the operating system 314 as a hardware device driver that includes an interrupt handler 305 for handling interrupts generated by the security agent component 306. The interrupt handler 305 may be an example of the interrupt handler 176, which is described above in detail with respect to FIG. 1. The security agent component 306 may be an example of security agent component 110, which is described above in detail with respect to FIG. 1. Page tables 308 may be any sort of page tables, such as page tables mapping virtual addresses to physical addresses of memory pages. Uses of such page tables 308 are described above in detail with respect to FIG. 1 and FIGS. 2a-2b. User credentials 310 may be any sort of user credentials, such as user names and passwords for one or more processes or components. Privilege information 312 may be indications of privileges, such as admin privileges for processes, threads, user accounts, etc. The OS 314 may be any sort of OS, such as the host OS kernel 106 described above in detail with respect to FIG. 1. The processes and data 316 may be any sort of processes and data, such as process 118, which is described above in detail with respect to FIG. 1, or process 208, which is described above in detail with respect to FIGS. 2a-2b. The whitelist component(s) and data 318 may be any sort of components and data, such as whitelist component(s) and data 136, which is described above in detail with respect to FIG. 1b.

In some embodiments, the processor(s) 320 is a central processing unit (CPU), a graphics processing unit (GPU), or both CPU and GPU, or other processing unit or component known in the art. Processor 320 supports hardware-based virtualization (such as Intel™ VT-x) with second level address translation (SLAT). Processor(s) 320 may be an example of processor 124, which is described above in detail with respect to FIGS. 1a-1d. Also, processor 320 may include one or more processor register(s) 322. Processor register(s) 322 may be example(s) of either or both of the debug registers 144, which are described above in detail with respect to FIG. 1c, or the control registers 152, which are described above in detail with respect to FIG. 1d.

Computing device 300 also includes additional data storage devices (removable and/or non-removable) such as, for example, magnetic disks, optical disks, or tape. Such additional storage is illustrated in FIG. 3 by removable storage 324 and non-removable storage 326. Non-transitory computer-readable media may include volatile and nonvolatile, removable and non-removable tangible, physical media implemented in technology for storage of information, such as computer readable instructions, data structures, program modules, or other data. System memory 302, removable storage 324 and non-removable storage 326 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 300. Any such non-transitory computer-readable media may be part of the computing device 300.

Computing device 300 also has input device(s) 328, such as a keyboard, a mouse, a touch-sensitive display, voice input device, etc., and output device(s) 330 such as a display, speakers, a printer, etc. These devices are well known in the art and need not be discussed at length here.

Computing device 300 also contains communication connections 332 that allow the computing device 300 to communicate with other computing devices 334, such as device (s) of a remote security service.

Example Processes

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
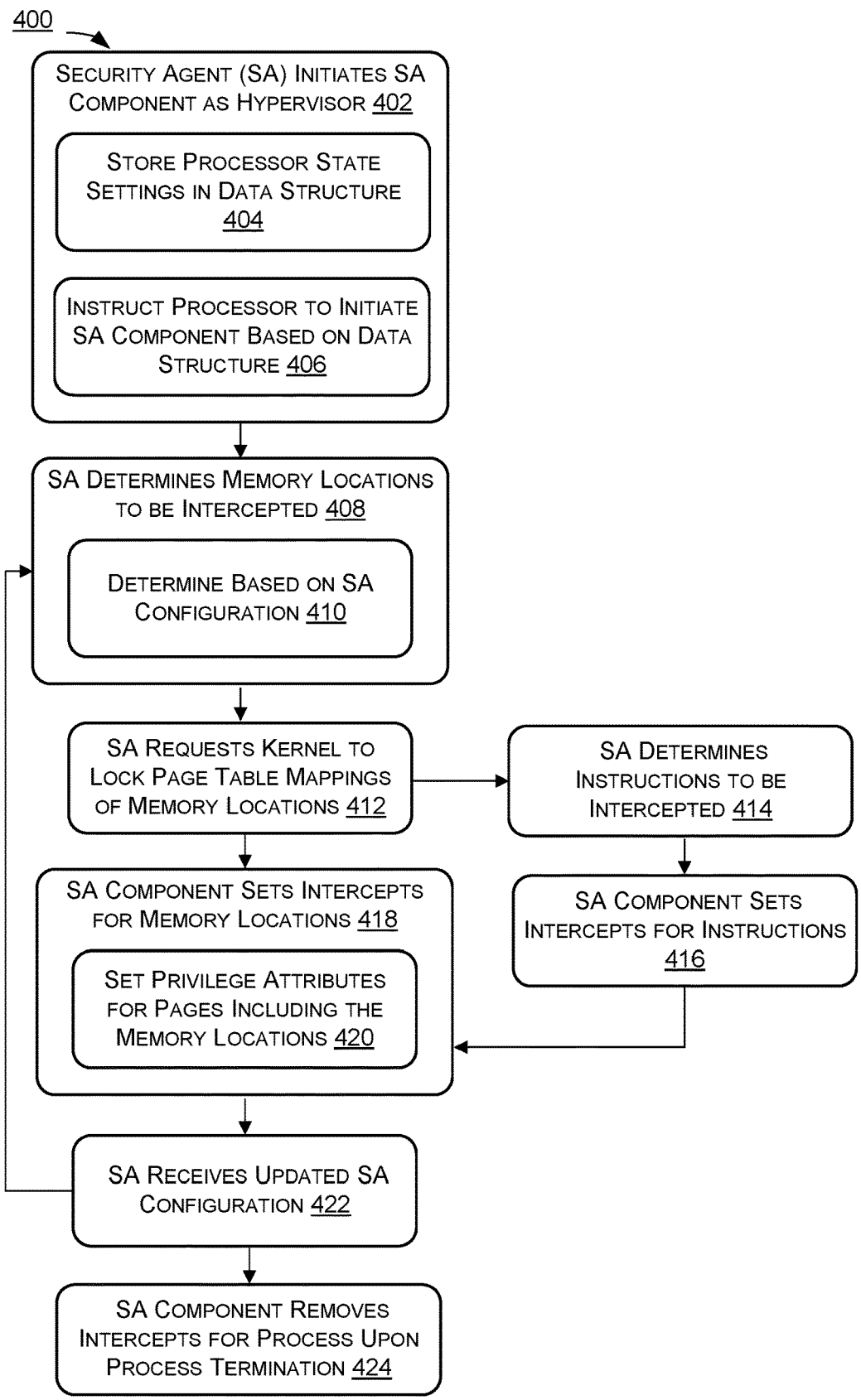
FIG. 4 illustrates an example process for initiating execution of a security agent component as a hypervisor for a computing device, determining memory locations of the computing device to be intercepted, and setting intercepts for the determined memory locations.

FIG. 4 illustrates an example process for initiating execution of a security agent component as a hypervisor for a computing device, determining memory locations of the computing device to be intercepted, and setting intercepts for the determined memory locations. The process 400 includes, at 402, a security agent on a computing device initiating a security agent component as a hypervisor for the computing device. The initiating may include, at 404, storing processor state settings in a data structure and, at 406, instructing a processor of the computing device to initiate the security agent component as the hypervisor based on the data structure. In some implementations, the security agent may include different routines for different operating systems, each of the different routines fixing as invariant a part of the data structure associated with the respective different operating system.

At 408, the security agent may then determine a subset of memory locations in the memory to be intercepted. At 410, the security agent may determine the subset based on a security agent configuration received from a security service.

At 412, the security agent may request that an operating system kernel of the computing device lock page table mappings of the memory locations of the subset of memory location.

At 414, the security agent may determine instructions to be intercepted and, at 416, the security agent component may set intercepts for the determined instructions. The operations at 414 and 416 may also be performed before the operations shown at 408-412 or concurrently with those operations.

At 418, the security agent component may set intercepts for memory locations of the determined subset of memory locations. At 420, setting the intercepts may include setting privilege attributes for pages which include the memory locations of the determined subset of memory locations, or it may include changing the physical memory location of such pages.

At 422, the security agent may receive an updated security agent configuration and, without rebooting, repeat the determining of the subset of memory locations at 408 and cause the security agent component to repeat the setting of the intercepts at 418.

At 424, the security agent component may remove intercepts corresponding to a process upon termination of the process.

Figure 5:
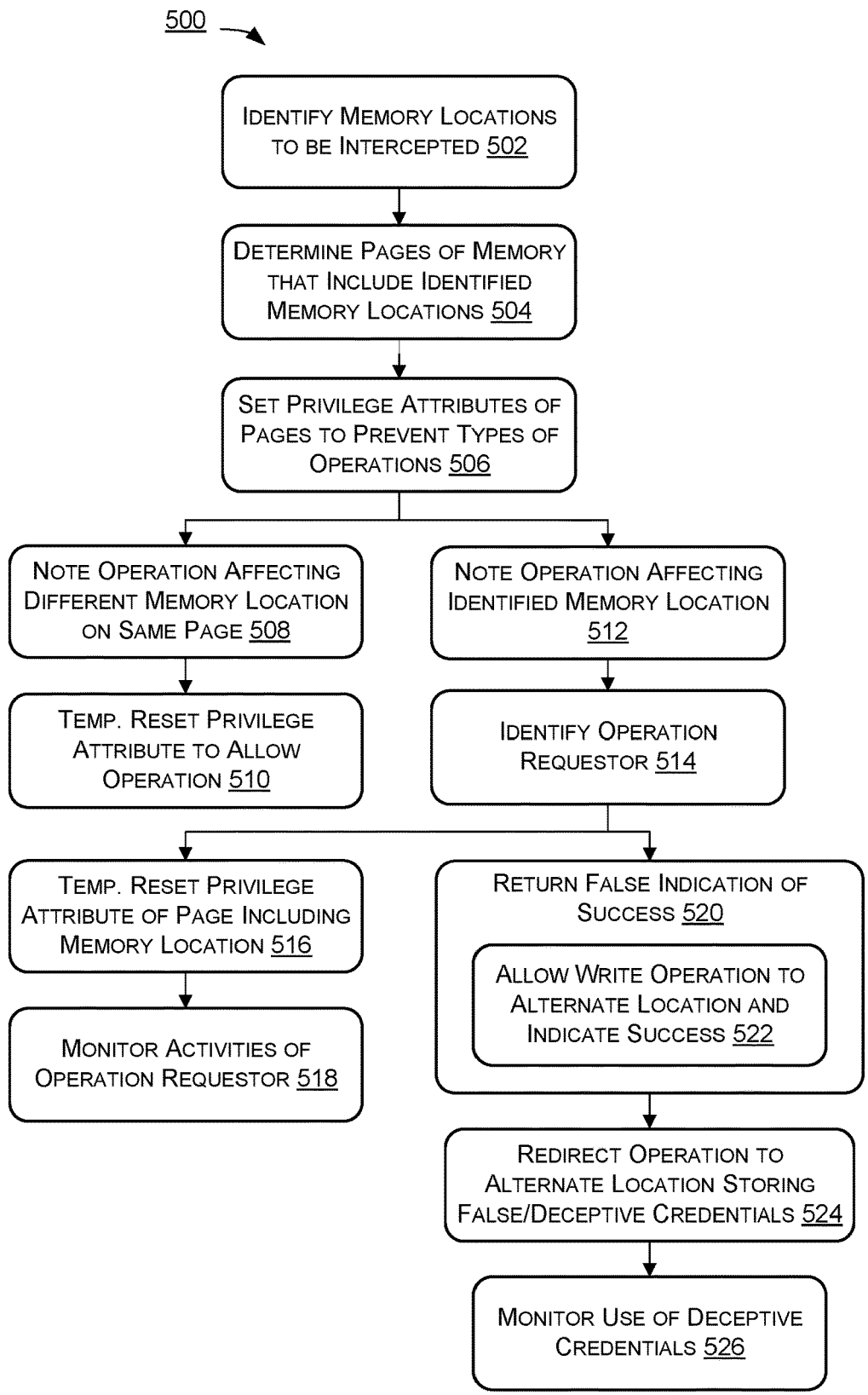
FIG. 5 illustrates an example process for protecting memory locations through privilege attributes of pages while enabling operations on other memory locations associated with those pages.

FIG. 5 illustrates an example process for protecting memory locations through privilege attributes of pages while enabling operations on other memory locations associated with those pages. The process 500 includes, at 502, identifying memory locations of a subset of memory locations in memory of the computing device to be intercepted. In some implementations, the identified memory locations include a memory location associated with privileges for a process. In further implementations, the identified memory locations include a memory location associated with user credentials.

At 504, pages of the memory which include the identified memory locations may then be determined.

At 506, privilege attributes of the pages may then be set to prevent specific types of operations from affecting the memory locations. When the identified memory locations include a memory location associated with privileges for a process, the specific types of operations may include write operations and the setting includes setting the privilege attribute for the page including the memory location to a read only value to prevent writes to the memory location. When the identified memory locations include a memory location associated with user credentials, the specific types of operations may include read operations and setting includes setting the privilege attribute for the page including the memory location to an inaccessible value to prevent reads of the memory location.

At 508, an operation affecting another memory location associated with one of the pages which differs from the identified memory location associated with that page may be noted.

At 510, the privilege attribute of the one of the pages may then be temporarily reset to allow the operation.

Before, during, or after the operations shown at 508-510, an operation affecting the identified memory location may, at 512, be noted.

At 514, a process, thread, or module that requested the operation may then be identified.

At 516, responsive to noting the operation at 512, the privilege attribute of the page including the one of the identified memory locations may be temporarily reset to allow the operation. At 518, after temporarily resetting the privilege attribute, activities of the process, thread, or module may be monitored.

At 520, responsive to noting the operation at 512, a false indication of success for the operation may be returned. At 522, returning the false indication of success includes allowing the write operation to an alternate memory location and returning an indication that the write operation was successful. At 524, the read operation may be redirected to be performed on an alternate memory location storing false or deceptive user credentials. At 526, use of the deceptive credentials may then be monitored. In some implementations, redirecting to an alternate memory location may involve copying contents of the page including the identified memory location to a page which includes the alternate memory location storing the false or deceptive user credentials.

Figure 6:
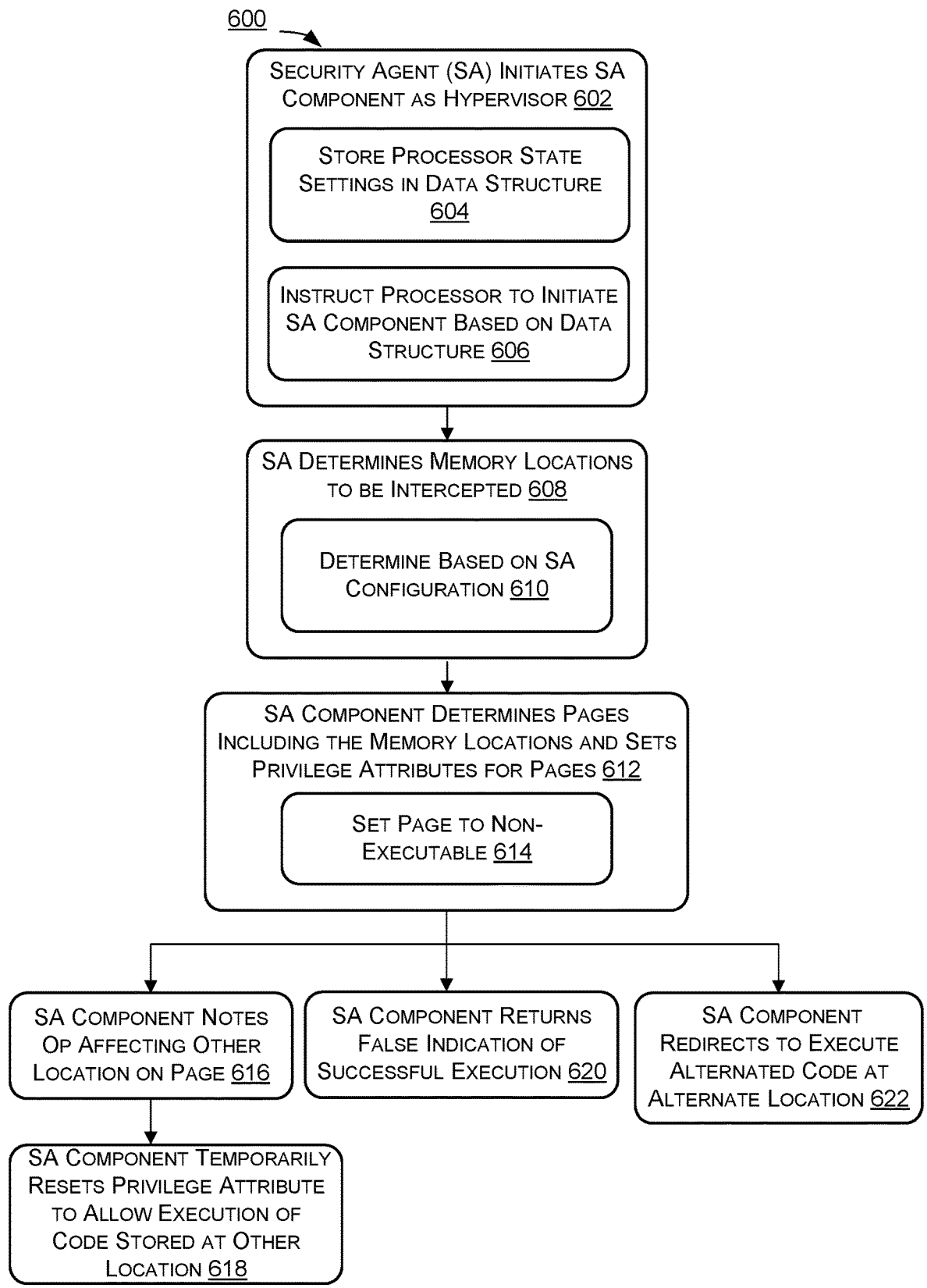
FIG. 6 illustrates an example process for determining memory locations to be intercepted and setting privilege attributes for memory pages including those memory locations, including setting a memory page to non-executable.

FIG. 6 illustrates an example process for determining memory locations to be intercepted and setting privilege attributes for memory pages including those memory locations, including setting a memory page to non-executable. The process 600 includes, at 602, a security agent on a computing device initiating a security agent component as a hypervisor for the computing device. The initiating may include, at 604, storing processor state settings in a data structure and, at 606, instructing a processor of the computing device to initiate the security agent component as the hypervisor based on the data structure.

At 608, the security agent may then identify memory locations in the memory to be intercepted. At 610, the security agent may identify those memory locations based on a security agent configuration received from a security service.

At 612, the security agent component then determines pages of memory that include the identified memory locations and sets privilege attributes for those pages to prevent specific types of access to the memory locations. For example, at 614, the security agent component may set at least one of the pages to non-executable to prevent execution of code stored at an identified memory location included in that page.

At 616, the security agent component may note an operation affecting another memory location associated with one of the pages which differs from an identified memory location associated with that page. For instance, the operation may involve execution of code stored at the other memory location. At 618, the security agent component may then temporarily reset the privilege attribute of the page to allow the execution of the code stored at the other memory location.

Alternatively, or additionally, at 620, the security agent component may return a false indication of success to a process seeking to execute the code stored at an identified memory location.

Alternatively, or additionally, at 622, the security agent component may cause an execute operation intended for the code stored at an identified memory location to be performed on other code stored at an alternate memory location.

Figure 7:
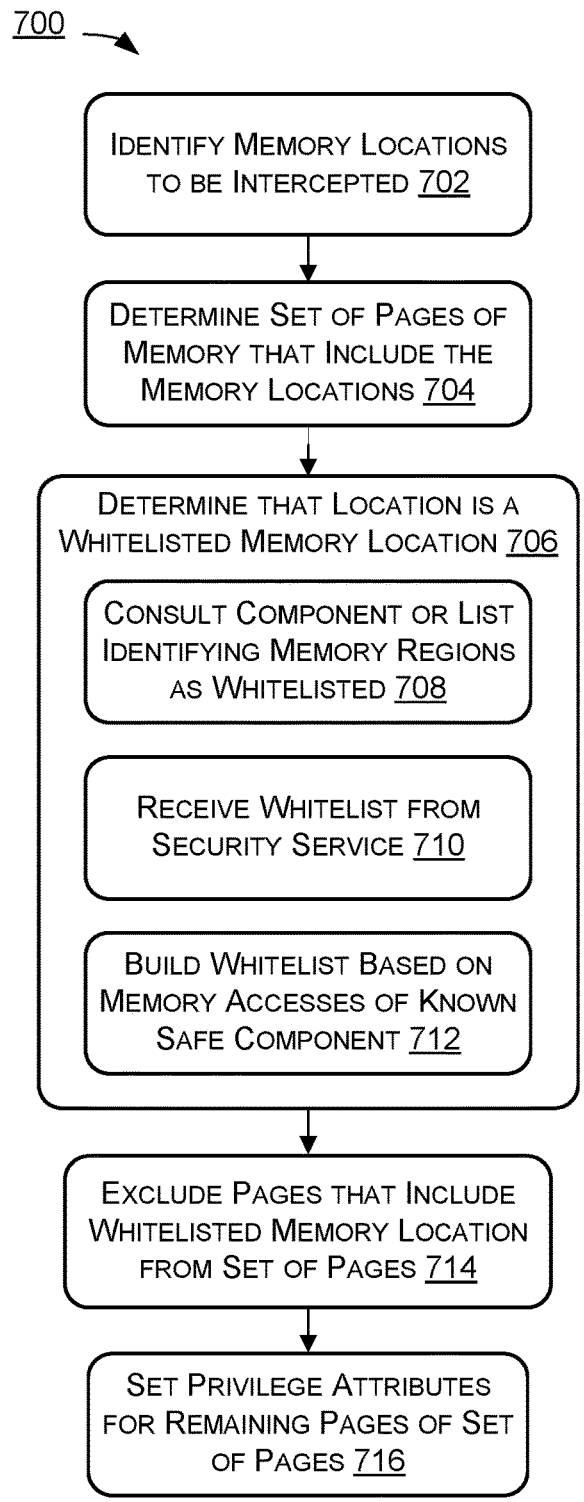
FIG. 7 illustrates an example process for determining that a memory location is whitelisted and excluding memory page(s) that include the whitelisted memory location from a set of pages to have their privilege attributes changed.

FIG. 7 illustrates an example process for determining that a memory location is whitelisted and excluding memory page(s) that include the whitelisted memory location from a set of pages to be intercepted. The process 700 includes, at 702, a security agent on a computing device initiating a security agent component as a hypervisor for the computing device and identifying memory locations in memory of the computing device to be intercepted.

At 704, the security agent component determines a set of pages of the memory, each of the pages include at least one of the identified memory locations.

At 706, the security agent component then determines that one of the memory locations is a whitelisted memory location. At 708, the determining may include consulting a component or list identifying different memory regions of the memory and indicating which memory regions are whitelisted. At 710, the determining may additionally or alternatively include receiving the list of different memory regions that are whitelisted from a security service. At 712, the determining may additionally or alternatively include building a list of whitelisted memory locations based on memory accesses of a known safe component.

At 714, the security agent component then excludes one or more pages that include a whitelisted memory location from the set of pages.

At 716, the security agent component then sets privilege attributes for remaining pages of the set of pages to prevent specific types of operations from affecting memory locations included in those pages.

Figure 8:
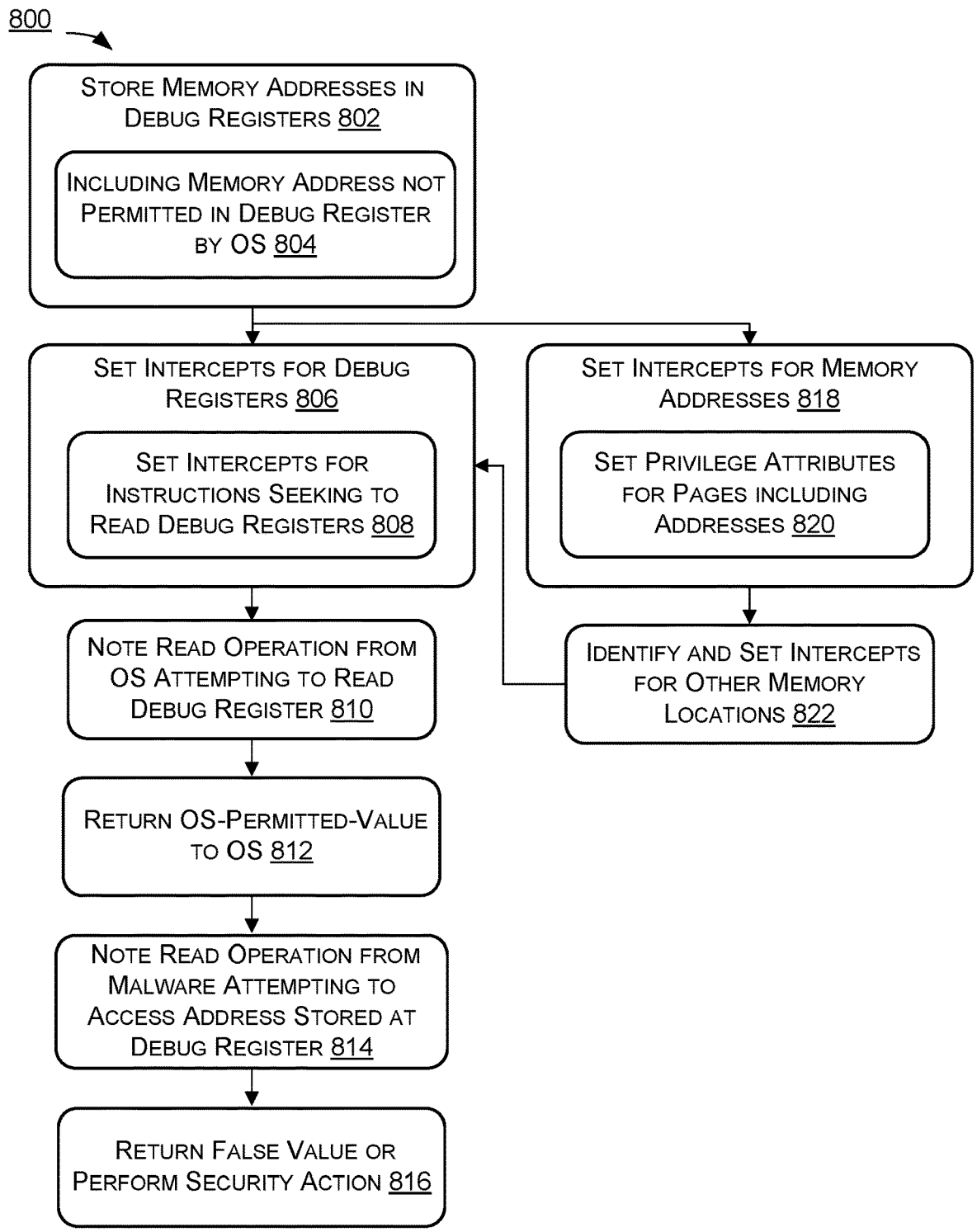
FIG. 8 illustrates an example process for intercepting accesses of debug registers and, when such accesses are from the operating system, responding with operating-system-permitted values.

FIG. 8 illustrates an example process for intercepting accesses of debug registers and, when such accesses are from the operating system, responding with operating-system-permitted values. The process 800 includes, at 802, a security agent on a computing device storing memory addresses in debug registers. At 804, such memory addresses may include memory addresses not permitted in a debug register by the operating system of the computing device. Such a memory address not permitted by the operating system to be stored in the debug registers may, for example, be associated with a kernel-mode component. Further, the security agent may initiate a security agent component as a hypervisor for the computing device.

At 806, the security agent component sets intercepts for the debug registers. At 808, setting the intercepts may include setting intercepts for instructions seeking to read the debug registers.

At 810, the security agent component notes a read operation from the operating system attempting to read one of the debug registers. At 812, in response to noting the read operation, the security agent component returns an operating-system-permitted value for the one of the debug registers to the operating system.

At 814, the security agent component may note a read operation from malware attempting to read one of the memory addresses stored in a corresponding one of the debug registers and, at 816, in response, return a false value to the malware or perform a security action.

At 818, the security agent component may further set intercepts for the memory addresses stored in the debug registers. At 820, the setting may include setting privilege attributes for memory pages which include the memory addresses.

At 822, the security agent may further identify other memory locations to be intercepted, and the security agent component may set privilege attributes for memory pages that include the other memory locations.

Figure 9:
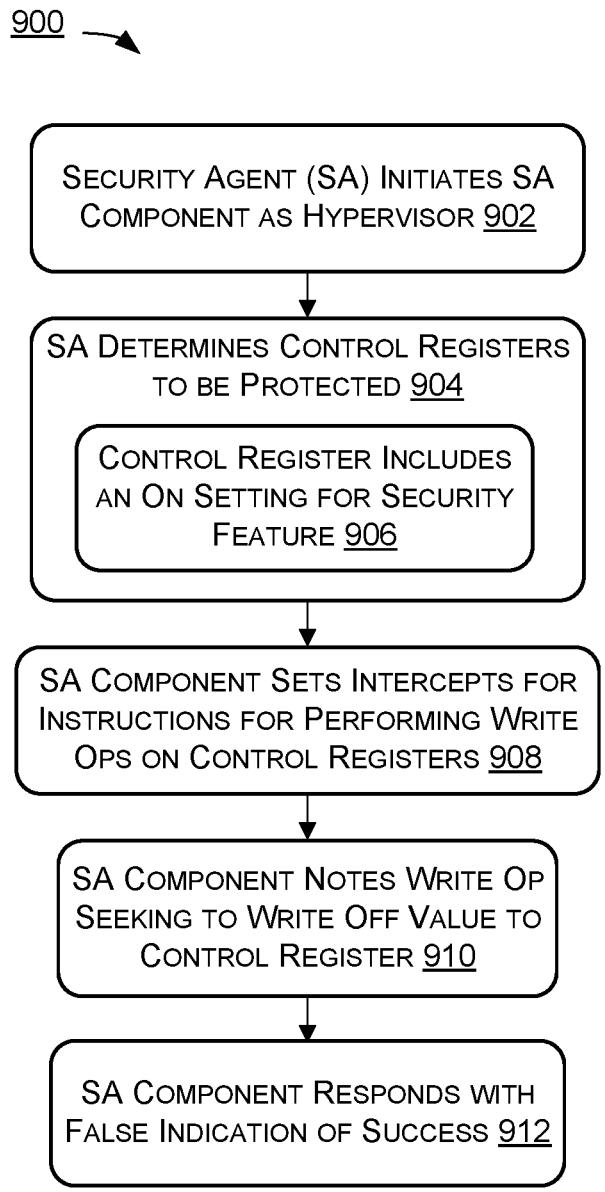
FIG. 9 illustrates an example process for intercepting instructions for accessing control registers.

FIG. 9 illustrates an example process for intercepting instructions for accessing control registers. The process 900 includes, at 902, a security agent on a computing device initiating a security agent component as a hypervisor for the computing device.

At 904, the security agent then determines control registers of the computing device to be protected. Such control registers may include, at 906, a control register storing an on setting for a security feature of the computing device.

At 908, the security agent component then sets intercepts for instructions for performing write operations on the control registers.

At 910, the security agent component further notes a write operation seeking to write an off value to the control register storing the on setting for the security feature. At 912, the security agent component responds to the write operation with a false indication that the security feature has been set to the off value.

Figure 10:
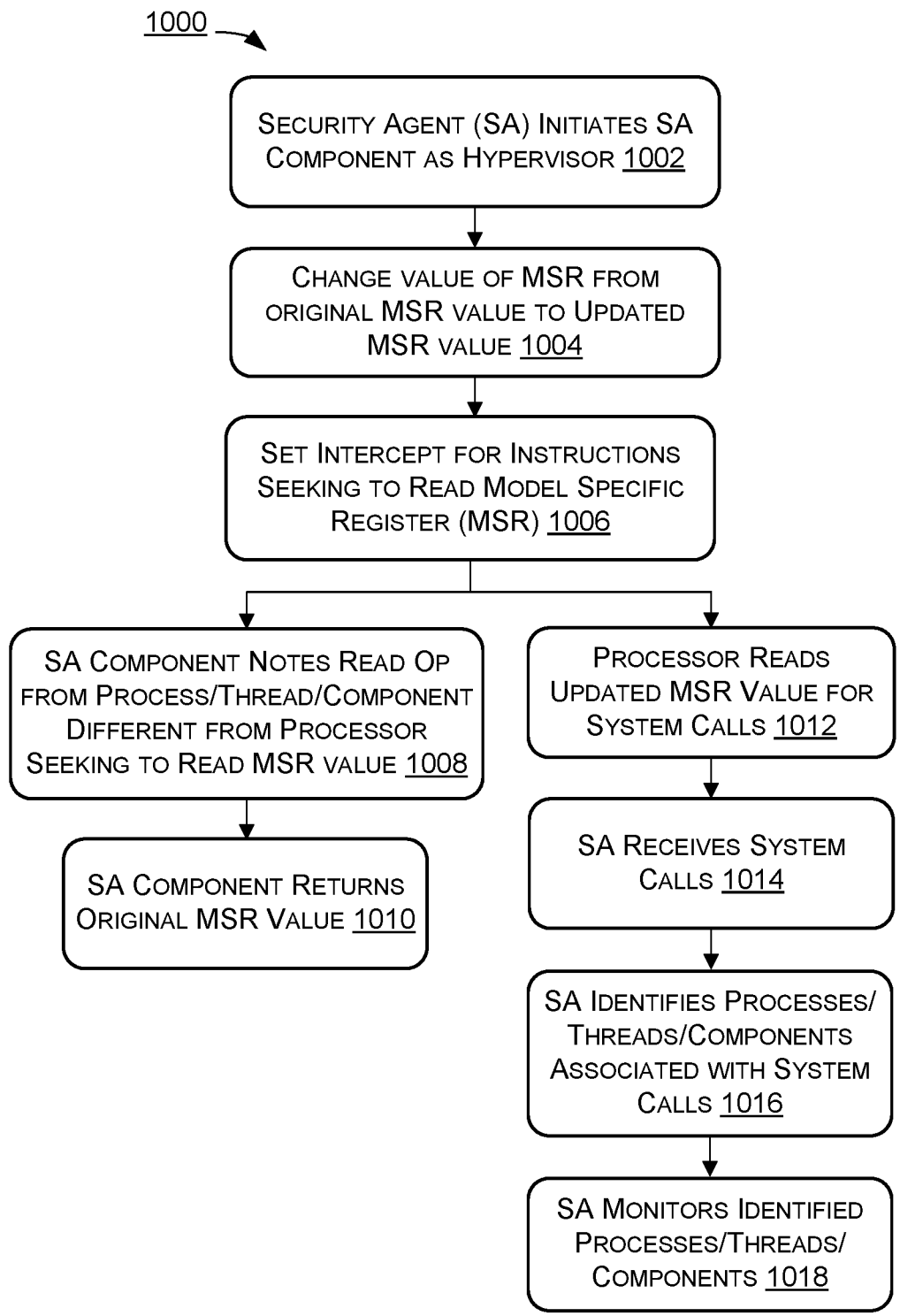
FIG. 10 illustrates an example process for intercepting instructions for reading a value of a processor configuration register, such as a Model Specific Register (MSR), to receive system calls at a security agent.

FIG. 10 illustrates an example process for intercepting instructions for reading a value of a processor configuration register, such as a Model Specific Register (MSR), to receive system calls at a security agent. The process 1000 includes, at 1002, a security agent on a computing device initiating a security agent component as a hypervisor for the computing device.

At 1004, the security agent component 110 further changes a value of a MSR 160 of a processor 124 of the computing device from an original MSR value to an updated MSR value. The updated MSR value, when read by the processor 124, causes system calls to be received by the security agent 108.

At 1006, the security agent component 110 further sets an intercept for instructions for performing read operations on the MSR 160. This may include setting an intercept for instructions for performing MSR read operations from processes, threads, or components that are different from the processor 124.

At 1008, after setting the intercept at 1006, the security agent component 110 may note a read operation from a process, a thread, or a component that is different from the processor 124 and is attempting to read the value of the MSR 160. The component attempting to read the value of the MSR 160 may be an operating system component (e.g., the host OS kernel 106), or a different component (e.g., an antivirus driver).

At 1010, in response to noting the read operation at 1008, the security agent component 110 further returns the original MSR value to the process, thread, or component attempting to read the value of the MSR 160. This original MSR value is returned at 1010 notwithstanding that the actual value of the MSR 160 has been changed to the updated MSR value at 1004.

At 1012, the processor 124 may read the updated MSR value as part of a system call procedure. This may occur in response to an application executing in user mode of the computing device invoking a process 118 to request access to a system resource, such as to open a file, allocate memory, or the like.

At 1014, because the updated MSR value points to the security agent 108, the security agent 108 receives a system call.

At 1016, the security agent 108, in response to receiving the system call at 1014, further identifies a process, thread, or component associated with the system call. For example, a process 118 that was invoked by a user-level application may be identified at 1016.

At 1018, the security agent 108 further monitors events on the computing device that result from execution of the identified process, thread, or component associated with the system call. This may allow the security agent 108 (perhaps in conjunction with a remote security service) to detect malware and respond with a remedial action to counter the detected malware.

It is to be appreciated that, although FIG. 10 is described with reference to a MSR, the process 1000 can be implemented with any type of processor configuration register, as mentioned elsewhere in this disclosure.

Figure 11:
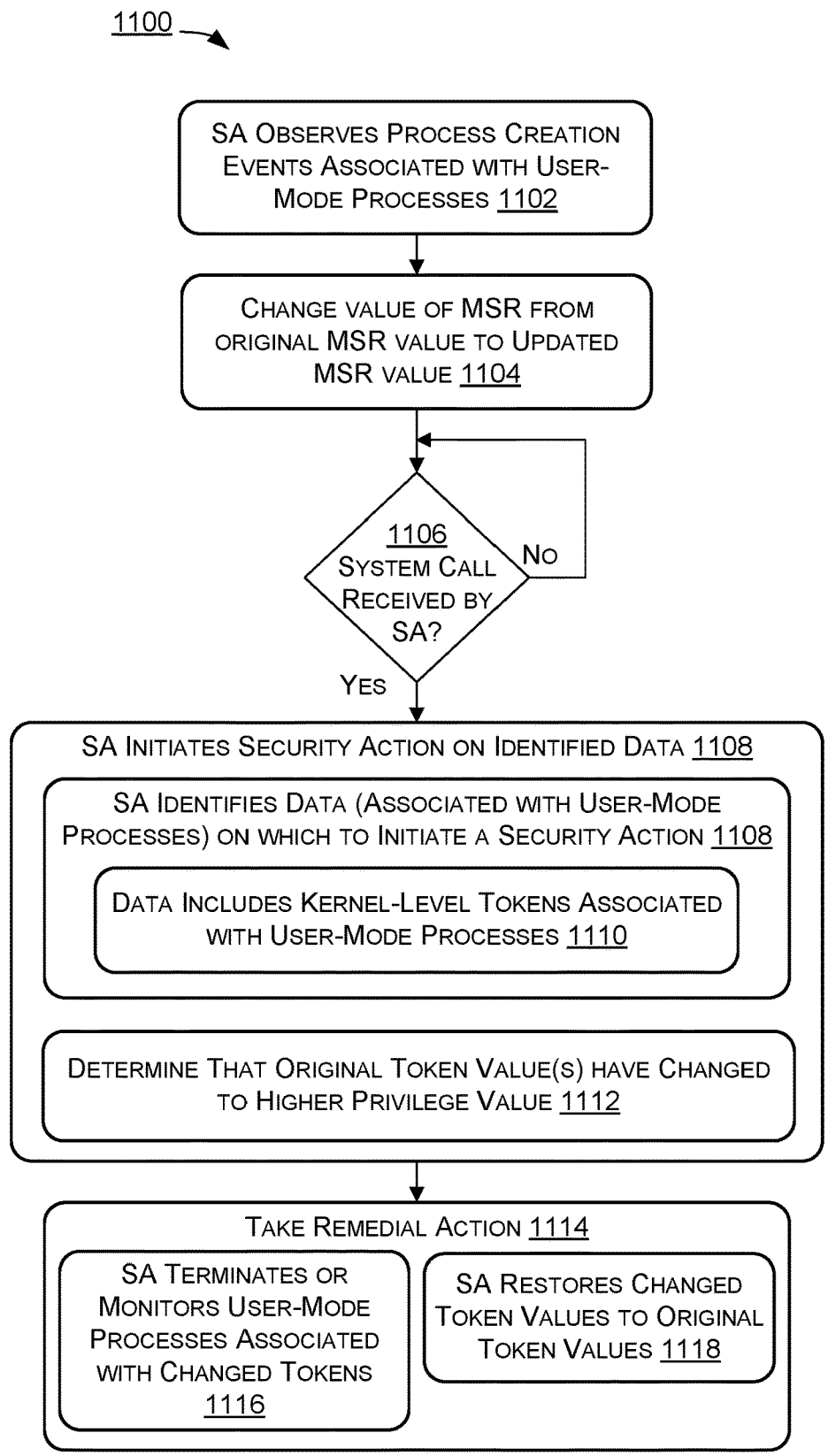
FIG. 11 illustrates an example process for using a system call received by a security agent as a trigger for initiating a security action on data associated with executing user-mode processes.

FIG. 11 illustrates an example process for using a system call received by a security agent as a trigger for initiating a security action on data associated with executing user-mode processes. The process 1100 includes, at 1102, the security agent 108 observing process creation events associated with the user-level processes, such as the processes 118 shown in FIG. 1. In this manner, the security agent 108 may keep track of processes 118 executing in the user mode 104 of the computing device by detecting when they are created (and when they are destroyed). Thus, in some implementations, the security agent 108 may also observe process termination events.

At 1104, the security agent component 110 may change a value of the MSR 160 of the processor 124 from an original MSR value to an updated MSR value that points to the security agent 108, as described herein.

At 1106, after changing the value of the MSR 160 at 1104, the security agent 108 monitors for receipt of a system call. If no system call is received, the process 1100 iterates at 1106 until a system call is received. When a system call is received, the process 1100 follows the "yes" route from block 1106 to 1108 where the security agent 108 initiates a security action on data that is identified as being associated with one or more user-level processes 118 executing in the user mode 104 of the computing device. This may include, at 1108, the security agent 108 identifying such data on which the security action is to be initiated. The identification of the data at 1108 may be based on the process creation events observed at 1102. For example, the security agent 108 can look up the currently executing processes 118 and identify data associated therewith. As shown at 1110, the identified data may include kernel-level tokens 174 associated with the currently-executing user-level processes 118 or threads. At 1112, initiating the security action on the data may include the security agent 108 determining whether values of any of the kernel-level tokens 174 have changed from an original token value to an updated token value, such as an updated token value that allows a corresponding user-level process 118 or thread to execute with greater privilege (e.g., an Admin privilege) than a privilege allowed by the original token value.

At 1114, the security agent 108 may take a remedial action in response to determining that the original token value of a token 174 has changed to an updated token value. The remedial action taken at 1114 may be to terminate or suspend the corresponding user-level process 118 or thread, or to monitor events on the computing device that result from the corresponding user-level process 118 or thread executing in the user mode of the computing device, as shown at 1116. Alternatively, the remedial action taken at 1114 may be to restoring the updated token value of the changed kernel-level token 174 to its original token value, as shown at 1118. In some embodiments, such as in response to determining that it is not possible to restore the updated token value to its original token value, the remedial action taken at 1114 may include restoring the updated token value of the changed kernel-level token 174 to a "safe" or "inert" value, or some value, other than the original value, that reflects the original state.

Figure 12:
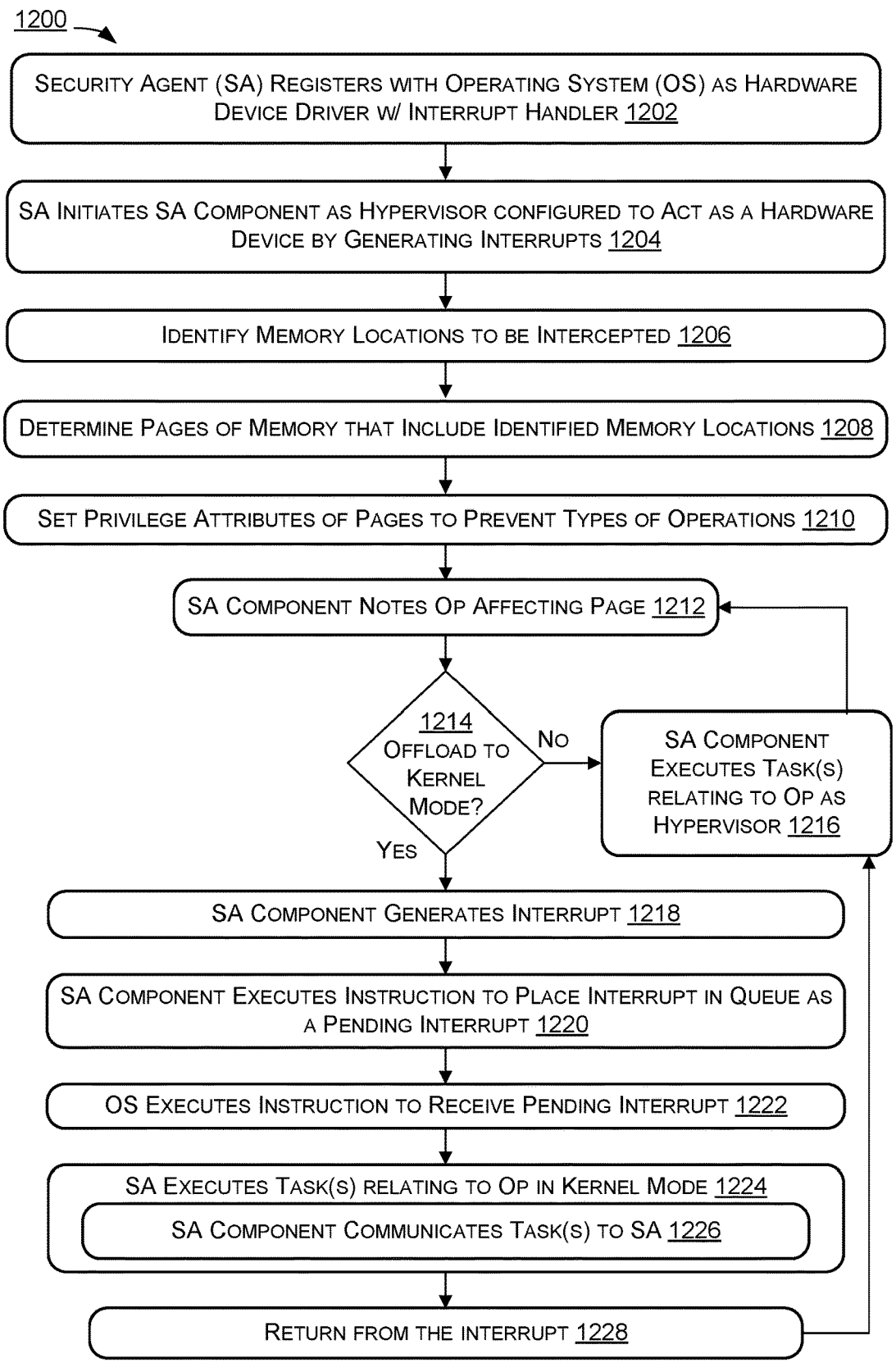
FIG. 12 illustrates an example process for improving computational performance of a system by offloading task execution from a security agent component in a hypervisor to a security agent in kernel-mode, the task(s) relating to an operation affecting a page with a protected memory location(s).

It is to be appreciated that, although FIG. 11 is described with reference to a MSR, the process 1100 can be implemented with any type of processor configuration register, as mentioned elsewhere in this disclosure FIG. 12 illustrates an example process for improving computational performance of a system by offloading task execution from a security agent component in a hypervisor to a security agent in kernel-mode, the task(s) relating to an operation affecting a page with a protected memory location (s). The process 1200 includes, at 1202, a security agent 108 of a computing device registering with an operating system of the computing device as a hardware device driver that includes an interrupt handler 176 for handling interrupts generated by the security agent component 110. The security agent 108 executes in the kernel mode 102 of the computing device.

At 1204, the security agent 108 further initiates a security agent component 110 as a hypervisor that is configured to act as a hardware device of the computing device by generating interrupts.

At 1206, memory locations in memory of the computing device that are to be intercepted are identified. In some implementations, the identified memory locations include a memory location associated with privileges for a process. In further implementations, the identified memory locations include a memory location associated with user credentials.

At 1208, pages of the memory which include the identified memory locations may then be determined.

At 1210, privilege attributes of the pages may then be set by the security agent component 110 to prevent specific types of operations from affecting the memory locations. When the identified memory locations include a memory location associated with privileges for a process, the specific types of operations may include write operations and the setting includes setting the privilege attribute for the page including the memory location to a read only value to prevent writes to the memory location. When the identified memory locations include a memory location associated with user credentials, the specific types of operations may include read operations and setting includes setting the privilege attribute for the page including the memory location to an inaccessible value to prevent reads of the memory location.

At 1212, an operation affecting a page of memory may be noted. The affected page may include a protected memory location(s) identified at 1206, and the operation may affect that memory location(s). The operation can include any of the example types of operations described herein, such as a read operation to read user credentials stored at the protected memory location.

At 1214, a determination may be made as to whether execution of one or more tasks relating to the operation affecting the page of memory are to be offloaded to the security agent 108 executing as a kernel-level component. The tasks relating to the operation affecting the page of memory can vary, as described herein, such as a task of determining whether the page corresponds to any of the pages that had the privilege attributes adjusted/set by the security agent component 110, determining a current address and/or offsets of the pages, and/or determining whether to temporarily reset the privilege attribute of the affected page. In some implementations, the determination at 1214 may include determining a computational cost of executing the task(s), and determining whether the computational cost of executing the task(s) meets or exceeds a threshold computational cost. If the security agent component 110 determines, at 1214, not to offload the task(s) to the security agent 108 (e.g., because the computational cost of executing the task(s) is less than the threshold computational cost), the process 1200 may follow the "no" route from block 1214 to block 1216 where the security agent component refrains from offloading the task(s), and executes the task(s) relating to the noted operation as a hypervisor.

If, at 1224, the security agent component 110 determines to offload the task(s) to the security agent 108 (e.g., because the computational cost of executing the task(s) meets or exceeds the threshold computational cost), the process 1200 may follow the "yes" route from block 1214 to block 1218 where the security agent component 110 generates an interrupt.

At 1220, the security agent component 110 may further execute an instruction (e.g., an "interrupt_exiting" flag instruction) to place the interrupt in a queue as a pending interrupt, whereby the operating system may receive the pending interrupt upon a component of the operating system executing a different instruction to receive pending interrupts.

At 1222, the operating system may execute an instruction to receive pending interrupts. For example, the operating system may receive the pending interrupt after executing a STI instruction at 1222.

At 1224, the security agent 108 may execute one or more of the tasks relating to the noted operation that designated as tasks to offload to the security agent 108. This may include, at 1226, the security agent component 110 communicating the task(s) to the security agent 108 after generating the interrupt at 1218.

At 1228, the security agent 108 may return from the interrupt to allow the security agent component 110 to proceed, such as by the security agent component 110 executing remaining tasks at 1216. This can include the security agent component 110 temporarily resetting the privilege attribute of the affected page in the instance where the security agent 108 determines that the privilege attribute of the affected page is to be temporarily reset. As shown in FIG. 12, the security agent component 110 may further continue noting operations affecting individual pages of memory at block 1212, which may cause the process 1200 to iterate of the remaining blocks after 1212 when a new operation is noted.

Figure 13:
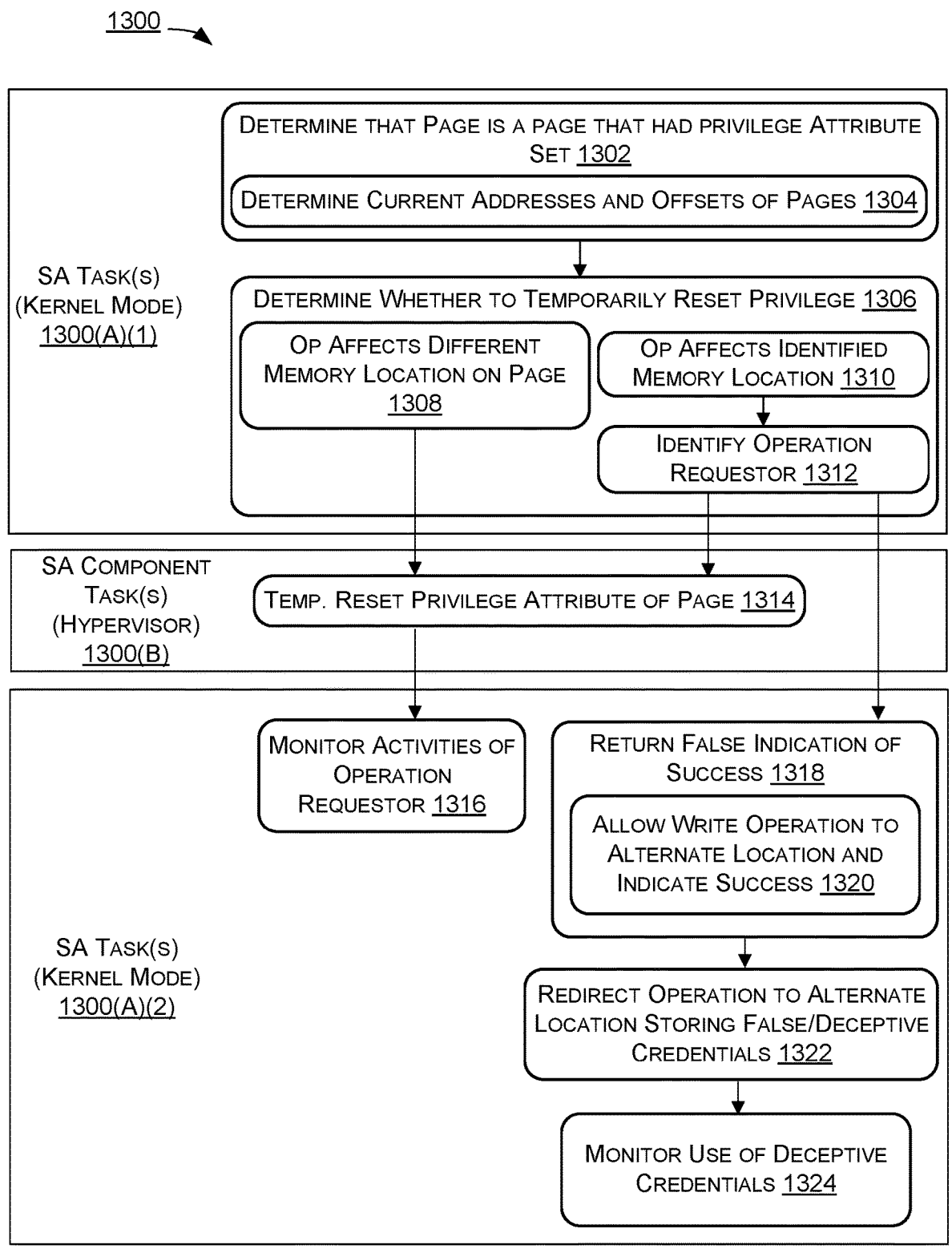
FIG. 13 illustrates an example process for switching between hypervisor and kernel-mode components to perform tasks relating to an operation affecting a page with a protected memory location(s).

FIG. 13 illustrates an example process for switching between hypervisor and kernel-mode components to perform tasks relating to an operation affecting a page with a protected memory location(s). The process 1300 shows blocks 1300A (1300(A)(1) and 1300(A)(2)) that include tasks that may be performed by the security agent 108 when the security agent component 110 generates an interrupt to offload those tasks to the security agent. The process 1300 also shows block 1300B that includes a task that may be performed by the security agent component 110, such as when the security agent 108 returns from the interrupt.

At 1302, the security agent 108, in response to an interrupt generated by the security agent component 110, may determine that a page of memory affected by a noted operation corresponds to a page that had its privilege attribute set by the security agent component 110. This may involve, at 1304, the security agent 108 determining current addresses and/or offsets of pages of memory. For instance, pages may move in or out (page in, page out), and offsets may change over time since the privilege attribute was initially adjusted/set by the security agent component 110.

At 1306, the security agent 108 may further determine whether to temporarily reset the privilege attribute of the affected page or not. This may involve, at 1308, determining that the noted operation affects a memory location that is different from a protected memory location(s) on the affected page, or, at 1310, determining that the noted operation affects a protected memory location on the page, and identifying the operation requestor at 1312.

At 1314, after returning from an interrupt, the security agent component 110 may temporarily reset a privilege attribute of the affected page. As shown, this may occur in response to the security agent 108 determining that the noted operation affects a non-protected memory location, and the operation is to be allowed to proceed since it does not affect a protected memory location. Alternatively, the temporarily resetting of the privilege attribute of the page at 1314 may occur in response to the security agent identifying an operation requestor at 1312 when the noted operation affects a protected memory location. Following such a determination, the privilege attribute of the page may be reset at 1314, followed by another interrupt to offload execution of a task of monitoring activities of the operation requestor at 1316 by the security agent 108.

Alternatively, at 1318, following identification of an operation requestor when the noted operation affects a protected memory location, the security agent 108 may not return from the interrupt and may instead proceed to perform tasks such as returning a false indication of success to the operation requestor at 1318. This may involve allowing a write operation to an alternate location and indicating a success at 1320.

At 1322, the security agent 108 may redirect the noted operation to an alternative location storing false or deceptive credentials, and, at 1324, the security agent 108 may monitor use of the false or deceptive credentials.

The process 1300 merely illustrates example tasks that can be performed by the security agent 108 and the security agent component 110 in kernel mode 104 and in the hypervisor level 112, respectively, and it is to be appreciated that other tasks may be performed by each component, and/or the tasks shown in FIG. 13 may be performed by the other entity, in some instances. This may depend on the computational cost of executing the task(s) by the security agent component 110 as a hypervisor, and the computational cost that may be saved by offloading the task(s) to the security agent 108 executing as a kernel-level component. The transition from an operation in 1300(A)(1) to an operation in 1300(B) may be enabled by the security agent component 110 generating an interrupt, as described, and the transition from an operation in 1300(B) to an operation in 1300(A)(2) may be enabled by returning from the interrupt, as described.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
   initiating, by a security agent, a security agent component in a hypervisor of a computing device;
   changing, by a security agent component executing in the hypervisor of the computing device, a value of a processor configuration register of a processor of the computing device from an original value to an updated value, the original value permitting system calls by a process, a thread, or a component different from the processor to perform an access operation of the processor configuration register and the updated value causing the system calls associated with performing the access operation of the processor configuration register to be intercepted and received by a security agent executing in kernel mode of the computing device;
   receiving a system call of the system calls associated with performing the access operation of the processor configuration register from the process, the thread, or the component different from the processor by the security agent after the changing of the value of the processor configuration register;
in response to receiving the system call by the security agent:
initiating, by the security agent, a security action on the process, the thread, or the component, and
initiating, by the security agent, a security action on data that is associated with user-level processes or threads executing in a user mode of the computing device, the data including kernel-level tokens associated with the user-level processes or the threads,
wherein the security action determines whether values of any of the kernel-level tokens have changed from an original token value to an updated token value.

2. The computer-implemented method of claim 1, further comprising:
setting, by the security agent component, an intercept for instructions for performing read operations on the processor configuration register;
noting, by the security agent component and after the setting of the intercept, a read operation from a process, a thread, or a component that is different from the processor and is attempting to read the value of the processor configuration register; and
in response to the noting of the read operation, returning, by the security agent component, the original value to the process, the thread, or the component that is different from the processor.

3. The computer-implemented method of claim 1, further comprising:
observing, by the security agent, process creation events associated with the user-level processes or thread creation events associated with the threads; and
identifying the data on which the security action is to be initiated based at least in part on the observing of the process creation events or the thread creation events.

4. The computer-implemented method of claim 1, wherein the updated token value of a changed kernel-level token allows a corresponding user-level process or a corresponding thread to execute with greater privilege than a privilege allowed by the original token value.

5. The computer-implemented method of claim 4, further comprising at least one of:
restoring the updated token value of the changed kernel-level token to the original token value or to another token value that is safe, inert, and/or reflects an original state of the changed kernel-level token;
terminating the corresponding user-level process or the corresponding thread; suspending the corresponding user-level process or the corresponding thread; or
monitoring events on the computing device that result from the corresponding user-level process or the corresponding thread executing in the user mode of the computing device.

6. The computer-implemented method of claim 1, further comprising:
receiving, after the changing of the value of the processor configuration register and based on the security agent component determining that an entity performing the access operation is an operating system of the computing device, the original value of the processor configuration register by an operation system of the computing device from the security agent component.

7. A system comprising:
a processor;
a security agent configured to be operated by the processor to execute in kernel mode of the system;
a security agent component; and
a non-transitory computer-readable medium storing computer-readable instructions that, when executed, causes the processor to perform operations comprising:
initiating, by the security agent, the security agent component in a hypervisor of the system;
changing, by the security agent component, a value of a processor configuration register of the processor from an original value to an updated value, the original value permitting system calls by a process, a thread, or a component different from the processor to perform an access operation of the processor configuration register and the updated value causing the system calls associated with performing the access operation to be intercepted and received by a security agent executing in a kernel mode of the system;
receiving a system call associated with performing the access operation of the processor configuration register from the the process, the thread, or the component different from the processor by the security agent after the changing of the value of the processor configuration register;
in response to receiving the system call by the security agent:
initiating, by the security agent, a security action on the process, the thread, or the component, and
initiating, by the security agent, a security action on data that is associated with user-level processes or threads executing in a user mode of the system, the data including kernel-level tokens associated with the user-level processes or the threads and the security action determines whether values of any of the kernel-level tokens have changed from an original token value to an updated token value,
wherein the updated token value allows a corresponding user-level process or a corresponding thread to execute with greater privileged than a privileged allowed by the original token value; and
executing, based on determining that a kernel-level token of the kernel-level tokens have changed to the updated token value, at least one of:
restoring the updated token value of the changed kernel-level token to the original token value or to another token value that is safe, inert, and/or reflects an original state of the changed kernel-level token;
terminating the corresponding user-level process or the corresponding thread;
suspending the corresponding user-level process or the corresponding thread; or
monitoring events on the system that result from the corresponding user-level process or the corresponding thread executing in the user mode of the computing device system.

8. The system of claim 7, wherein the security agent component is further configured to:
set an intercept for instructions for performing read operations on the processor configuration register;

after the setting of the intercept, note read operations from an operating system component of an operating system attempting to read the value of the processor configuration register; and in response to noting the read operations, return the original value to the operating system component.

9. The system of claim 7, wherein the security agent is further configured to:

in response to receiving a system call of the system calls, identify a process, a thread, or a component associated with the system call; and monitor events on the system that result from execution of the process, the thread, or the component associated with the system call.

10. The system of claim 7, wherein the security agent is further configured to:

observe process creation events associated with the user-level processes or thread creation events associated with the threads; and identify the data on which the security action is to be initiated based at least in part on the observing of the process creation events or the thread creation events.

11. A non-transitory computer-readable medium storing computer-readable instructions that, when executed, causes one or more processors to perform operations comprising:

initiating, by a security agent, a security agent component in a hypervisor of a computing device;

changing, by a security agent component executing in the hypervisor of the computing device, a value of a processor configuration register of a processor of the computing device from an original value to an updated value, the original value permitting system calls by a process, a thread, or a component different from the processor to perform an access operation of the processor configuration register and the updated value causing the system calls associated with performing the access operation of the processor configuration register to be intercepted and received by a security agent executing in kernel mode of the computing device;

receiving a system call of the system calls associated with performing the access operation of the processor configuration register from the process, the thread, or the component different from the processor by the security agent after the changing of the value of the processor configuration register; and in response to receiving the system call by the security agent:

initiating, by the security agent, a security action on the process, the thread, or the component, and initiating, by the security agent, a security action on data that is associated with user-level processes or threads executing in a user mode of the computing device, the data including kernel-level tokens associated with the user-level processes or the threads, wherein the security action determines whether values of any of the kernel-level tokens have changed from an original token value to an updated token value.

12. The non-transitory computer-readable medium of claim 11, the operations further comprising:

setting, by the security agent component, an intercept for instructions for performing read operations on the processor configuration register;

noting, by the security agent component and after the setting of the intercept, a read operation from the process, the thread, or the component that is different from the processor and is attempting to read the value of the processor configuration register; and in response to the noting of the read operation, returning, by the security agent component, the original value to the process, the thread, or the component that is different from the processor.

13. The non-transitory computer-readable medium of claim 11, the operations further comprising:

observing, by the security agent, process creation events associated with the user-level processes or thread creation events associated with the threads; and identifying the data on which the security action is to be initiated based at least in part on the observing of the process creation events or the thread creation events.

14. The non-transitory computer-readable medium of claim 11, wherein the updated token value of a changed kernel-level token allows a corresponding user-level process or a corresponding thread to execute with greater privilege than a privilege allowed by the original token value.

15. The non-transitory computer-readable medium of claim 14, the operations further comprising at least one of:

restoring the updated token value of the changed kernel-level token to the original token value or to another token value that is safe, inert, and/or reflects an original state of the changed kernel-level token;

terminating the corresponding user-level process or the corresponding thread; suspending the corresponding user-level process or the corresponding thread; or monitoring events on the computing device that result from the corresponding user-level process or the corresponding thread executing in the user mode of the computing device.

16. The non-transitory computer-readable medium of claim 11, wherein the processor configuration register is a Model Specific Register (MSR) of the processor.

* * * * *